US012609792B2

(12) United States Patent
Jang et al.

(10) Patent No.:  US 12,609,792 B2
(45) Date of Patent:       Apr. 21, 2026

(54) METHOD AND DEVICE FOR TRANSMITTING/RECEIVING CONTROL INFORMATION IN WIRELESS COOPERATIVE COMMUNICATION SYSTEM

(71) Applicant: Samsung Electronics Co., Ltd., Suwon-si (KR)

(72) Inventors: Youngrok Jang, Suwon-si (KR); Jinhyun Park, Suwon-si (KR); Taehyoung Kim, Suwon-si (KR); Hoondong Noh, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 18/018,695

(22) PCT Filed: Jul. 28, 2021

(86) PCT No.: PCT/KR2021/009811
§ 371 (c)(1),
(2) Date: Jan. 30, 2023

(87) PCT Pub. No.: WO2022/025628
PCT Pub. Date: Feb. 3, 2022

(65) Prior Publication Data
US 2023/0318761 A1      Oct. 5, 2023

(30) Foreign Application Priority Data
Jul. 31, 2020    (KR) ........................ 10-2020-0096397

(51) Int. Cl.
H04L 5/00          (2006.01)
H04L 1/1812       (2023.01)
(Continued)

(52) U.S. Cl.
CPC .......... H04L 5/0035 (2013.01); H04L 1/1819 (2013.01); H04W 72/1263 (2013.01); H04W 72/232 (2023.01)

(58) Field of Classification Search
CPC ....... H04L 1/08; H04L 1/1819; H04L 5/0035; H04L 5/0044; H04L 5/0051;
(Continued)

(56) References Cited

U.S. PATENT DOCUMENTS 10,623,209 B2 * 4/2020 Cheng .................. H04L 5/0055
11,012,990 B2    5/2021 Park et al.
(Continued)

FOREIGN PATENT DOCUMENTS

CN          110945823 A       3/2020
CN          114041309 A  *   2/2022   ............ H04W 24/08
(Continued)

OTHER PUBLICATIONS

International Search Report with Written Opinion and English translation dated Oct. 28, 2021; International Appln. No. PCT/KR2021/009811.
(Continued)

*Primary Examiner* — Eric Nowlin
(74) *Attorney, Agent, or Firm* — Jefferson IP Law, LLP

(57)          ABSTRACT
According to an embodiment of the disclosure, a method performed by a user equipment in a wireless communication system is provided. The method may include repeatedly receiving, from a base station through a plurality of transmission and reception points (TRPs), control information having a same downlink control information (DCI) format and payload, repeatedly receiving, from the base station through the plurality of TRPs, downlink data corresponding to the control information, performing soft combining on the repeatedly received control information, and performing
(Continued)

decoding on the control information, based on a result of the soft combining.

7 Claims, 26 Drawing Sheets

(51) Int. Cl.
  *H04W 72/1263*     (2023.01)
  *H04W 72/232*     (2023.01)
(58) Field of Classification Search
  CPC ... H04L 5/0053; H04L 5/0055; H04L 5/0094;
      H04W 72/0446; H04W 72/1263; H04W
      72/1273; H04W 72/232; Y02D 30/70
  See application file for complete search history.

(56)     References Cited

U.S. PATENT DOCUMENTS

| | | | | |
|---|---|---|---|---|
| 11,128,495 | B2 * | 9/2021 | Cheng | H04L 1/1896 |
| 11,229,045 | B2 * | 1/2022 | Khoshnevisan | H04L 5/0053 |
| 11,283,548 | B2 * | 3/2022 | Li | H04L 1/08 |
| 11,323,236 | B2 * | 5/2022 | Xu | H04W 4/70 |
| 11,909,526 | B2 * | 2/2024 | Yuan | H04B 7/022 |
| 12,009,924 | B2 * | 6/2024 | Li | H04L 1/1829 |
| 12,160,379 | B2 * | 12/2024 | Canonne-Velasquez | |
| | | | | H04L 5/005 |
| 12,184,580 | B2 * | 12/2024 | Takeda | H04W 24/08 |
| 12,238,025 | B2 * | 2/2025 | Zhang | H04L 5/0053 |
| 12,267,833 | B2 * | 4/2025 | Sun | H04W 72/1273 |
| 12,302,360 | B1 * | 5/2025 | Keating | H04W 76/20 |
| 2018/0192405 | A1 * | 7/2018 | Gong | H04L 1/0075 |
| 2019/0020506 | A1 * | 1/2019 | Cheng | H04L 5/0055 |
| 2019/0089489 | A1 * | 3/2019 | Li | H04L 1/189 |
| 2019/0230697 | A1 | 7/2019 | Yang et al. | |
| 2020/0008235 | A1 | 1/2020 | Sarkis et al. | |
| 2020/0196346 | A1 * | 6/2020 | Khoshnevisan | H04W 72/044 |
| 2020/0205187 | A1 * | 6/2020 | Khoshnevisan | H04L 5/0023 |
| 2020/0221428 | A1 | 7/2020 | Moon et al. | |
| 2020/0228263 | A1 * | 7/2020 | Khoshnevisan | H04W 72/1273 |
| 2020/0412515 | A1 * | 12/2020 | Xu | H04W 4/70 |
| 2021/0119833 | A1 * | 4/2021 | Cheng | H04L 5/0053 |
| 2021/0306102 | A1 * | 9/2021 | Li | H04L 1/1819 |
| 2021/0400702 | A1 * | 12/2021 | Parkvall | H04L 5/0094 |
| 2021/0409094 | A1 * | 12/2021 | Yuan | H04W 76/19 |
| 2022/0038207 | A1 * | 2/2022 | Frenne | H04L 5/0053 |
| 2022/0104182 | A1 * | 3/2022 | Kim | H04L 5/0051 |
| 2022/0104185 | A1 | 3/2022 | Moon et al. | |
| 2022/0104230 | A1 * | 3/2022 | Yoshimura | H04L 5/0028 |
| 2022/0132541 | A1 | 4/2022 | Kim et al. | |
| 2022/0216972 | A1 * | 7/2022 | Takeda | H04L 5/0053 |
| 2022/0217687 | A1 * | 7/2022 | Matsumura | H04W 72/044 |
| 2022/0279442 | A1 * | 9/2022 | Luo | H04W 52/0235 |
| 2022/0345245 | A1 * | 10/2022 | Yuan | H04L 5/0023 |
| 2022/0394601 | A1 * | 12/2022 | Zhang | H04L 1/1893 |
| 2023/0147122 | A1 * | 5/2023 | Canonne-Velasquez | |
| | | | | H04L 5/0035 |
| | | | | 370/329 |
| 2023/0388081 | A1 * | 11/2023 | Kim | H04L 5/0092 |
| 2025/0142584 | A1 * | 5/2025 | Keating | H04L 27/26025 |
| 2025/0274949 | A1 * | 8/2025 | Keating | H04L 5/0048 |

FOREIGN PATENT DOCUMENTS

| | | | | | |
|---|---|---|---|---|---|
| CN | 114342304 | A | * | 4/2022 | H04W 72/23 |
| CN | 114342304 | B | * | 3/2024 | H04L 5/0053 |
| CN | 114041309 | B | * | 9/2025 | H04W 24/08 |
| EP | 3962195 | A1 | * | 3/2022 | H04W 24/08 |
| EP | 3991342 | B1 | * | 9/2023 | H04L 5/0053 |
| EP | 4550711 | A1 | * | 5/2025 | H04W 72/1268 |
| KR | 10-2015-0140332 | A | | 12/2015 | |
| KR | 10-2019-0017675 | A | | 2/2019 | |
| WO | 2014/161631 | A1 | | 10/2014 | |
| WO | 2019/113833 | A1 | | 6/2019 | |
| WO | 2020/166947 | A1 | | 8/2020 | |
| WO | WO-2020217408 | A1 | * | 10/2020 | H04W 24/08 |
| WO | WO-2020264121 | A1 | * | 12/2020 | H04W 72/23 |

OTHER PUBLICATIONS

Ericsson; On multi-TRP and multi-panel; 3GPP TSG RAN WG1 Meeting RAN1#98; R1-1908990; Prague, Czech Republic; Aug. 26-30, 2019.

Korean Office Action with English translation dated Jul. 14, 2025; Korean Appln. No. 10-2020-0096397.

Chinese Office Action dated Feb. 11, 2026, issued in Chinese Patent Application No. 202180058241.X.

* cited by examiner

FIG. 9

RRC configured TCI states    15-00

TCI #0    TCI #0    TCI #2    TCI #3    · · ·    TCI #M-1

Candidate of TCI states for PDSCH    15-20

TCI #0'    TCI #1'    TCI #2'    · · ·    TCI #K-1

MAC CE based beam indication

TCI state for PDSCH

TCI #2'    15-40

DCI based beam selection

FIG. 22

| TCI state for PDSCH #1 | TCI state for PDSCH #2 | ... | TCI state for PDSCH #Y |
|---|---|---|---|

FIG. 25

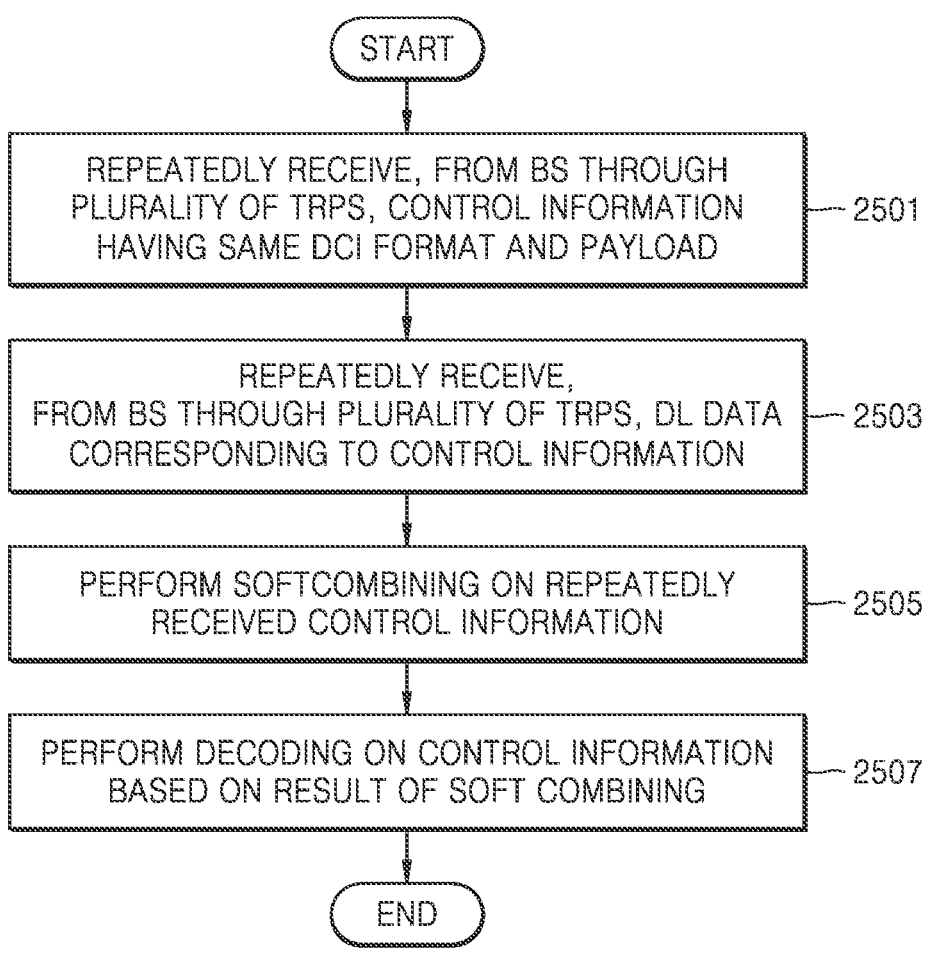

START

REPEATEDLY RECEIVE, FROM BS THROUGH
PLURALITY OF TRPS, CONTROL INFORMATION
HAVING SAME DCI FORMAT AND PAYLOAD ——— 2501

REPEATEDLY RECEIVE,
FROM BS THROUGH PLURALITY OF TRPS, DL DATA
CORRESPONDING TO CONTROL INFORMATION ——— 2503

PERFORM SOFTCOMBINING ON REPEATEDLY
RECEIVED CONTROL INFORMATION ——— 2505

PERFORM DECODING ON CONTROL INFORMATION
BASED ON RESULT OF SOFT COMBINING ——— 2507

END

METHOD AND DEVICE FOR TRANSMITTING/RECEIVING CONTROL INFORMATION IN WIRELESS COOPERATIVE COMMUNICATION SYSTEM

TECHNICAL FIELD

The disclosure relates to a wireless communication system, and more particularly, to a method and apparatus for transmitting, by a base station, control information to a user equipment through a plurality of transmission points (TPs)/panels/beams for cooperative communication among the plurality of TPs/panels/beams.

BACKGROUND ART

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G or pre-5G communication systems are called 'beyond 4G network' communication systems or 'post long term evolution (post-LTE)' systems. The 5G communication system defined in the $3^{rd}$ Generation Partnership Project (3GPP) is called a New Radio (NR) system.

In order to achieve a high data rate, consideration is given to implementing 5G communication systems in ultra-high frequency bands (mmW) (e.g., 60 GHz bands). To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed.

In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-centered connection network, through which humans generate and consume information, to an Internet of Things (IoT) network that exchanges and processes information between distributed elements such as objects. Internet of everything (IoE) technology, in which big data processing technology through a connection to a cloud server and the like is combined with the IoT technology, is also emerging. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet (or, information) technology (IT) services may be provided to collect and analyze data obtained from objects connected to each other to create new value in human life. As existing information technology (IT) and various industries converge and combine with each other, the IT may be applied to various fields such as smart homes, smart buildings, smart cities, smart cars or connected cars, smart grids, health care, smart home appliances, and advanced medical services.

In this regard, various attempts to apply the 5G communication system to the IoT network are being made. For example, 5G communication such as sensor networks, M2M communication, and MTC are being implemented by using various schemes such as beamforming, MIMO, and array antennas. The application of a cloud RAN as big data processing technology may also be considered as an example of convergence between 5G technology and IoT technology.

Meanwhile, with the development of communication systems, various studies on beam-based cooperative communication have been conducted.

DISCLOSURE

Technical Problem

The disclosure provides a method and apparatus for transmitting, by a base station, control information to a user equipment through a plurality of transmission points/panels/beams and receiving, by the terminal, the transmitted control information in a wireless cooperative communication system.

Technical Solution

The disclosure provides a method and apparatus for receiving, by a user equipment, control information and downlink data repeatedly transmitted from a base station through a plurality of transmission and reception points (TRPs).

DESCRIPTION OF DRAWINGS

FIG. 9 is a diagram illustrating a case in which, when multi-slot repetition is not configured, a plurality of physical uplink control channel (PUCCH) resources for hybrid automatic repeat request-acknowledgement (HARQ-ACK) transmission to a PDSCH overlap, according to an embodiment of the disclosure.

FIG. 22 shows an example of a field indicating a method of applying a TCI state to be added to control information.

FIG. 25 is a flowchart of a method performed by a terminal, according to an embodiment of the disclosure.

MODE FOR INVENTION

Figure 1:
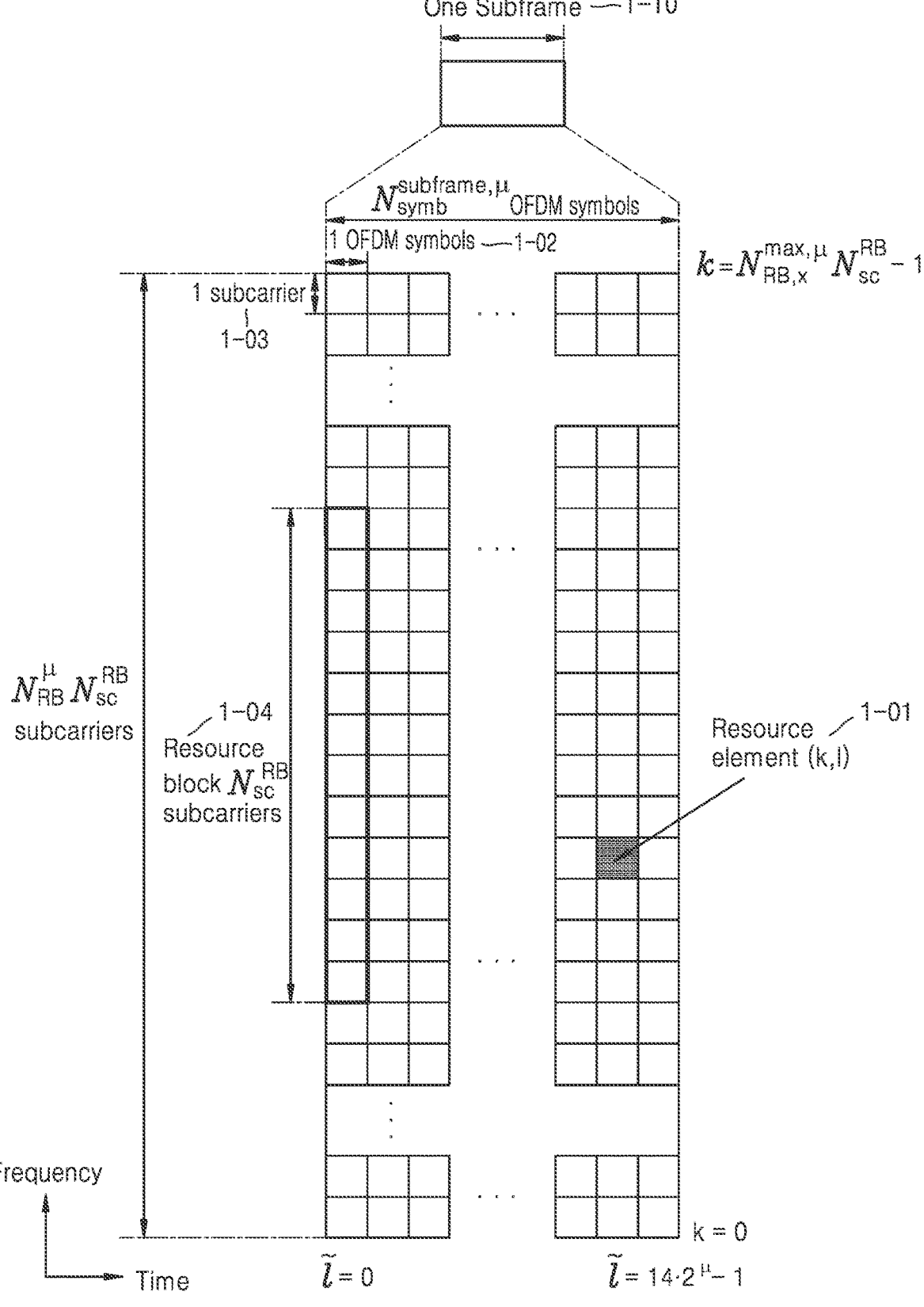
FIG. 1 is a diagram illustrating a basic structure of a time-frequency domain, which is a radio resource domain on which control information is transmitted, in a $5^{th}$ Generation (5G) system according to an embodiment of the disclosure.

Embodiments of the disclosure will be described in detail with reference to accompanying drawings.

In the following descriptions, well-known functions or configurations in the art, which are not directly associated with the disclosure, are not described. This is to clearly convey the gist of the disclosure by omitting unnecessary descriptions.

For the same reasons, elements may be exaggerated, omitted, or schematically illustrated in drawings for clarity. Also, the size of each element does not entirely reflect the actual size. In each drawing, elements that are the same or are in correspondence are rendered the same reference numeral.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference characters.

In this case, it will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing device, the instructions, which are executed via the processor of the computer or other programmable data processing device generate means for implementing functions specified in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks illustrated successively may actually be executed substantially concurrently, or the blocks may sometimes be performed in a reverse order according to the corresponding function.

Here, the term "unit" in the embodiments means a software element or hardware element such as a field-programmable gate array (FPGA) or an application-specific integrated circuit (ASIC), and performs a specific function. However, the term "unit" is not limited to software or hardware. The term "unit" may be configured in an addressable storage medium or may be configured to reproduce one or more processors. Thus, according to some embodiments, the term "unit" may refer to elements such as software elements, object-oriented software elements, class elements, and task elements, and may include processes, functions, attributes, procedures, subroutines, segments of program code, drivers, firmware, micro codes, circuits, data, a database, data structures, tables, arrays, or variables. The functionality provided in elements and "units" may be combined into fewer elements and "-units" or may be further separated into additional elements and "-units". Further, the elements and "units" may be implemented to operate one or more central processing units (CPUs) in a device or a secure multimedia card. Also, in some embodiments, the "unit" may include at least one processor.

Hereinafter, operation principles of the disclosure will be described with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification. Hereinafter, the term "base station" refers to an entity for allocating resources to a user equipment (UE) and may be used interchangeably with at least one of a gNode B, an eNode B, a node B, a base station (BS), a radio access unit, a base station controller, or a node over a network. Examples of a terminal may include UE, a mobile station (MS), a cellular phone, a smartphone, a computer, and a multimedia system capable of performing a communication function. However, the disclosure is not limited to the examples. Hereinafter, a technique for a terminal to receive broadcast information from a BS in a wireless communication system will be described. The disclosure relates to a communication scheme for converging a 5G communication system with IoT technology to support a higher data rate after a 4G system. The disclosure may be applied to intelligent services (e.g., smart homes, smart buildings, smart cities, smart cars or connected cars, health care, digital education, retail business, and security and safety related services) based on 5G communication technology and IoT related technology.

Hereinbelow, terms indicating broadcast information, terms indicating control information, terms related to communication coverage, terms indicating a change in a state (for example, an event), terms indicating network entities, terms indicating messages, and terms indicating elements of an apparatus are exemplified for convenience of description. Accordingly, the disclosure is not limited to terms to be described below, and other terms having equal technical meanings may be used.

Hereinafter, for convenience of description, some of terms and names defined by the 3rd Generation Partnership Project Long Term Evolution (3GPP LTE) standard may be used. However, the disclosure is not limited to these terms and names, and may be equally applied to wireless communication systems conforming to other standards.

A wireless communication system has evolved from a system providing voice-oriented services to a broadband wireless communication system providing high speed high quality packet data services of communication standards such as high speed packet access (HSPA) of 3GPP, LTE or evolved universal terrestrial radio access (E-UTRA), LTE-A, LTE-Pro, high rate packet data (HRPD) of 3GPP2, ultra mobile broadband (UMB), and IEEE 802.16e.

As a representative example of such a broadband wireless communication system, an LTE system adopts Orthogonal Frequency Division Multiplexing (OFDM) for downlink (DL) and Single Carrier Frequency Division Multiple Access (SC-FDMA) for uplink (UL). The UL refers to a radio link for a UE or MS to transmit data or a control signal to an eNode B or BS, and the DL refers to a radio link for a BS to transmit data or a control signal to a UE or MS. In the multiple access scheme, time-frequency resources for carrying data or control information are allocated and operated in a manner to prevent overlapping of the resources, i.e., to establish orthogonality between users so as to identify data or control information of each user.

As a future communication system after the LTE system, that is, a 5G communication system, has to be able to freely reflect various requirements of a user and a service provider, and thus, services satisfying various requirements need to be supported. The services considered for the 5G communication system include enhanced mobile broadband (eMBB), massive machine type communication (mMTC), ultra reliability low latency communication (hereinafter, URLLC), etc.

According to some embodiments, the eMBB aims to provide a higher data rate than a data rate supported by the LTE, LTE-A, or LTE-Pro system. For example, in the 5G communication system, the eMBB should be able to provide a peak data rate of 20 Gbps in the DL and a peak data rate of 10 Gbps in the UL from the viewpoint of one BS. At the same time, the eMBB should provide an increased user perceived data rate. In order to satisfy such requirements, improvement of various transmitting/receiving technologies including a further improved MIMO transmission technology may be demanded. Also, the eMBB may satisfy a data rate required in the 5G communication system by using a frequency bandwidth wider than 20 MHz in a frequency band of 3 to 6 GHz or equal to or greater than 6 GHz instead of 2 GHz used by current LTE.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km²) in a cell because it is attached to various sensors and various devices to provide communication functions. Also, due to the nature of the service, the terminal supporting mMTC is likely to be located in a shaded area that is not covered by the cell, such as the basement of a building. Therefore, wider coverage than other services provided by the 5G communication systems may be required. The UEs that support the mMTC should be configured as inexpensive terminals and require very long battery lifetime because it is difficult to frequently replace batteries of the UEs.

Finally, the URLLC that is a cellular-based wireless communication service used for mission-critical purposes needs to provide communication providing ultra-low latency and ultra-high reliability as a service used in remote control for robots or machinery, industrial automation, unmanaged aerial vehicles, remote health care, or emergency alert. For example, a service supporting URLLC has to satisfy air interface latency of less than 0.5 milliseconds and simultaneously has a packet error rate of 10-5 or less. Accordingly, for the service supporting the URLLC, the 5G communication system is required to provide a transmit time interval (TTI) shorter than those for other services while allocating a broad resource in a frequency band. However, the above-described mMTC, URLLC, and eMBB are merely examples of different service types, and the service types to which the disclosure is applied are not limited thereto.

The services considered in the 5G communication system described above may be converged with each other and provided based on one framework. In other words, for efficient resource management and control, services may be integrated, controlled, and transmitted via one system instead of being independently operated.

Also, hereinbelow, one or more embodiments of the disclosure will be described as an example of an LTE, LTE-A, LTE Pro, or NR system, but the one or more embodiments of the disclosure may also be applied to other communication systems having a similar technical background or channel form. Furthermore, embodiments of the disclosure will also be applied to other communication systems with some modifications to such an extent that does not significantly deviate from the scope of the disclosure when judged by those of ordinary skill in the art.

A frame structure of a 5G system will now be described in more detail with reference to the drawings.

FIG. 1 is a diagram illustrating a basic structure of a time-frequency domain, which is a radio resource domain in which data or control information is transmitted in a wireless communication system, according to an embodiment of the disclosure.

Referring to FIG. 1, the horizontal axis and the vertical axis of the time-frequency domain shown in FIG. 1 represent a time domain and a frequency domain, respectively. A basic unit of resources in the time domain and the frequency domain is a resource element (RE) 1-01, which may be defined as one orthogonal frequency division multiplexing (OFDM) symbol 1-02 in the time domain and one subcarrier 1-03 in the frequency domain. For example, in the frequency domain, one resource block (RB) 1-04 may be composed of twelve consecutive REs $Nsc^{RB}$. In an embodiment, one subframe 1-10 may be composed of a plurality of OFDM symbols.

Figure 2:
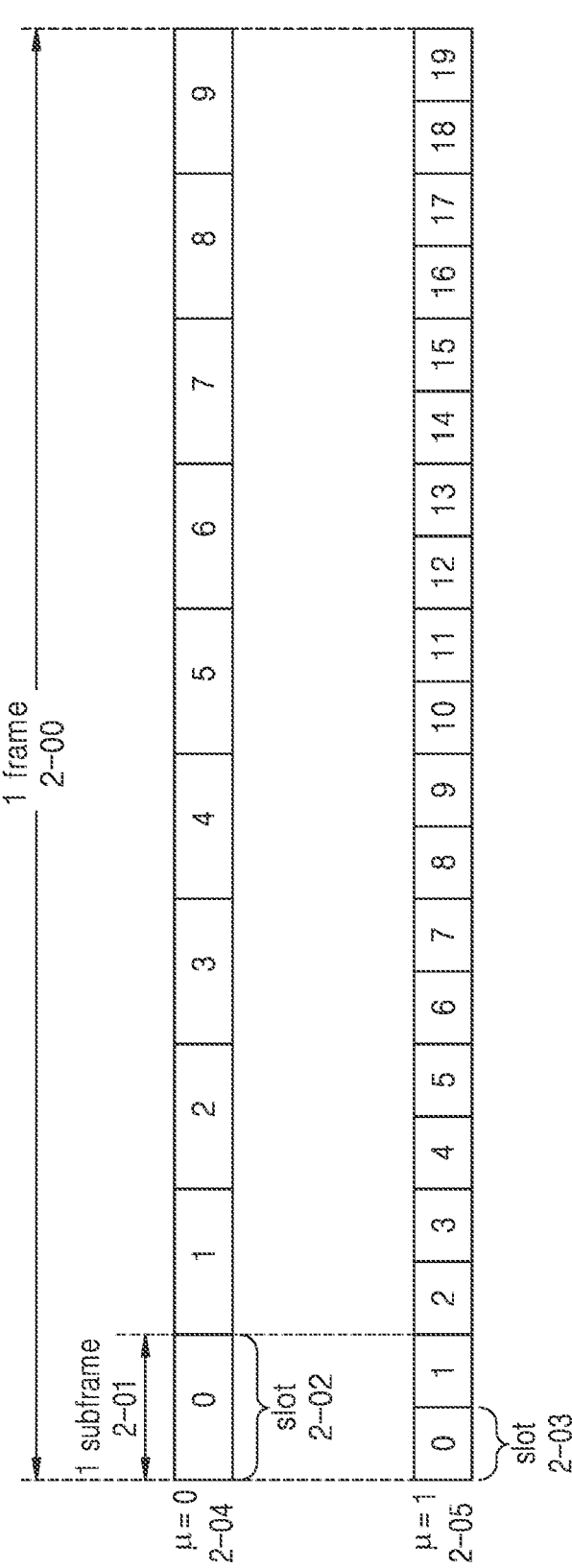
FIG. 2 is a diagram for describing an example of a slot structure used in a wireless communication system according to an embodiment of the disclosure.

FIG. 2 is a diagram for describing an example of a slot structure used in a wireless communication system according to an embodiment of the disclosure.

Referring to FIG. 2, one frame 2-00 may be composed of one or more subframes 2-01, and one subframe may be composed of one or more slots 2-02. For example, the one frame 2-00 may be defined as 10 ms. The one subframe 2-01 may be defined as 1 ms, and in this case, the one frame 2-00 may be composed of a total of 10 subframes 2-01. One slot 2-02 and 2-03 may be defined as 14 OFDM symbols. In other words, the number of symbols per slot ($N_{symb}{}^{slot}$) may have a value of "14". The one subframe 2-01 may be composed of one or more slots 2-02 and 2-03, and the number of slots 2-02 and 2-03 per sub-frame 2-01 may differ depending on a configuration value (μ) 2-04 and 2-05 for a subcarrier spacing. In FIG. 2, a case 2-04 in which a subcarrier spacing configuration value has a μ value of "0" and a case 2-05 in which a subcarrier spacing configuration value μ has a value of "1" are shown as an example. When μ=0 (2-04), the one sub-frame 2-01 may be composed of one slot 2-02, and when μ=1 (2-05), the one subframe 2-01 may be composed of two slots 2-03. In other words, the number of slots per subframe $$\left(N_{slot}^{subframe,\mu}\right)$$

may vary depending on the configuration value for a subcarrier spacing (μ), and accordingly, the number of slots per frame $$\left(N_{slot}^{frame,\mu}\right)$$

may vary. The number of slots per subframe $$\left(N_{slot}^{subframe,\mu}\right)$$

and the number $$N_{slot}^{frame,\mu}$$

per frame according to the subcarrier spacing configuration value μ may be defined as in Table 1 shown below.

TABLE 1

| μ | $N_{symb}{}^{slot}$ | $N_{slot}{}^{frame,\,\mu}$ | $N_{slot}{}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR system, one component carrier (CC) or serving cell may be composed of a maximum of 250 or more RBs. Accordingly, when the UE always receives an entire serving cell bandwidth, as in LTE, power consumption of the UE may be extreme. To resolve the above, a BS may configure one or more bandwidth parts (BWPs) to the UE and support so that the UE may change a reception area within a cell. In the NR system, the BS may configure a control resource set (CORESET) #0 or an initial BWP, which is a bandwidth of a common search space (CSS), to the UE through a master information block (MIB). Thereafter, the BS may configure a first BWP of the UE through a radio resource control (RRC) signaling and notify the UE of BWP configuration information, which may be later indicated through downlink control information (DCI). Thereafter, the BS may notify a BWP ID to the UE through the DCI so as to indicate, to the UE, regarding a band the UE is to use. When the UE does not receive the DCI in a currently assigned BWP for a specific time or more, the UE may return to a default BWP' and attempt to receive the DCI.

Figure 3:
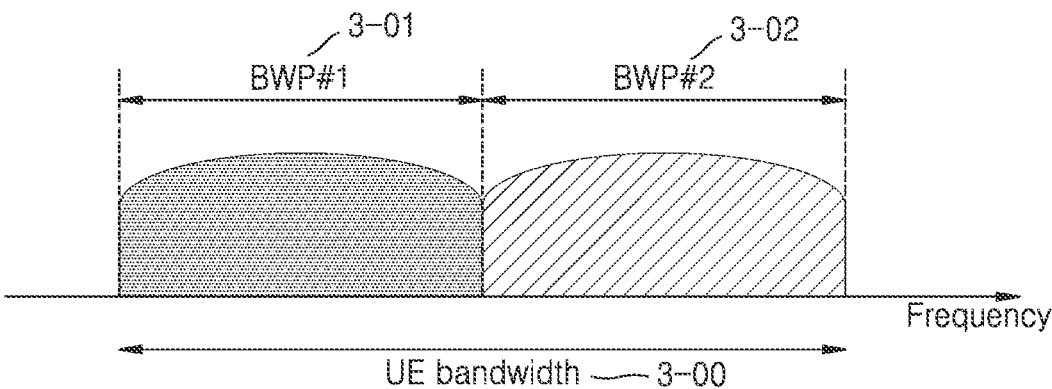
FIG. 3 is a diagram illustrating an example of a configuration of a bandwidth part (BWP) of a wireless communication system according to an embodiment of the disclosure.

FIG. 3 is a diagram illustrating an example of a configuration of a BWP in a wireless communication system according to an embodiment of the disclosure.

Referring to FIG. 3, FIG. 3 shows an example in which a UE bandwidth 3-00 is composed of two BWPs, that is, BWP #1 3-05 and BWP #2 3-10. The BS may configure one or more BWPs to the UE, and information as in Table 2 shown below may be configured to each of the BWPs.

TABLE 2

| BWP ::= | SEQUENCE{ |
|---|---|
| bwp-Id | BWP-Id, |
| (BWP identity) | |
| locationAndBandwidth | INTEGER(1..65536), |
| (BWP location) | |
| subcarrierSpacing | ENUMERATED {n0, n1, n2, n3, n4, n5} |
| (Subcarrier spacing) | |
| cyclicPrefix | ENUMERATED { extended} |
| (Cyclic prefix) | |
| ) | |

However, embodiments according to the disclosure are not limited to the example described above, and various BWP-related parameters may be configured to the UE, in addition to the configuration information described above. The information described above may be transmitted from the BS to the UE through a signaling (for example, an RRC signaling). At least one BWP from among the one or more configured BWPs may be activated. Information about whether a configured BWP is activated may be semi-statically transmitted from the BS to the UE through the RRC signaling or may be dynamically transmitted through a MAC CE or DCI.

According to an embodiment, the UE before RRC connection may be configured with an initial BWP for initial access from the BS through an MIB. More specifically, to receive system information necessary for an initial access through the MIB in an initial access stage, the UE may receive configuration information for a control resource set (CORESET) and a search space, in which a physical downlink control channel (PDCCH) may be transmitted. For example, the system information may include remaining system information (RMSI) or a system information block 1 (SIB1). Each of the control region and the search space, which are configured through the MIB, may be considered as an identity (ID) 0.

The BS may notify, to the UE through the MIB, configuration information, such as frequency assignment information, time assignment information, and numerology. In addition, the BS may notify, to the UE through the MIB, a monitoring period for the control region #0 and configuration information for an occasion for control region #0, that is, configuration information for a search space #0. The UE may consider a frequency domain configured as the control region #0 obtained through the MIB as the initial BWP for an initial access. In this case, an ID of the initial BWP may be considered as 0.

The configuration for a BWP supported in the next-generation mobile communication system (5G or NR system) may be used for various purposes.

For example, when a bandwidth supported by the UE is smaller than a system bandwidth, a configuration for a BWP may be used. For example, a frequency location (configuration information 2) of a BWP is configured to the UE in Table 2 so that the UE may transmit and receive data at a specific frequency location within the system bandwidth.

In another example, for the purpose of supporting different numerologies, the BS may configure a plurality of BWPs to the UE. For example, to support data transmission and reception using both a subcarrier spacing of 15 kHz and a subcarrier spacing of 30 kHz to and from an arbitrary UE, two BWPs may be configured to respectively use the subcarrier spacings of 15 kHz and 30 kHz. The different BWPs may be frequency division multiplexed (FDM), and when data is to be transmitted and received at a specific subcarrier spacing, a BWP configured with the corresponding subcarrier spacing may be activated.

In another example, for the purpose of reducing power consumption of the UE, the BS may configure, to the UE, BWPs having bandwidths of different magnitude. For example, when the UE supports a very large bandwidth, for example, a bandwidth of 100 MHz, and always transmits and receives data in the corresponding bandwidth, very large power consumption may be caused. In particular, in a no traffic situation, it is very inefficient in terms of power consumption that the UE monitors a DL control channel for the unnecessarily large bandwidth of 100 MHz. Accordingly, for the purpose of reducing power consumption of the UE, the BS may configure, to the UE, a BWP of a relatively small bandwidth, for example, a BWP of 20 MHz. In a no traffic situation, the UE may perform monitoring in the BWP of 20 MHz, and when data is generated, transmit and receive data by using the BWP of 100 MHz in response to an indication by the BS.

In the method of configuring the BWP described above, UEs before being RRC connected may receive configuration information for an initial BWP through the MIB at an initial access stage. More specifically, the UE may be configured, from an MIB of a physical broadcast channel (PBCH), with a control region or CORESET for a DL control channel on which DCI for scheduling an SIB may be transmitted. A bandwidth of the control region configured through the MIB may be considered as an initial BWP, and through the configured initial BWP, the UE may receive a physical downlink shared channel (PDSCH) on which the SIB is transmitted. In addition to the purpose of receiving the SIB, the initial BWP may also be utilized for other system information (OSI), paging, and random access.

A synchronization signal (SS)/PBCH block (SSB) of the next-generation mobile communication system (5G or NR system) is described below.

The SS/PBCH block may denote a physical layer channel block composed of a primary SS (PSS), a secondary SS (SSS), and a PBCH. More specifically, the SS/PBCH block may be defined as shown below.

PSS: A signal that serves as a reference of DL time/frequency synchronization, and may provide some information of a cell ID.

SSS: A signal that serves as a reference of DL time/frequency synchronization, and may provide remaining information of the cell ID that is not provided by the PSS. Additionally, it may serve as a reference signal for demodulation of a PBCH.

PBCH: May provide essential system information necessary for transmission and reception of a data channel and a control channel of a UE. The essential system information may include search space-related control information indicating radio resource mapping information of a control channel, scheduling control information for an additional data channel on which system information is transmitted, or the like.

SS/PBCH block: An SS/PBCH block may be composed of a combination of a PSS, an SSS, and a PBCH. One or more SS/PBCH blocks may be transmitted within 5 ms, and each of the transmitted SS/PBCH blocks may be identified as an index.

The UE may detect the PSS and SSS at the initial access stage and decode the PBCH. The UE may obtain the MIB from the PBCH and may be configured with the control region #0 through the MIB. The UE may monitor the control region #0 on the assumption that the selected SS/PBCH block and a demodulation reference signal (RS) (DMRS) transmitted in the control region #0 are quasi co located (QCL). The UE may receive system information through the DL control information transmitted in the control region #0. The UE may obtain, from the received system information, configuration information related to a random access channel (RACH) necessary for an initial access. The UE may transmit a physical RACH (PRACH) to the BS by considering an index of the selected SS/PBCH, and the BS receiving the PRACH may obtain information about the index of the SS/PBCH block selected by the UE. The BS may be aware of, based on the obtained information about the index of the SS/PBCH block, which block is selected from among the SS/PBCH blocks, and that the UE monitors the control region #0 corresponding to the selected SS/PBCH block.

Downlink control information (hereinafter, referred to as "DCI") in the next-generation mobile communication system (5G or NR system) is described in detail below.

In the next-generation mobile communication system (5G or NR system), scheduling information for UL data (or a physical uplink shared channel (PUSCH)) or DL data (or a PDSCH) may be transmitted from the BS to the UE through the DCI. The UE may monitor a DCI format for a fallback and a DCI format for a non-fallback with respect to a PUSCH and PDSCH. The DCI format for the fallback may include a field predefined between the BS and the UE, and the DCI format for the non-fallback may include a field that is configurable.

The DCI may be transmitted on a PDCCH, which is a physical downlink control channel, through a channel coding and modulation process. A cyclic redundancy check (CRC) may be attached to a payload of a DCI message, and the CRC may be scrambled by a radio network temporary identifier (RNTI) corresponding to the identity of the UE. Depending on the purpose of the DCI message, different RNTIs may be used for scrambling the CRC attached to the payload of the DCI message.

For example, purposes of the DCI message may include UE-specific data transmission, power control command, random access response, or the like. In other words, the RNTI may not be explicitly transmitted, but may be transmitted as being included in a CRC calculation process. When the DCI message transmitted on a PDCCH is received, the UE may check the CRC by using the assigned RNTI. When a result of the CRC checking is correct, the UE may identify that the corresponding message is transmitted to the UE.

For example, DCI for scheduling a PDSCH for system information (SI) may be scrambled by an SI-RNTI. DCI for scheduling a PDSCH for a random access response (RAR) message may be scrambled by a random access (RA)-RNTI. DCI for scheduling a PDSCH for a paging message may be scrambled by a paging-RNTI (P-RNTI). DCI for notifying a slot format indicator (SFI) may be scrambled by an SFI-RNTI. DCI for notifying transmit power control (TPC) may be scrambled by a TPC-RNTI. DCI for scheduling a UE-specific PDSCH or PUSCH may be scrambled by a cell RNTI (C-RNTI).

DCI format 0_0 may be used as DCI for a fallback for scheduling a PUSCH, and in this case, a CRC may be scrambled by the C-RNTI, a configured scheduling (CS)-RNTI, or a modulation coding scheme-cell-RNTI (MCS-C-RNTI). In an embodiment, DCI format 0_0, which is obtained by scrambling the CRC by the C-RNTI, may include information as shown in Table 3 below.

TABLE 3

Identifier for DCI formats - 1 bit
Frequency domain resource assignment - $\lceil \log_2(N_{RB}{}^{UL,BWP}(N_{RB}{}^{UL,BWP} + 1)/2)\rceil$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - 2 bits
UL/SUL indicator - 0 or 1 bit DCI format 0_1 may be used as DCI for a non-fallback for scheduling a PUSCH, and in this case, a CRC may be scrambled by a C-RNTI, a CS-RNTI, a semi persistent-channel state information-RNTI (SP-CSI-RNTI), or an MCS-C-RNTI. In an embodiment, the DCI format 0_1, which is obtained by scrambling the CRC by the C-RNTI, may include information as in Table 4 shown below.

TABLE 4

- Carrier indicator – 0 or 3 bits
- UL/SUL indicator – 0 or 1 bit
- Identifier for DCI formats –1 bits
- Bandwidth part indicator – 0, 1 or 2 bits
- Frequency domain resource assignment
    • For resource allocation type 0 , $N_{RBG}$ bits
    • For resource allocation type 1 , $\lceil \log_2(N_{RB}{}^{UL,BWP}(N_{RB}{}^{UL,BWP} +1)/2)\rceil$ bits
    • If both resource allocation type 0 and 1 are configured, $\max(\lceil \log_2(N_{RB}{}^{UL,BWP} (N_{RB}{}^{UL,BWP} + 1)/2)\rceil , N_{RBG} )+1$ bits
- Time domain resource assignment–1, 2, 3, 4, 5, or 6 bits
- Frequency hopping flag – 0 or 1 bit, only for resource allocation type 1.
    • 0 bit if only resource allocation type 0 is configured;
    • 1 bit otherwise
- Modulation and coding scheme – 5 bits
- New data indicator – 1 bit
- Redundancy version – 2 bits
- HARQ process number – 4 bits
- 1st downlink assignment index - 1 or 2 or 4 bits
    • 1 bit for semi-static HARQ-ACK codebook ;
    • 2 bits for dynamic HARQ-ACK codebook, or for enhanced dynamic HARQ-ACK codebook without UL-TotalDAI-Included-r16
    • 4 bits for enhanced dynamic HARQ-ACK codebook with UL-TotalDAI-Included-r16
- 2nd downlink assignment index – 0 or 2 bits
    • 2 bits for dynamic HARQ-ACK codebook, or for enhanced dynamic HARQ-ACK codebook without UL-TotalDAI-Included-r16 .
    • 4 bits for enhanced dynamic HARQ-ACK codebook with UL-TotalDAI-Included-r16
    • 0 bit otherwise.
- TPC command for scheduled PUSCH – 2 bits

- SRS resource indicator – $\left\lceil \log_2\left( \sum_{k=1}^{min\{L_{max},N_{SRS}\}} \binom{N_{SRS}}{k} \right) \right\rceil$ or $\lceil \log_2(N_{SRS})\rceil$ bits

• $\left\lceil \log_2\left( \sum_{k=1}^{min\{L_{max},N_{SRS}\}} \binom{N_{SRS}}{k} \right) \right\rceil$ bits for non-codebook based PUSCH transmission ;

• $\lceil \log_2(N_{SRS})\rceil$ bits for codebook based PUSCH transmission .
- Precoding information and number of layers –up to 6 bits
- Antenna ports – up to 5 bits
- SRS request – up to 3 bits
- CSI request – 0, 1, 2, 3, 4, 5, or 6 bits
- CBG transmission information – 0, 2, 4, 6, or 8 bits
- PTRS-DMRS association – 0 or 2 bits.
- beta_offset indicator – 0, 1, or 2 bits
- DMRS sequence initialization – 0 or 1 bit
- UL-SCH indicator –0 or 1 bit
- Open-loop power control parameter set indication – up to 2 bits
- SCell dormancy indication – up to 5 bits DCI format 0_2 may be used as DCI for a non-fallback for scheduling a PUSCH, and a DCI payload may be more flexibly configured than DCI format 0_1. In this case, a CRC may be scrambled by a C-RNTI, a CS-RNTI, an SP-CSI-RNTI, or an MCS-C-RNTI. In an embodiment, DCI format 0_2, which is obtained by scrambling the CRC by the C-RNTI, may include information as in Table 5 shown below.

TABLE 5

- Carrier indicator − up to 3 bits
- UL/SUL indicator − 0 or 1 bit
- Identifier for DCI formats − 1 bits
- Bandwidth part indicator − 0, 1 or 2 bits
- Frequency domain resource assignment
  - For resource allocation type 0 , $N_{RBG}$ bits
  - For resource allocation type 1 , $\lceil \log_2(N_{RBG,K1}(N_{RBG,K1} + 1)/2) \rceil$ bits
  - If both resource allocation type 0 and 1 are configured,
    $\max(\lceil \log_2(N_{RBG,K1}(N_{RBG,K1} + 1)/2) \rceil, N_{RBG}) + 1$ bits
- Time domain resource assignment −1, 2, 3, 4, 5, or 6 bits
- Frequency hopping flag − 0 or 1 bit, only for resource allocation type 1.
  - 0 bit if only resource allocation type 0 is configured;
  - 1 bit otherwise.
- Modulation and coding scheme − 5 bits
- New data indicator − 1 bit
- Redundancy version − up to 2 bits
- HARQ process number − up to 4 bits
- Downlink assignment index − 0 or 1 or 2 or 4 bits
  - 0 bit if the higher layer parameter Downlinkassignmentindex-ForDCIFormat0_2 is not configured
  1st downlink assignment index − 1 or 2 bits
    - 1 bit for semi-static HARQ-ACK codebook ;
    - 2 bits for dynamic HARQ-ACK codebook with single HARQ-ACK codebook
  2nd downlink assignment index − 0 or 2 bits
    - 2 bits for dynamic HARQ-ACK codebook with two HARQ-ACK sub-codebooks ;
    - 0 bit otherwise.
- TPC command for scheduled PUSCH − 2 bits
- SRS resource indicator − $\left\lfloor \log_2\left( \sum_{k=1}^{L_{max}} \binom{N_{SRS}}{k} \right) \right\rfloor$ or $\lceil \log_2(N_{SRS}) \rceil$ bits
  - $\left\lfloor \log_2\left( \sum_{k=1}^{L_{max}} \binom{N_{SRS}}{k} \right) \right\rfloor$ bits for non-codebook based PUSCH transmission;
  - $\lceil \log_2(N_{SRS}) \rceil$ bits for codebook based PUSCH transmission .
- Precoding information and number of layers −up to 6 bits
- Antenna ports − up to 5 bits
- SRS request − up to 3 bits
- CSI request − 0, 1, 2, 3, 4, 5, or 6 bits
- CBG transmission information − 0, 2, 4, 6, or 8 bits
- PTRS-DMRS association − 0 or 2 bits.
- beta_offset indicator − 0 or 2 bits
- DMRS sequence initialization − 0 or 1 bit
- UL-SCH indicator − 1 bit
- Open-loop power control parameter set indication − up to 2 bits
- SCell dormancy indication − up to 5 bits DCI format 1_0 may be used as DCI for a fallback for scheduling a PDSCH, and in this case, a CRC may be scrambled by a C-RNTI, a CS-RNTI, or an MCS-C-RNTI. In an embodiment, DCI format 1_0, which is obtained by scrambling the CRC by the C-RNTI, may include information as in Table 6 shown below.

TABLE 6

| | |
|---|---|
| - | Identifier for DCI formats - 1 bit |
| - | Frequency domain resource assignment - $\lceil \log_2(N_{RB}^{DL,BWP}(N_{RB}^{DL,BWP} + 1)/2) \rceil$ bits |
| - | Time domain resource assignment - 4 bits |

TABLE 6-continued

| | |
|---|---|
| - | Frequency hopping flag - 1 bit. |
| - | Modulation and coding scheme - 5 bits |
| - | New data indicator - 1 bit |
| - | Redundancy version - 2 bits |
| - | HARQ process number - 4 bits |
| - | Downlink assignment index - 2 bits |
| - | TPC command for scheduled PUCCH - 2 bits |
| - | PUCCH resource indicator - 3 bits |
| - | PDSCH-to-HARQ feedback timing indicator - 3 bits |

DCI format 1-1 may be used as DCI for a non-fallback for scheduling a PDSCH, and in this case, a CRC may be scrambled by a C-RNTI, a CS-RNTI, or an MCS-C-RNTI. In an embodiment, DCI format 1_1, which is obtained by scrambling the CRC by the C-RNTI, may include information as in Table 7 shown below.

TABLE 7

Carrier indicator - 0 or 3 bits
Identifier for DCI formats -1 bits
Bandwidth part indicator - 0, 1 or 2 bits
Frequency domain resource assignment
　For resource allocation type 0, $N_{RBG}$ bits
　For resource allocation type 1, $\lceil \log_2(N_{RB}^{DL,BWP}(N_{RB}^{DL,BWP} + 1)/2) \rceil$ bits
　If both resource allocation type 0 and 1 are configured, $$\max\left(\left\lceil \log_2 \frac{N_{RB}^{DL,DWP}\left(N_{RB}^{DL,BWP} + 1\right)}{2} \right\rceil, N_{RBG}\right) + 1 \text{ bits}$$

Time domain resource assignment - 0, 1, 2, 3, or 4 bits
VRB-to-PRB mapping - 0 or 1 bit, only for resource allocation type 1.
　0 bit if only resource allocation type 0 is configured;
　1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 2 or 4 or 6 bits
TPC command for scheduled PUCCH - 2 bits
PUCCH resource indicator - 3 bits
PDSCH-to-HARQ_feedback timing indicator - 3 bits
Antenna ports - up to 6 bits
Transmission configuration indication - 0 or 3 bits
SRS request - up to 3 bits
CBG transmission information - 0, 2, 4, 6, or 8 bits
DMRS sequence initialization - 0 or 1 bit
Open-loop power control parameter set indication - up to 2 bits
SCell dormancy indication - up to 5 bits DCI format 1_2 may be used as DCI for a non-fallback for scheduling a PDSCH, and the DCI payload may be more flexibly configured than DCI format 1_1. In this case, the CRC may be scrambled by a C-RNTI, a CS-RNTI, or an MCS-C-RNTI. In an embodiment, DCI format 1_2, which is obtained by scrambling the CRC by the C-RNTI, may include information as in Table 8 shown below.

TABLE 8

Figure 4:
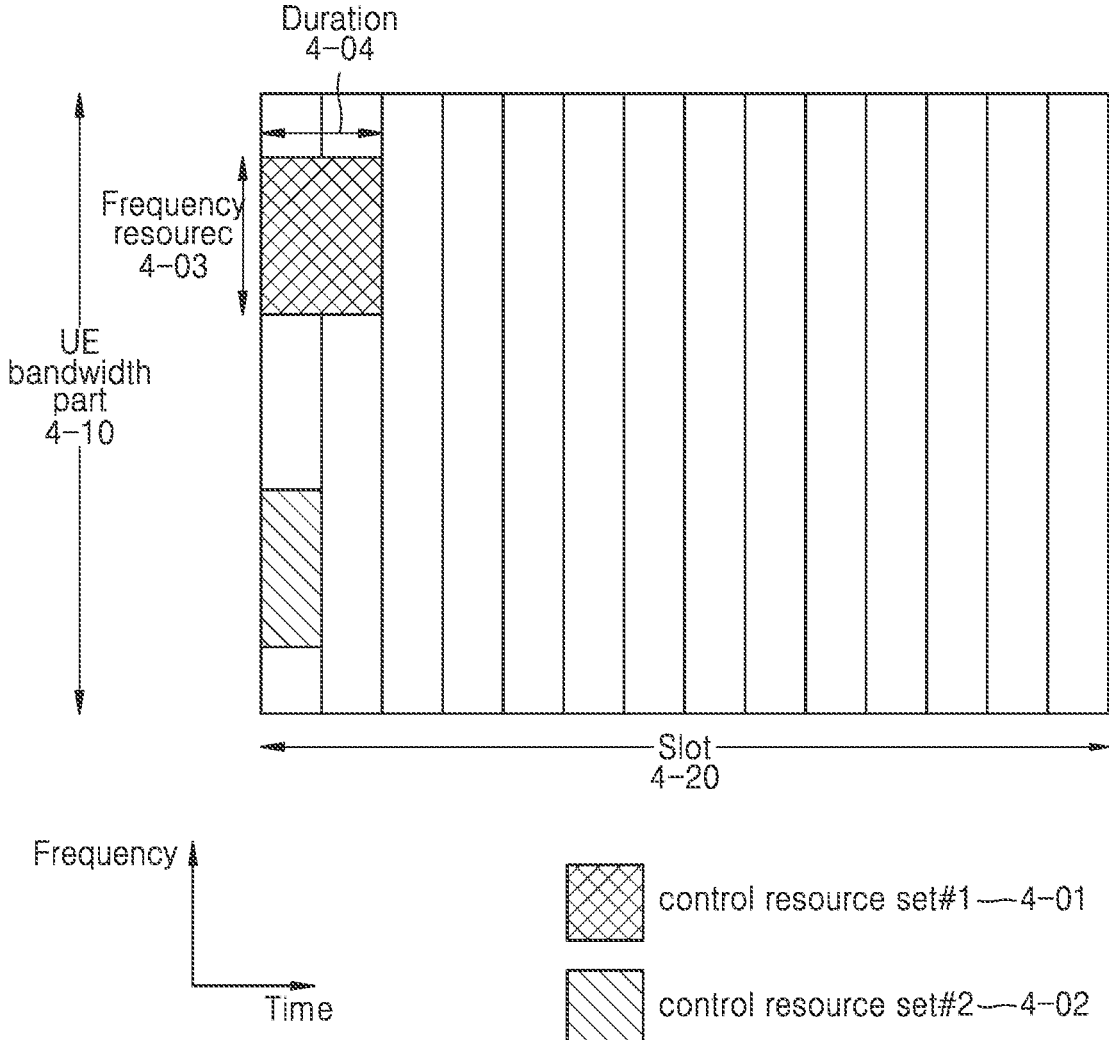
FIG. 4 is a diagram illustrating an example of a control resource set on which a downlink control channel is transmitted in a wireless communication system, according to an embodiment of the disclosure.

Carrier indicator - up to 3 bits
Identifier for DCI formats -1 bits
Bandwidth part indicator - 0, 1 or 2 bits TABLE 8-continued Frequency domain resource assignment
    For resource allocation type 0, $N_{RBG}$ bits
    For resource allocation type 1, $\lceil \log_2(N_{RBG,K2}(N_{RBG,K2} + 1)/2)\rceil$bits
    If both resource allocation type 0 and 1 are configured,
    $\max(\lceil \log_2(N_{RBG,K2}(N_{RBG,K2} + 1)/2)\rceil, N_{RBG}) + 1$ bits
Time domain resource assignment -0, 1, 2, 3, or 4 bits
VRB-to-PRB mapping - 0 or 1 bit, only for resource allocation type 1.
    0 bit if only resource allocation type 0 is configured:
    1 bit otherwise.
PRB bundling size indicator - 0 or 1 bit
Rate matching indicator - 0, 1, or 2 bits
ZP CSI-RS trigger - 0, 1, or 2 bits
Modulation and coding scheme - 5 bits
New data indicator - 1 bit
Redundancy version - up to 2 bits
HARQ process number - up to 4 bits
Downlink assignment index - 0, 1, 2 or 4 bits
TPC command for scheduled PUCCH - 2 bits
PUCCH resource indicator - up to 3 bits
PDSCH-to-HARQ_feedback timing indicator - up to 3 bits
Antenna ports - up to 6 bits
Transmission configuration indication - up to 3 bits
SRS request - up to 3 bits
CBG transmission information - 0, 2, 4, 6, or 8 bits TABLE 8-continued DMRS sequence initialization - 0 or 1 bit
Open-loop power control parameter set indication - up to 2 bits
SCell dormancy indication - up to 5 bits FIG. 4 is a diagram illustrating an example of a configuration of a control region of a DL control channel in a wireless communication system according to an embodiment of the disclosure. FIG. 4 is a diagram illustrating an example of a control region (CORESET) in which a DL control channel is transmitted in a 5G wireless communication system, according to an embodiment of the disclosure.

Referring to FIG. 4, FIG. 4 shows an embodiment in which a UE BWP 4-10 is configured on the frequency domain, and a control region #1 4-01 and a control region #2 4-02 are configured within one slot 4-20 on the time domain. The two control regions 4-01 and 4-02 may be configured to a specific frequency resource 4-03 within the entire UE BWP 4-10 on the frequency domain. The control regions 4-01 and 4-02 may be configured with one or more OFDM symbols on the time domain, and those may be defined as a control resource set duration 4-04. Referring to FIG. 4, the control region #1 4-01 may be configured to a control resource set duration of two symbols, and the control region #2 4-02 may be configured to a control resource set duration of one symbol.

In the next-generation mobile communication system (5G or NR system) described above, the control region may be configured by performing a higher layer signaling on the UE by the BS. For example, the higher layer signaling may include SI, an MIB, and an RRC signaling. To configure the control region to the UE denotes to provide information, such as identity, frequency location, or symbol duration of the control region. For example, the configuration of the control region may include information as in Table 9 shown below.

TABLE 9

| | |
|---|---|
| ControlResourceSet ::= | SEQUENCE { |
|   -- Corresponds to L1 parameter 'CORESET-ID' | |
|   controlResourceSetId | ControlResourceSetId, |
|   (Identity of control region) | |
|   frequencyDomainResources | BIT STRING (SIZE (45)), |
|     (Frequency domain resource assignment information) | |
|   duration | INTEGER (1..maxCoReSetDuration), |
|   (Time domain resource assignment information) | |
|   cce-REG-MappingType | CHOICE { |
|     (CCE-to-REG mapping scheme) | |
|     interleaved | SEQUENCE { |
|       reg-BundleSize | ENUMERATED {n2, n3, n6}, |
|       precoderGranularity | ENUMERATED {sameAsREG |
|     bundle, allContiguousRBs}, | |
|       interleaverSize | ENUMERATED {n2, n3, n6} |
|       (Size of interleaver) | |
|       shiftIndex | |
|       INTEGER (0..maxNrofPhysicalResourceBlocks−1) | |
|       (Interleaver shift) | |
|       }, | |
|     nonInterleaved | NULL |
|   }, | |
|   tci-StatesPDCCH | SEQUENCE(SIZE (1..maxNrofTCI- |
|     StatesPDCCH)) OF TCI-StateId | OPTIONAL |
|     (QCL configuration information) | |
|   tci-PresentInDCI | ENUMERATED {enabled} |
| } | |

In Table 9, the tci-StatesPDCCH (hereinafter, referred to as "TCI state") configuration information may include information about an index of one or more SS/PBCH blocks in a Quasi co located (QCL) relationship with a DMRS transmitted in the corresponding control region, or information about an index of a channel state information reference signal (CSI-RS).

In a wireless communication system, one or more different antenna ports (or, they may be replaced with one or more channels, signals, and any combinations thereof, but, in the later description of the disclosure, they are collectively referred to as different antenna ports, for convenience of explanation) may be associated by a QCL configuration as in Table 10 shown below.

TABLE 10

```
QCL-Info ::=        SEQUENCE {
    cell                    ServCellIndex (index of serving cell in which QCL reference RS
        is transmitted)
    bwp-Id                  BWP-Id (Index of BWP in which QCL reference RS is
        transmitted)
    referenceSignal     CHOICE ((Indicator indicating one of CSi-RS or SS/PBCH block
        as QCL reference RS)
        csi-rs                  NZP-CSI-RS-ResourceId,
        ssb                     SSB-Index
    },
    qcl-Type            ENUMERATED (typeA,typeB,typeC,typeD), (QCL type
    indicator)
    ...
}
```

Specifically, the QCL configuration may associate two different antenna ports in a relationship of a (QCL) target antenna port and a (QCL) reference antenna port, and when the target antenna port is received, the UE may apply (or assume) all or part of statistical characteristics (for example, large-scale parameters of a channel, such as Doppler shift, Doppler spread, average delay, delay spread, or average gain, or a reception space filter coefficient or transmission space filter coefficient of the UE) of a channel measured in the reference antenna port. The target antenna port described above denotes an antenna port that transmits a channel or signal configured by higher layer configuration including the QCL configuration described above, or an antenna port that transmits a channel or signal to which a TCI state indicating the QCL configuration described above is applied. The reference antenna port described above denotes an antenna port that transmits a channel or signal indicated (specified) by parameters (for example, referenceSignal) representing a reference signal within the QCL configuration.

Specifically, statistical characteristics of a channel limited (indicated by parameters representing a type of QCL, for example, qcl-Type, within the QCL configuration described above) by the QCL configuration may be classified as shown below, according to a QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

At this time, the QCL type is not limited to the four types described above, but all possible combinations are not listed herein, so as not to obscure the gist of the description. The QCL-TypeA as described above is a QCL type that is used when a bandwidth and transmission period of the reference antenna port is sufficient so that all statistical characteristics measurable on the frequency and time domains may be referred to the target antenna port (for example, when the number of samples and transmission band/time of the reference antenna port is greater than the number of samples and transmission band/time of the target antenna port). The QCL-TypeB is a QCL type that is used when a transmission period of the reference antenna port is sufficient to measure statistical characteristics measurable on the time domain, that is, Doppler shift or Doppler spread.

The QCL-TypeC is a QCL type that is used when the bandwidth and transmission period of the reference antenna port is insufficient to measure second-order statistics, that is, Doppler spread and delay spread, and only first-order statistics, that is, Doppler shift and average delay, may be referred to. The QCL-TypeD is a QCL type that is configured when space reception filter values used when receiving the reference antenna port may be used when receiving the target antenna port.

Meanwhile, the BS may configure or indicate up to two QCL configurations to one target antenna port through the TCI state configuration as in Table 11a shown below.

TABLE 11a

```
TCI-State::=                                          SEQUENCE {
    tci-StateId                                       TCI-StateId, (TCI state indicator)
    qcl-Type1                                         QCL-Info,(First QCL configuration
        for target antenna port to which corresponding TCI state is applied)
    qcl-Type2                                         QCL-Info (Second QCL configuration
        for target antenna port to which corresponding TCI state is applied)
                                                      OPTIONAL, -- Need R
    ...
}
```

From among two QCL configurations included in one TCI state configuration, a first QCL configuration may be configured as one of QCL-TypeA, QCL-TypeB, and QCL-TypeC. In this case, a QCL type that may be configured is specified according to types of a target antenna port and a reference antenna port, which is described in detail below. In addition, from among the two QCL configurations included in the one TCI state configuration, a second QCL configuration may be configured as QCL-TypeD and may be omitted in some cases.

Tables 11ba to Table 11be shown below are tables showing valid TCI state configurations according to the type of the target antenna port.

Table 11ba show valid TCI state configurations when the target antenna port is a CSI-RS for tracking (TRS). The TRS described above denotes a non-zero power (NZP) CSI-RS in which repetition parameters are not configured and trs-Info is configured as true from among the CSI-RS. In Table 11ba, configuration 3 may be used for an aperiodic TRS.

TABLE 11ba

| Valid TCI state Config-uration | DL RS 1 | qcl-Type1 | DL RS 2 (if configured) | qcl-Type2 (if configured) |
|---|---|---|---|---|
| Valid TCI state configurations when target antenna port is CSI-RS for tracking (TRS) | | | | |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 11bb shows valid TCI state configurations when the target antenna port is a CSI-RS for CSI. From among CSI-RSs, the CSI-RS for CSI described above denotes an NZP CSI-RS which is not used for beam management (for example, repetition parameters are not configured) and in which trs-Info is not configured as true.

TABLE 11bb

| Valid TCI state Config-uration | DL RS 1 | qcl-Type1 | DL RS 2 (if configured) | qcl-Type2 (if configured) |
|---|---|---|---|---|
| Valid TCI state configurations when target antenna port is CSI-RS for CSI | | | | |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 11bc shows valid TCI state configurations when the target antenna port is a CSI-RS for beam management (BM, which means the same as a CSI-RS for L1 RSRP reporting). From among CSI-RSs, the CSI-RS for BM denotes an NZP CSI-RS in which repetition parameters are configured so as to enable the CSI-RS to have an on or off value, and in which trs-Info is not configured as true.

TABLE 11bc

| Valid TCI state Config-uration | DL RS 1 | qcl-Type1 | DL RS 2 (if configured) | qcl-Type2 (if configured) |
|---|---|---|---|---|
| Valid TCI state configurations when target antenna port is CSI-RS for BM (for L1 RSRP reporting) | | | | |
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 11bd shows valid TCI state configurations when the target antenna port is a PDCCH DMRS.

TABLE 11bd

| Valid TCI state Config-uration | DL RS 1 | qcl-Type1 | DL RS 2 (if configured) | qcl-Type2 (if configured) |
|---|---|---|---|---|
| Configuration of a valid TCI state when target antenna port is PDCCH DMRS | | | | |
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 11be shows valid TCI state configurations when the target antenna port is a PDSCH DMRS.

TABLE 11be

| Valid TCI state Config-uration | DL RS 1 | qcl-Type1 | DL RS 2 (if configured) | qcl-Type2 (if configured) |
|---|---|---|---|---|
| Valid TCI state configurations when target antenna port is PDSCH DMRS. | | | | |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method according to Table 11ba to Table 11be shown above is to configure and operate the target antenna port and the reference antenna port for each stage as "SSB"→"TRS"→"CSI-RS for CSI, or CSI-RS for BM, or PDCCH DMRS, or PDSCH DMRS". Through this, it is possible to assist a reception operation of the UE by linking statistical characteristics that may be measured from an SSB and a TRS to each of the antenna ports.

Figure 5:
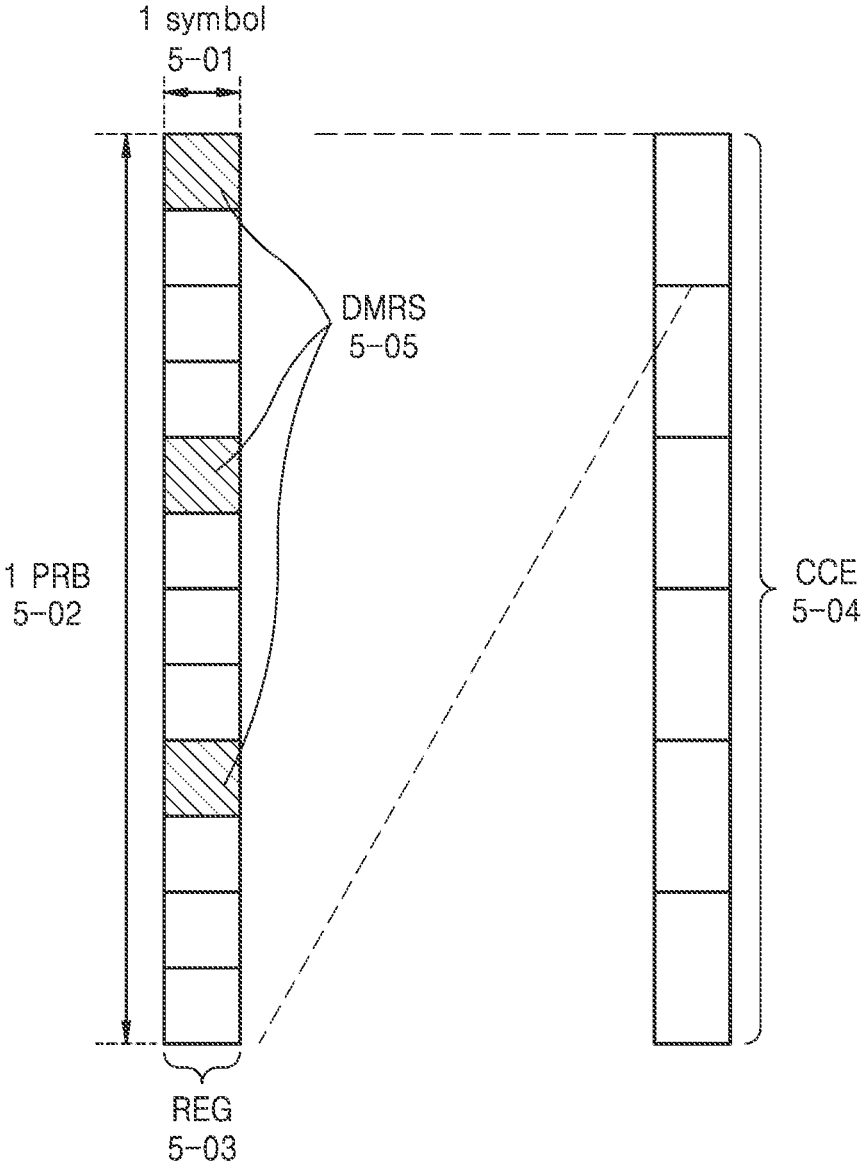
FIG. 5 is a diagram illustrating a structure of a downlink control channel of a wireless communication system according to an embodiment of the disclosure.

FIG. 5 is a diagram illustrating a structure of a DL control channel of a wireless communication system according to an embodiment of the disclosure. In other words, FIG. 5 is a diagram illustrating an example of a basic unit of time and frequency resources constituting a DL control channel that may be used in a 5G wireless communication system, according to an embodiment of the disclosure.

Referring to FIG. 5, the basic unit of the time and frequency resources constituting the control channel may be defined as a resource element group (REG) 5-03. The REG 5-03 may be defined as one OFDM symbol 5-01 on the time domain and one physical resource block 5-02 on the frequency domain, that is, 12 subcarriers. The BS may configure a unit of DL control channel assignment by concatenating the REGs 5-03.

As shown in FIG. 5, when a basic unit for assigning a DL control channel in a 5G wireless communication system is a control channel element (CCE) 5-04, one CCE 5-04 may be composed of a plurality of REGs 5-03. For example, when the REG 5-03 shown in FIG. 5 may be composed of 12 REs and one CCE 5-04 is composed of six REGs 5-03, one CCE 5-04 may be composed of 72 REs. When the DL control region is configured, the corresponding region may be configured as a plurality of CCEs 5-04, and a specific DL control channel may be transmitted as being mapped to one or more CCEs 5-04 according to an aggregation level (AL) within the control region. The CCEs 5-04 within the control region are identified by number, and in this case, the numbers of the CCEs 5-04 may be assigned according to a logical mapping method.

A basic unit of the DL control channel shown in FIG. 5, that is, the REG 5-03, may include both REs, to which DCI is mapped, and an area to which a DMRS that is a reference signal for decoding the same is mapped. As shown in FIG. 5, 3 DMRSs 5-05 may be transmitted within one REG 5-03. The number of CCEs necessary for transmitting a PDCCH may be 1, 2, 4, 8, and 16 depending on an AL, and different numbers of CCEs may be used to realize link adaptation of a DL control channel. For example, when AL=L, one DL control channel may be transmitted on L CCEs.

The UE has to detect a signal without knowing information about the DL control channel, and a search space representing a set of CCEs may be defined for blind decoding. The search space is a set of DL control channel candidates composed of CCEs in which the UE has to attempt decoding on a given AL. Because there are various ALs that make one bundle with 1, 2, 4, 8, and 16 CCEs, the UE may include a plurality of search spaces. A search space set may be defined as a set of search spaces at all configured ALs.

The search space may be classified into a common search space and a UE-specific search space. According to an embodiment of the disclosure, a certain group of UEs or all UEs may examine a common search space of a PDCCH in order to receive cell-common control information, such as dynamic scheduling for system information or a paging message.

For example, the UE may examine the common search space of the PDCCH to receive PDSCH scheduling assignment information for transmission of an SIB that includes operator information of a cell or the like. In the common search space, a certain group of UEs or all UEs have to receive the PDCCH, and thus, the common search space may be defined as a set of pre-appointed CCEs. Meanwhile, the UE may examine the UE-specific search space of the PDCCH to receive scheduling assignment information for a UE-specific PDSCH or PUSCH. The UE-specific search space is a function of the UE identity and various system parameters, and may be defined in a UE-specific manner.

In the 5G communication system, parameters for the search space of the PDCCH may be configured from the BS to the UE through a higher layer signaling (e.g., an SIB, a MIB, or an RRC signaling). For example, the BS may configure, to the UE, the number of PDCCH candidates at each AL L, a monitoring periodicity for the search space, monitoring occasion of symbol units in the slot for the search space, a search space type (common search space or UE-specific search space), a combination of RNTI and DCI format to be monitored in the search space, a control resource set index for monitoring the search space, etc. For example, the configuration described above may include information as in Table 12 shown below.

TABLE 12

```
SearchSpace ::=                          SEQUENCE {
    -- Identity of the search space, SearchSpaceId = 0 identifies the
        SearchSpace configured via PBCH (MIB) or ServingCellConfigCommon.
    searchSpaceId                        SearchSpaceId,
        (Identity of search space)
    controlResourceSetId                 ControlResourceSetId
        (Identity of control region)
    monitoringSlotPeriodicityAndOffset      CHOICE {
        (Monitoring slot level periodicity)
            sl1                          NULL,
            sl2                          INTEGER (0..1),
            sl4                          INTEGER (0..3),
            sl5                          INTEGER (0..4),
            sl8                          INTEGER (0..7),
            sl10                         INTEGER (0..9),
            sl16                         INTEGER (0..15),
            sl20                         INTEGER (0..19),
    }
    duration (Monitoring duration)       INTEGER (2..2559)
    monitoringSymbolsWithinSlot              BIT STRING (SIZE (14))
        (Monitoring symbol within slot)
    nrofCandidates                       SEQUENCE {
        (Number of PDCCH candidates for each AL)
            aggregationLevel1            ENUMERATED {n0, n1, n2, n3, n4,
            n5, n6, n8},
            aggregationLevel2            ENUMERATED {n0, n1, n2, n3, n4,
            n5, n6, n8},
            aggregationLevel4            ENUMERATED {n0, n1, n2, n3, n4,
            n5, n6, n8},
            aggregationLevel8            ENUMERATED {n0, n1, n2, n3, n4,
            n5, n6, n8},
            aggregationLevel16               ENUMERATED {n0, n1, n2, n3,
            n4, n5, n6, n8},
    }
    searchSpaceType                      CHOICE {
        (Type of search space)
        -- Configures this search space as common search space (CSS) and
        DCI formats to monitor
        common                           SEQUENCE {
        (Common search space)
        },
        ue-Specific                      SEQUENCE {
        (UE-specific search space)
        -- Indicates whether the UE monitors in this USS for DCI
        formats 0-0 and 1-0 or for formats 0-1 and 1-1.
            formats                          ENUMERATED {formats 0-0-And-
        1-0, formats0-1-And-1-1},
            ...
    }
```

The BS may configure one or more search space sets to the UE based on configuration information. According to an embodiment of the disclosure, the BS may configure, to the UE, a search space set 1 and a search space set 2. The BS may configure the UE to monitor a DCI format A scrambled by an X-RNTI in the search space set 1 in the common search space, and to monitor a DCI format B scrambled by a Y-RNTI in the search space set 2 in the UE-specific search space.

According to the configuration information, one or more search space sets may be present in the common search space or UE-specific search space. For example, search space set #1 and search space set #2 may be configured as the common search space, and search space set #3 and search space set #4 may be configured as the UE-specific search space.

The common search space may be classified into a search space set of a specific type according to the purpose. RNTIs to be monitored may be different for each type of the determined search space set. For example, types of the common search space, purposes, and RNTIs to be monitored may be classified as in Table 13 shown below.

CS-RNTI (Configured Scheduling RNTI): For semi-statically configured UE-specific PDSCH scheduling RA-RNTI (Random Access RNTI): For PDSCH scheduling in random access phase P-RNTI (Paging RNTI): For PDSCH scheduling for paging transmission SI-RNTI (System Information RNTI): For PDSCH scheduling for transmitting system information INT-RNTI (Interruption RNTI): For notifying whether PDSCH is punctured TPC-PUSCH-RNTI (Transmit Power Control for PUSCH RNTI): For indicating power control command for PUSCH TPC-PUCCH-RNTI (Transmit Power Control for PUCCH RNTI): For indicating power control command for PUCCH TPC-SRS-RNTI (Transmit Power Control for SRS RNTI): For indicating power control command for SRS SP-CSI-RNTI (Semi persistent CSI RNTI): For indicating semi-static CSI report command According to an embodiment of the disclosure, in the 5G wireless communication system, a plurality of search space sets may be configured to different parameters (for example,

TABLE 13

| Type of search space | Purpose | RNTI |
|---|---|---|
| Type0 CSS | Transmit PDCCH for scheduling SIB | SI-RNTI |
| Type0A CSS | Transmit PDCCH for scheduling SI (SIB2, etc.) other than SIB1 | SI-RNTI |
| Type1 CSS | Transmit PDCCH for Random Access Response (RAR) scheduling, Msg3 retransmission scheduling, and Msg4 scheduling | RA-RNTI, TC-RNTI |
| Type2 CSS | Paging | P-RNTI |
| Type3 CSS | Transmit group control information | INT-RNTI, SFI-RNTI, TPC-PUSCH-RNTI, TPC-PUCCH-RNTI, TPC-SRS-RNTI |
| | In case of Pcell, transmit PDCCH for data scheduling | C-RNTI, MCS-C-RNTI, CS-RNTI |

Meanwhile, in the common search space, combinations of a DCI format and an RNTI shown below may be monitored. However, the disclosure is not limited to the example below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the combinations of the DCI format and the RNTI shown below may be monitored. However, the disclosure is not limited to the example below.

DCI format 0_0/1_0 with CRC scrambled by C-RNTI, CS-RNTI, TC-RNTI

DCI format 0_1/0_2 with CRC scrambled by C-RNTI, CS-RNTI, TC-RNTI, SP-CSI-RNTI

DCI format 1_1/1_2 with CRC scrambled by C-RNTI, CS-RNTI, TC-RNTI

The RNTIs specified above may follow the following definitions and uses.

C-RNTI (Cell RNTI): For UE-specific PDSCH scheduling

TC-RNTI (Temporary Cell RNTI): For UE-specific PDSCH scheduling parameters in Table 12). Accordingly, the set of search space sets monitored by the UE may vary at each time point. For example, when the search space set #1 is configured at an X-slot interval, the search space set #2 is configured at a Y-slot interval, and X and Y are different, the UE may monitor both the search space set #1 and the search space set #2 in a specific slot, and monitor one of the search space set #1 or the search space set #2 in another specific slot.

When a plurality of search space sets are configured in the UE, in order to determine a search space set to be monitored by the UE, the following conditions may be considered.

[Condition 1: Limitation of Maximum Number of PDCCH Candidates]

The number of PDCCH candidates that may be monitored per slot may not exceed Mu. Mu may be defined as a maximum number of PDCCH candidates per slot in a cell configured at a subcarrier spacing of $15.2^\mu$ KHz.

TABLE 14

| μ | Maximum number of PDCCH candidates per slot and per serving cell ($M^\mu$) |
|---|---|
| 0 | 44 |
| 1 | 36 |
| 2 | 22 |
| 3 | 20 |

25
26

[Condition 2: Limitation of Maximum Number of CCEs]

The number of CCEs included in the entire search space per slot (here, the entire search space may denote the entire CCE set corresponding to a union region of a plurality of search space sets) may not be greater than $C^\mu$. $C^\mu$ may be defined as a maximum number of CCEs per slot in a cell configured at a subcarrier spacing of $15.2^\mu$ kHz.

TABLE 15

| $\mu$ | Maximum number of CCEs per slot and per serving cell ($C^\mu$) |
|---|---|
| 0 | 56 |
| 1 | 56 |
| 2 | 48 |
| 3 | 32 |

For convenience of explanation, a situation in which both conditions 1 and 2 above are satisfied at a specific point may be defined as a "condition A". Accordingly, failure to satisfy condition A may mean failure to satisfy at least one of conditions 1 and 2 described above.

Depending on the configuration of the search space sets of the BS, a case in which condition A is not satisfied may occur at a specific time point. When condition A is not satisfied at a specific point, the UE may select and monitor only some of search space sets configured to satisfy condition A at the specific time point, and the BS may transmit a PDCCH to the selected search space set.

According to an embodiment of the disclosure, by using a method of selecting some search spaces from among the entire configured search space set, the following method may be followed.

[Method 1]

When condition A for a PDCCH is not satisfied at a specific time point (slot),

From among the search space sets present at the corresponding time point, the UE (or BS) may preferentially select a search space set in which a search space type is configured as a common search space to a search space set in which a search space type is configured as a UE-specific search space.

When all search space sets configured as common search spaces are selected (that is, when condition A is satisfied even after all search spaces configured as common search spaces are selected), the UE (or BS) may select search space sets configured as UE-specific search spaces. In this case, when the number of search space sets configured as the UE-specific search spaces is plural, a search space set having a lower search space set index may have a higher priority. Considering the priority, the UE or BS may select UE-specific search space sets within a range in which condition A is satisfied.

Methods for assigning time and frequency resources for data transmission in NR are described below.

In the NR wireless communication system, in addition to frequency domain resource candidate assignment through BWP indication, detailed methods of frequency domain resource allocation (FD-RA) as described below may be provided.

Figure 6:
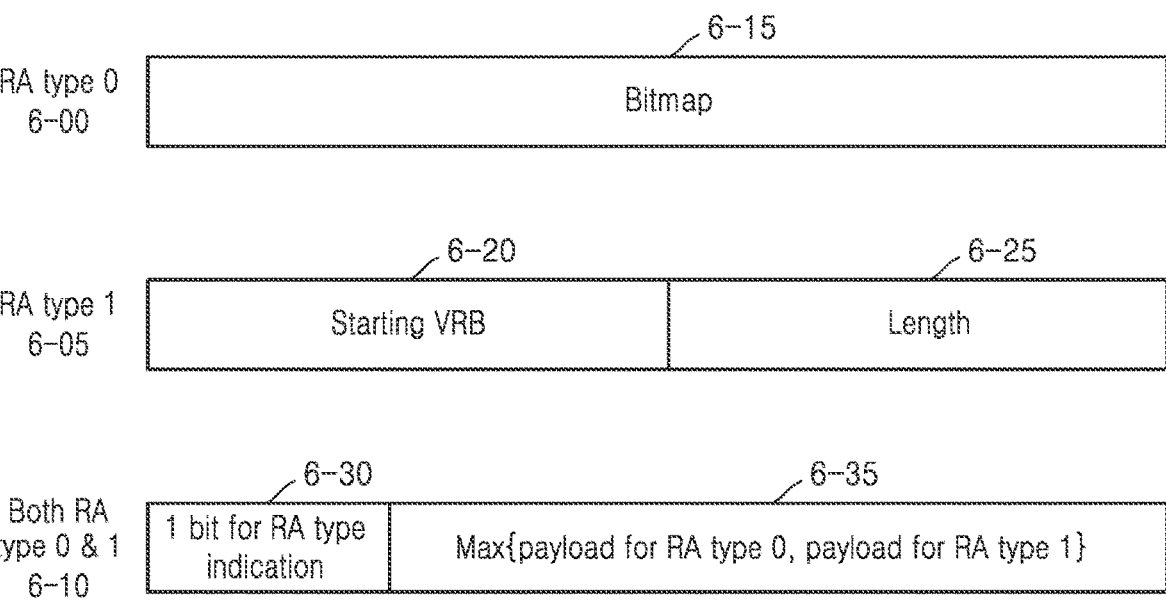
FIG. 6 is a diagram illustrating an example of frequency-domain resource assignment of a physical downlink shared channel (PDSCH) in a wireless communication system according to an embodiment of the disclosure.

FIG. 6 is a diagram illustrating an example of frequency domain resource assignment of a PDSCH in a wireless communication system according to an embodiment of the disclosure.

FIG. 6 is a diagram illustrating three frequency domain resource assignment methods of type 0 6-00, type 1 6-05, and dynamic switch 6-10, which may be configured through a higher layer in the NR wireless communication system.

Referring to FIG. 6, when the UE is configured to use only resource type 0 via a higher layer signaling (6-00), some DCI for assigning a PDSCH to the corresponding UE may include a bitmap composed of NRBG bits. A condition for this is described again later. Here, NRBG denotes the number of RBGs determined as in Table 16 shown below, according to a BWP size assigned by a BWP indicator and a higher layer parameter rbg-Size, and data is transmitted to an RBG indicated by 1 by the bitmap.

TABLE 16

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 2 (6-05) via a higher layer signaling, partial DCI assigning a PDSCH to the UE includes frequency domain resource assignment information composed of $$\lceil \log_2(N_{RB}^{DL,BWP}(N_{RB}^{DL,BWP} + 1)/2) \rceil$$

bits. A condition for this is described again later. Accordingly, the BS may configure a starting virtual resource block (VRB) 6-20 and a duration 6-25 of frequency domain resources assigned continuously therefrom.

When the UE is configured to use both resource type 0 and resource type 1 (6-10) via a higher layer signaling, partial DCI assigning a PDSCH to the corresponding UE may include frequency domain resource assignment information composed of bits of a larger value 6-35 among a payload 6-15 for configuring the resource type 0 and payloads 6-20 and 6-25 for configuring the resource type 1. A condition for this is described again later. At this time, one bit may be added to a front portion (most significant bit (MSB)) of the frequency domain resource assignment information in the DCI, and when the corresponding bit has a value of 0, a use of the resource type 0 may be indicated, and when the corresponding bit has a value of 1, a use of the resource type 1 may be indicated.

A time domain resource assignment method for a data channel in a next-generation mobile communication system (5G or NR system) is described below.

The BS may configure, to the UE, a table regarding time domain resource assignment information for a PDSCH and PUSCH, via a higher layer signaling (for example, an RRC signaling). For the PDSCH, a table composed of up to maxNrofDL-Allocations=16 entries may be configured, and for the PUSCH, a table composed of up to maxNrofUL-Allocations=16 entries may be configured. In an embodiment, the time domain resource assignment information may include a PDCCH-to-PDSCH slot timing (corresponds to a time interval in a slot unit between a time point when the PDCCH is received and a time point when the PDSCH scheduled by the received PDCCH is transmitted, which is indicated by K0), a PDCCH-to-PUSCH slot timing (corresponds to a time interval in a slot unit between a time point when the PDCCH is received and a time point when the PUSCH scheduled by the received PDCCH is transmitted, which is indicated by K2), information about a location and duration of a starting symbol where the PDSCH or PUSCH is scheduled within a slot, and a mapping type of the PDCH or PUSCH. For example, information as in Table 17 or Table 18 shown below may be transmitted from the BS to the UE.

TABLE 17

| PDSCH-TimeDomainResourceAllocationList information element |
| --- |

| PDSCH-TimeDomainResourceAllocationList | ::= SEQUENCE (SIZE(1..maxNrofUL-Allocations)) OF |
| --- | --- |
| PDSCH-TimeDomainResourceAllocation | |
| PDSCH-TimeDomainResourceAllocation ::= | SEQUENCE { |
| k0 | INTEGER(0..32) |
| OPTIONAL, -- Need S | |
| (PDCCH-to-PDSCH timing, in slot unit) | |
| mappingType | ENUMERATED {typeA, typeB}, |
| (PDSCH mapping type) | |
| startSymbolAndLength | INTEGER {0..127} |
| (Starting symbol and duration of PDSCH) | |
| } | |

TABLE 18

| PUSCH-TimeDomainResourceAllocation information element |
| --- |

| PUSCH-TimeDomainResourceAllocationList ::= | SEQUENCE (SIZE(1..maxNrofUL-Allocations)) OF |
| --- | --- |
| PUSCH-TimeDomainResourceAllocation | |
| PUSCH-TimeDomainResourceAllocation ::= | SEQUENCE { |
| k2 | INTEGER(0..32)   OPTIONAL, -- Need S |
| (PDCCH-to-PUSCH timing, in slot unit) | |
| mappingType | ENUMERATED {typeA, typeB}, |
| (PUSCH mapping type) | |
| startSymbolAndLength | INTEGER {0..127} |
| (Starting symbol and duration of PUSCH) | |
| } | |

The BS may notify the UE of one of the entries in the table of the time domain resource assignment information, via L1 signaling (for example, DCI) (for example, indicated via a 'time domain resource assignment' field within DCI). The UE may obtain the time domain resource assignment information for the PDSCH or PUSCH based on the DCI received from the BS.

Figure 7:
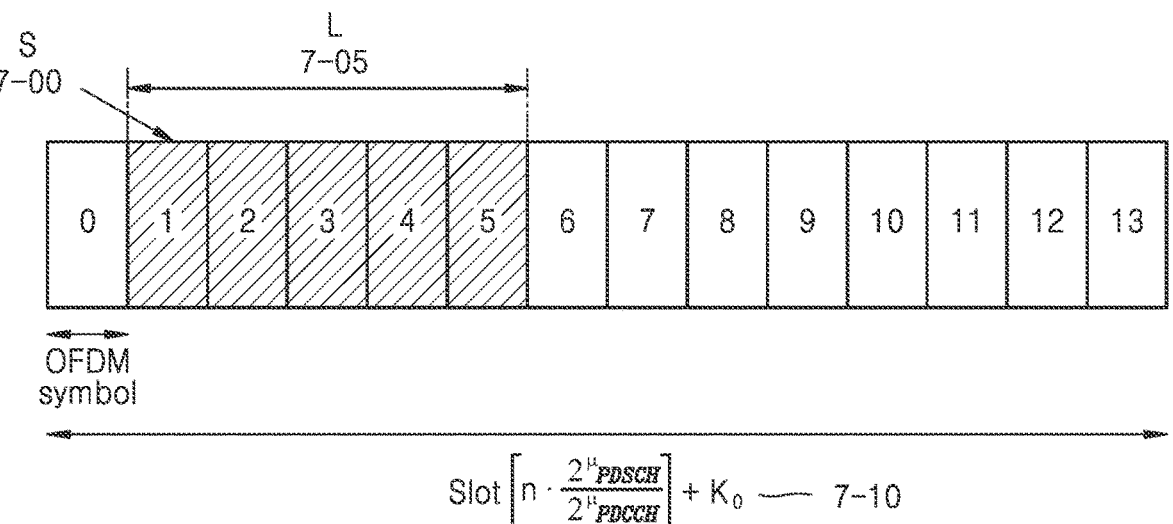
FIG. 7 is a diagram illustrating an example of time-domain resource assignment in a wireless communication system according to an embodiment of the disclosure.

FIG. 7 is a diagram illustrating an example of assigning time domain resources of a PDSCH in a wireless communication system, according to an embodiment of the disclosure.

Referring to FIG. 7, the BS may indicate a time domain location of PDSCH resources according to a subcarrier spacing (SCS) ($\mu_{PDSCH}$, $\mu_{PDCCH}$) of a data channel and control channel configured by using a higher layer, a value of scheduling offset ($K_0$), and a starting position 7-00 and duration 7-05 of an OFDM symbol within one slot dynamically indicated through DCI.

Figure 8:
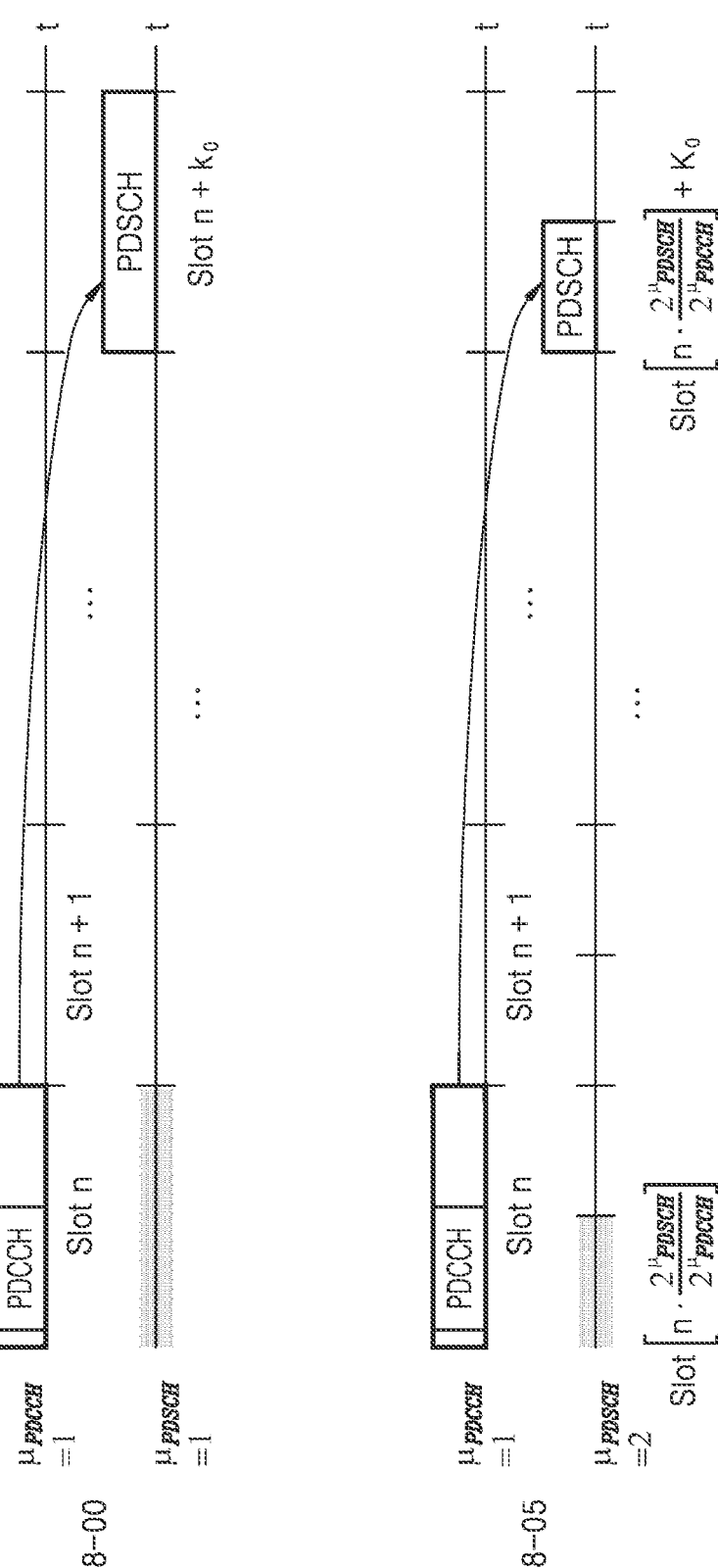
FIG. 8 is a diagram illustrating an example of time-domain resource assignment according to a subcarrier spacing of a data channel and a control channel in a wireless communication system according to an embodiment of the disclosure.

FIG. 8 is a diagram illustrating an example of assigning time axis resources according to a subcarrier spacing of a data channel and control channel in a wireless communication system, according to an embodiment of the disclosure.

Referring to FIG. 8, when subcarrier spacings of the data channel and the control channel are the same (8-00, $\mu_{PDSCH}=\mu_{PDCCH}$), because slot numbers for data and control are the same, the BS and UE may generate a scheduling offset according to a predetermined slot offset $K_0$. On the other hand, when subcarrier spacings of a data channel and a control channel are different (8-05, $\mu_{PDSCH}\neq\mu_{PDCCH}$), because slot numbers for data and control are different, the BS and UE may generate a scheduling offset according to the predetermined slot offset $K_0$, based on a subcarrier spacing of a PDCCH.

In the NR wireless communication system, the UE may transmit uplink control information (UCI) to the BS on a PUCCH. The control information may include at least one of HARQ-ACK indicating whether demodulation/decoding of a transport block (TB) received on the PDSCH by the UE is successful, a scheduling request (SR) requesting resource assignment to the PUSCH BS for UE to transmit UL data, and channel state information (CSI) that is information for reporting a channel state of the UE.

The PUCCH resource may largely be divided into a long PUCCH and a short PUCCH depending on a duration of an assigned symbol. In the NR wireless communication system, the long PUCCH has a duration of 4 symbols or more within a slot, and the short PUCCH has a duration of 2 symbols or less within a slot.

To describe the long PUCCH in greater detail, the long PUCCH may be used for the purpose of UL cell coverage improvement, and accordingly, may be transmitted by using a Discrete Fourier Transform Spread OFDM (DFT-S-OFDM) scheme that is a shorter carrier transmission rather than an OFDM transmission. The long PUCCH supports transmission formats, such as PUCCH format 1, PUCCH format 3, and PUCCH format 4, depending on the number of supportable control information bits and whether UE multiplexing through support of Pre-DFT optical communication channel (OCC) at the front end of inverse fast Fourier transform (IFFT).

First, the PUCCH format 1 is a DFT-S-OFDM-based long PUCCH format capable of supporting up to 2 bits of control information, and uses frequency resources as much as 1 RB. The control information may be composed of HARQ-ACK and an SR alone or in combination. In PUCCH format 1, an OFDM symbol including a DMRS that is a demodulation reference signal (or a reference symbol) and an OFDM symbol including UCI are repeatedly configured.

For example, when the number of transmission symbols of PUCCH format 1 is 8, the 8 symbols are composed of a DMRS symbol, a UCI symbol, a DMRS symbol, a UCI symbol, a DMRS symbol, a UCI symbol, a DMRS symbol, and a UCI symbol in sequence from the first starting symbol. The DMRS symbol has a structure in which a sequence corresponding to a duration of one RB on the frequency domain is spread by using an orthogonal code (or an orthogonal sequence or spreading code w_i(m)) on the time domain within one OFDM symbol and is transmitted after IFFT is performed thereon.

The UCI symbol is generated as described below. The UE may generate d(0) by binary phase shift keying (BPSK)-modulating 1-bit control information and quadrature phase shift keying (QPSK)-modulating 2-bit control information. The UE may generate a UCI symbol by multiplying and scrambling the generated d(0) by a sequence corresponding a duration of 1 RB on the frequency domain, spread the scrambled sequence by using an orthogonal symbol (or an orthogonal sequence or spreading code $w_{i(m)}$ on the time domain, and performing transmission after performing IFFT thereon.

The UE generates the sequence based on group hopping or sequence hopping configuration configured by an upper signal from the BS and the configured ID, and cyclic-shifts the generated sequence by using an initial cyclic shift (CS) value configured by an upper signal to generate a sequence corresponding to a duration of 1 RB.

$w_{i(m)}$ is determined as in $$w_i(m) = e^{\frac{j2\pi\Phi(m)}{N_{SF}}},$$

when a duration $N_{SF}$ of a spreading code is given, and specifically, is given as shown in Table 19 below. i denotes the index of the spreading code itself, and m represents the indices of elements of the spreading code.

Here, numbers in [ ] in Table 19 denote Ø(m), and for example, when a duration of spreading code is 2 and an index of a configured spreading code is i=0, the spreading code $w_{i(m)}$ is $$w_i(0) = e^{\frac{j2\pi\cdot0}{N_{SF}}} = 1,$$

$$w_i(1) = e^{\frac{j2\pi\cdot0}{N_{SF}}} = 1,$$

so that $w_{i(m)}=[1\ 1]$.

TABLE 20

| | Location of DMRS in PUCCH format ¾ transmission | | | |
|---|---|---|---|---|
| Transmission | Additional DMRS is not configured | | Additional DMRS is configured | |
| duration of PUCCH format ¾ | Additional DMRS is not configured | Additional DMRS is configured | Additional DMRS is not configured | Additional DMRS is configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, when the number of transmission symbols of PUCCH format 3 is 8, the DMRS is transmitted to the first symbol and the fifth symbol with the first starting symbol of the eight symbols being 0. The table is also applied to the DMRS symbol positions of PUCCH format 4 in the same manner.

Next, PUCCH format 4 is a DFT-S-OFDM-based long PUCCH format capable of supporting more than 2 bits of control information, and uses frequency resource as much as 1 RB. The control information may be composed of HARQ-ACK, an SR, and CSI alone or in combination. PUCCH format 4 differs from PUCCH format 3 in that, in PUCCH format 4, PUCCH format 4 of various UEs may be multiplexed within one RB. PUCCH format 4 of a plurality of UEs may be multiplexed by applying a Pre-DFT OCC to control information at the front stage of the IFFT. However, the number of pieces of transmittable control information symbols of one UE is reduced depending on the number of multiplexed UEs. The number of UEs that may be multiplexed, that is, the number of different OCCs that are available may be 2 or 4, and the number of OCCs and OCC indices to be applied may be configured through a higher layer.

TABLE 19

| | Spreading symbol for PUCCH format 1 $w_1(m) = e^{j2\pi\phi(m)/N_{SF}}$ | | | | | | |
|---|---|---|---|---|---|---|---|
| | φ(m) | | | | | | |
| $N_{SF}$ i = 0 | i = 1 | i = 2 | i = 3 | i = 4 | i = 5 | i = 6 | |
| 1 [0] | — | — | — | — | — | — |
| 2 [0 0] | [0 1] | — | — | — | — | — |
| 3 [0 0 0] | [0 1 2] | [0 2 1] | — | — | — | — |
| 4 [0 0 0 0] | [0 2 0 2] | [0 0 2 2] | [0 2 2 0] | — | — | — |
| 5 [0 0 0 0 0] | [0 1 2 3 4] | [0 2 4 1 3] | [0 3 1 4 2] | [0 4 3 2 1] | — | — |
| 6 [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a DFT-S-OFDM-based long PUCCH format capable of supporting more than 2 bits of control information, and the number of RBs to be used may be configured through a higher layer. The control information may be composed of HARQ-ACK, an SR, and CSI alone or in combination. In PUCCH format 3, DMRS symbol positions are presented in Table 20 according to whether frequency hopping is performed within the slot and whether additional DMRS symbols are configured.

Next, the short PUCCH is described. The short PUCCH may be transmitted in both a DL centric slot and a UL centric slot, and is generally transmitted in the last symbol of the slot or a latter OFDM symbol (for example, the last OFDM symbol or a second-to-last OFDM symbol or the last two OFDM symbols). However, the short PUCCH may also be transmitted at any position within the slot. In addition, the short PUCCH may be transmitted by using one OFDM symbol or two OFDM symbols. The short PUCCH may be used for reducing latency compared to the long PUCCH in a situation in which a UL cell coverage is good, and may be transmitted by using a cyclic prefix-orthogonal frequency division multiplexing (CP-OFDM) scheme.

The short PUCCH supports transmission formats, such as PUCCH format 0 and PUCCH format 2, according to the number of supportable bits of control information. First, PUCCH format 0 is a short PUCCH format capable of supporting up to 2 bits of control information and uses frequency resources as much as 1 RB. The control information may be composed of HARQ-ACK and an SR alone or in combination. PUCCH format 0 has a structure in which a DMRS is not transmitted and only a sequence mapped to 12 subcarriers is transmitted on the frequency domain within one OFDM symbol. The UE generates a sequence based on the configured ID and group hopping or sequence hopping configuration configured by the upper signal from the BS, cyclic-shifts the generated sequence with a final CS obtained by adding a CS value according to ACK or NACK to an indicated initial CS value, maps the sequence to 12 subcarriers, and transmits the mapped sequence.

For example, when HARQ-ACK is 1 bit and is ACK as shown in Table 21 below, 6 is added to the initial CS value to generate the final CS, and when HARQ-ACK is NACK, 0 is added to the initial CS to generate the final CS. 0 that is the CS value for NACK and 6 that is the CS value for ACK are defined in the standard, and the UE always generates PUCCH format 0 according to the above value and transmits 1-bit HARQ-ACK.

TABLE 21

| 1-bit HARQ-ACK | NACK | ACK |
|---|---|---|
| Final CS | (Initial CS + 0) mod 12 = Initial CS | (Initial CS + 6) mod 12 |

As in Table 22 below, in the case in which HARQ-ACK is 2 bits, 0 is added to the initial CS value when (NACK, NACK), 3 is added to the initial CS value when (NACK, ACK), 6 is added to the initial CS value when (ACK, ACK), and 9 is added to the initial CS value when (ACK, NACK). 0 that is the CS value for (NACK, NACK), 3 that is the CS value for (NACK, ACK), 6 that is the CS value for (ACK, ACK), and 9 that is the CS value for (ACK, NACK) are defined in the standard, and the UE always generates PUCCH format 0 according to the above value and transmits 2-bit HARQ-ACK.

When the final CS value is greater than 12 by the CS value added to the initial CS value according to ACK or NACK, the duration of the sequence is 12, and thus, modulo 12 is applied to the final CS value.

TABLE 22

| 2-bit HARQ-ACK | NACK, NACK | NACK, ACK | ACK, ACK | ACK, NACK |
|---|---|---|---|---|
| Final CS | (Initial CS + 0) mod 12 = Initial CS | (Initial CS + 3) mod 12 | (Initial CS + 6) mod 12 | (Initial CS + 9) mod 12 |

Next, PUCCH format 2 is a short PUCCH format supporting control information exceeding 2 bits, and the number of RBs used may be configured through a higher layer. The control information may be composed of HARQ-ACK, an SR, and CSI alone or in combination. In PUCCH format 2, when the position of the subcarrier on which the DMRS is transmitted within one OFDM symbol is fixed to subcarriers having indices of #1, #4, #7, and #10 when the index of the first subcarrier is #0. Control information is mapped to the remaining subcarriers except for the subcarrier in which the DMRS is located through a modulation process after channel encoding.

In summary, values configurable for each of the PUCCH formats described above and the ranges thereof may be summarized as in Table 23 shown below. In the following table, when a value does not need to be configured, it is marked with N.A.

TABLE 23

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4, 14 | 1, 2 | 4, 14 | 4, 14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A. (Default is 1) | N.A. (Default is 1) | 1-16 | 1-6, 8-10, 12, 15, 16 | N.A. (Default is 1) |

TABLE 23-continued

| | | PUCCH Format 0 | PUCCH Format 1 | PUCCH Format 2 | PUCCH Format 3 | PUCCH Format 4 |
|---|---|---|---|---|---|---|
| Enabling frequency hopping (intra-slot) | Configurability | ✓ | ✓ | ✓ | ✓ | ✓ |
| | Value range | On/Off (only for 2 symbol) | On/Off | On/Off (only for 2 symbol) | On/Off | On/Off |
| Freq.cy resource of $2^{nd}$ hop if intra-slot frequency hopping is enabled | Configurability | ✓ | ✓ | ✓ | ✓ | ✓ |
| | Value range | 0-274 | 0-274 | 0-274 | 0-274 | 0-274 |
| Index of initial cyclic shift | Configurability | ✓ | ✓ | N.A. | N.A. | N.A. |
| | Value range | 0-11 | 0-11 | N.A. | N.A. | N.A. |
| Index of time-domain OCC | Configurability | N.A. | ✓ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

Meanwhile, for improvement of UL coverage, multi-slot repetition may be supported for PUCCH formats 1, 3, and 4, and the PUCCH repetition may be configurable for each PUCCH format.

The UE performs repeated transmission on a PUCCH including UCI as much as the number of slots configured through nrofSlots that is a higher layer signaling. With regard to repeated transmission on PUCCH, PUCCH transmission of each slot is performed by using the same number of consecutive symbols, and the number of corresponding consecutive symbols may be configurable through nrofSymbols within PUCCH-format1 or PUCCH-format3 or PUCCH-format4, which are higher layer signalings. With regard to repeated PUCCH transmission, a PUCCH transmission of each slot is performed by using the same starting symbol, and the corresponding start symbol may be configured through PUCCH-format1 or PUCCH-format3 or PUCCH-format4, which are higher layer signalings.

With regard to repeated PUCCH transmission, when the UE is configured to perform frequency hopping in PUCCH transmission in different slots, the UE performs the frequency hopping in units of slots. In addition, when the UE is configured to perform frequency hopping in PUCCH transmission in different slots, the UE starts the PUCCH transmission from a first PRB index, which is a higher layer signaling, in even-numbered slots, and starts the PUCCH transmission from a second PRB index configured through secondHopPRB, which is a higher layer signaling, in odd-numbered slots.

Additionally, when the UE is configured to perform frequency hopping in PUCCH transmission in different slots, an index of a slot in which a first PUCCH transmission is indicated to the UE is 0, and during the number of entire configured PUCCH repeated transmissions, a value of the number of repeated PUCCH transmissions is increased regardless of PUCCH transmission performed in each slot. When the UE is configured to perform frequency hopping in PUCCH transmission in different slots, the UE does not expect frequency hopping to be configured within the slot during the PUCCH transmission. When the UE is not configured to perform frequency hopping during PUCCH transmission in different slots, but is configured with frequency hopping within the slot, first and second PRB indices are applied the same within the slot.

Next, a PUCCH resource configuration of the BS or UE is described. The BS may configure PUCCH resources for each BWP through a higher layer for a specific UE. The corresponding configuration may be as in Table 24 shown below.

TABLE 24

```
PUCCH-Config ::=                           SEQUENCE {
    resourceSetToAddModList                    SEQUENCE (SIZE (1..maxNrofPUCCH-ResourceSets)) OF PUCCH-
ResourceSet  OPTIONAL,   -- Need N
    resourceSetToReleaseList                   SEQUENCE (SIZE (1..maxNrofPUCCH-ResourceSets)) OF PUCCH-
ResourceSetId  OPTIONAL,   -- Need N
    resourceToAddModList                       SEQUENCE (SIZE (1..maxNrofPUCCH-Resources)) OF PUCCH-
Resource  OPTIONAL,   -- Need N
    resourceToReleaseList                      SEQUENCE (SIZE (1..maxNrofPUCCH-Resources)) OF PUCCH-
ResourceId  OPTIONAL,   -- Need N
    format1                                    SetupRelease { PUCCH-FormatConfig }
OPTIONAL,   -- Need M
    format2                                    SetupRelease { PUCCH-FormatConfig }
OPTIONAL,   -- Need M
    format3                                    SetupRelease { PUCCH-FormatConfig }
OPTIONAL,   -- Need M
    format4                                    SetupRelease { PUCCH-FormatConfig }
OPTIONAL,   -- Need M
    schedulingRequestResourceToAddModList          SEQUENCE (SIZE (1..maxNrofSR-Resources)) OF
SchedulingRequestResourceConfig
OPTIONAL,   -- Need N
```

TABLE 24-continued

```
schedulingRequestResourceToReleaseList          SEQUENCE (SIZE (1..maxNrofSR-Resources)) OF
SchedulingRequestResourceId
OPTIONAL,  -- Need N
  multi-CSI-PUCCH-ResourceList                  SEQUENCE (SIZE (1..2)) OF PUCCH-ResourceId
OPTIONAL,  -- Need M
  dl-DataToUL-ACK                           SEQUENCE (SIZE (1..8)) OF INTEGER (0..15)
OPTIONAL,  -- Need M
  spatialRelationInfoToAddModList               SEQUENCE (SIZE (1..maxNrofSpatialRelationInfos)) OF
PUCCH-SpatialRelationInfo
OPTIONAL,  -- Need N
  spatialRelationInfoToReleaseList              SEQUENCE (SIZE (1..maxNrofSpatialRelationInfos)) OF
PUCCH-SpatialRelationInfoId
OPTIONAL,  -- Need N
  pucch-PowerControl                    PUCCH-PowerControl
OPTIONAL,  -- Need M
  ...
}
```

According to the table above, one or more PUCCH resource sets may be configured within a PUCCH resource configuration for a specific BWP, and a maximum payload value for UCI transmission may be configured in part of the PUCCH resource sets. One or more PUCCH resources may belong to each of the PUCCH resource sets, and each of the PUCCH resources may belong to one of the PUCCH formats described above.

In the PUCCH resource set, a maximum payload value of a first PUCCH resource set may be fixed at 2 bits, and accordingly, the corresponding value may not be additionally configured through a higher layer or the like. When the remaining PUCCH resource sets are configured, indices of the corresponding PUCCH resource sets may be configured in an ascending order according to the maximum payload value, and the maximum payload value may not be configured in the last PUCCH resource set. A higher layer configuration for the PUCCH resource set may be as in Table 25 shown below.

TABLE 25

```
-- A set with one or more PUCCH resources
PUCCH-ResourceSet ::=        SEQUENCE {
  pucch-ResourceSetId           PUCCH-ResourceSetId,
  resourceList              SEQUENCE (SIZE (1..maxNrofPUCCH-ResourcesPerSet)) OF PUCCH-
ResourceId,
  maxPayloadMinus1            INTEGER (4..256)
OPTIONAL   -- Need R
}
```

A resourceList parameter of the table above may include IDs of PUCCH resources belonging to the PUCCH resource set.

During an initial access or when the PUCCH resource set is not configured, a PUCCH resource set as in Table 26 shown below, which is composed of a plurality of cell-specific PUCCH resources in an initial BWP, may be used. A PUCCH resource to be used for initial access within this PUCCH resource set may be indicated through SystemInformationBlock1 (SIB1).

TABLE 26

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

A maximum payload of each PUCCH resource included in a PUCCH resource set may be 2 bits in a case of PUCCH format 0 or 1, and in a case of the remaining formats, may be determined by a symbol duration, the number of PRBs, and a maximum code rate. The symbol duration and the number of PRBs described above may be configured for each PUCCH resource, and the maximum code rate may be configured for each PUCCH format.

Next, a PUCCH resource selection for UCI transmission is described. In a case of SR transmission, a PUCCH resource for an SR corresponding to schedulingRequestID may be configured through a higher layer, as in Table 27 shown below. The PUCCH resource may be a resource belonging to PUCCH format 0 or PUCCH format 1.

TABLE 27

```
SchedulingRequestResourceConfig ::=    SEQUENCE {
    schedulingRequestResourceId            SchedulingRequestResourceId,
    schedulingRequestID                    SchedulingRequestId,
    periodicityAndOffset                   CHOICE {
        sym2                                   NULL,
        sym6for7                               NULL,
        sl1                                    NULL,          -- Recurs in every slot
        sl2                                    INTEGER (0..1),
        sl4                                    INTEGER (0..3),
        sl5                                    INTEGER (0..4),
        sl8                                    INTEGER (0..7),
        sl10                                   INTEGER (0..9),
        sl16                                   INTEGER (0..15),
        sl20                                   INTEGER (0..19),
        sl40                                   INTEGER (0..39),
        sl80                                   INTEGER (0..79),
        sl160                                  INTEGER (0..159),
        sl320                                  INTEGER (0..319),
        sl640                                  INTEGER (0..639)
    }
    OPTIONAL,   -- Need M
    resource                               PUCCH-ResourceId
    OPTIONAL    -- Need M
}
```

In the configured PUCCH resource, a transmission periodicity and offset are configured for periodicityAndOffset parameters of Table 27. When UL data to be transmitted by the UE is present at a time point corresponding to the configured periodicity and offset, the corresponding PUCCH resource is transmitted, and may not be transmitted otherwise.

In a case of CSI transmission, a PUCCH resource on which a CSI report is to be transmitted periodically or semi-persistently on a PUCCH may be configured to a pucch-CSI-ResourceList parameter via a higher signaling, as in Table 28 shown below. This parameter includes a list of PUCCH resources for each BWP for a cell or component carrier (CC) to which the corresponding CSI report is to be transmitted. The PUCCH resource may be a resource belonging to PUCCH format 2 or PUCCH format 3 or PUCCH format 4.

In the PUCCH resource, a transmission periodicity and offset are configured through reportSlotConfig of Table 28.

In a case of HARQ-ACK transmission, a resource set of a PUCCH resource to be transmitted is first selected according to a payload of UCI including the corresponding HARQ-ACK. In other words, a PUCCH resource set having a minimum payload that is not less than the UCI payload is selected. Next, a PUCCH resource in the PUCCH resource set may be selected through a PUCCH resource indicator (PRI) within DCI that schedules a TB corresponding to the corresponding HARQ-ACK, and the PRI may be a PUCCH resource indicator specified in Table 5 or Table 6. A relationship between a PRI configured through a higher signaling and a PUCCH resource selected from among the PUCCH resource set may be as in Table 29 shown below.

TABLE 28

```
CSI-ReportConfig ::=              SEQUENCE {
    reportConfigId                   CSI-ReportConfigId,
    carrier                          ServCellIndex   OPTIONAL, -- Need S
    ...
    reportConfigType                 CHOICE {
        periodic                         SEQUENCE {
            reportSlotConfig                 CSI-ReportPeriodicityAndOffset,
            pucch-CSI-ResourceList               SEQUENCE (SIZE (1..maxNrofBWPs)) OF PUCCH-CSI-
Resource
        },
        semiPersistentOnPUCCH            SEQUENCE {
            reportSlotConfig                 CSI-ReportPeriodicityAndOffset,
            pucch-CSI-ResourceList               SEQUENCE (SIZE (1..maxNrofBWPs)) OF PUCCH-CSI-
Resource
        },
        ...
}
```

TABLE 29

| PUCCH resource indicator | PUCCH resource |
|---|---|
| '000' | 1$^{st}$ PUCCH resource provided by pucch-ResourceId obtained from the 1$^{st}$ value of resourceList |
| '001' | 2$^{nd}$ PUCCH resource provided by pucch-ResourceId obtained from the 2$^{nd}$ value of resourceList |
| '010' | 3$^{rd}$ PUCCH resource provided by pucch-ResourceId obtained from the 3$^{rd}$ value of resourceList |
| '011' | 4$^{th}$ PUCCH resource provided by pucch-ResourceId obtained from the 4$^{th}$ value of resourceList |
| '100' | 5$^{th}$ PUCCH resource provided by pucch-ResourceId obtained from the 5$^{th}$ value of resourceList |
| '101' | 6$^{th}$ PUCCH resource provided by pucch-ResourceId obtained from the 6$^{th}$ value of resourceList |
| '110' | 7$^{th}$ PUCCH resource provided by pucch-ResourceId obtained from the 7$^{th}$ value of resourceList |
| '111' | 8$^{th}$ PUCCH resource provided by pucch-ResourceId obtained from the 8$^{th}$ value of resourceList |

When the number of selected PUCCH resources in the PUCCH resource set is greater than 8, the PUCCH resource may be selected by Mathematical Formula 1 shown below.

[Mathematical Formula 1]

$$r_{PUCCH} = \begin{cases} \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil, & \text{if } \Delta_{PRI} < R_{PUCCH}\text{mod}8 \\ \left\lfloor \dfrac{n_{CCE,p} \cdot \lceil R_{PUCCH}/8 \rceil}{N_{CCE,p}} \right\rfloor + \\ \Delta_{PRI} \cdot \left\lceil \dfrac{R_{PUCCH}}{8} \right\rceil + R_{PUCCH}, & \text{if } \Delta_{PRI} \geq R_{PUCCH}\text{mod}8 \end{cases}$$

In the mathematical formula shown above, $r_{PUCCH}$ indicates an index of a selected PUCCH resource in the PUCCH resource set, $R_{PUCCH}$ indicates the number of PUCCH resources belonging to the PUCCH resource set, $\Delta_{PRI}$ indicates a PRI value, $N_{CCE,p}$ indicates a total number of CCEs of a CORESET p to which received DCI belongs, $n_{CCE,p}$ indicates a first CCE index for the received DCI.

A time point at which the corresponding PUCCH resource is transmitted is after a $K_1$ slot from transmission of a TB corresponding to the corresponding HARQ-ACK. A candidate of the K1 value is configured to a higher layer, and more specifically, is configured to a dl-DataToUL-ACK parameter within PUCCH-Config specified in Table 24. One $K_1$ value from among these candidates may be selected by a PDSCH-to-HARQ feedback timing indicator for scheduling the TB, and this value may be a value specified in Table 5 or Table 6 above. Meanwhile, a unit of the $K_1$ value may be a slot unit or a subslot unit. Here, the subslot is a unit of a shorter duration than the slot, and one or more symbols may constitute one subslot.

Next, a case where two or more PUCCH resources are located in one slot is described. The UE may transmit UCI on one or two PUCCH resources in one slot or subslot, and when the UCI is transmitted on two PUCCH resources in one slot/subslot, i) each of the PUCCH resources do not overlap in symbol units, and ii) at least one of the PUCCH resources may be a short PUCCH. Meanwhile, the UE may not expect to transmit a plurality of PUCCH resources for HARQ-ACK transmission in one slot.

Next, a PUCCH transmission procedure in a case where two or more PUCCH resources overlap is described. When the two or more PUCCH resources overlap, according to the condition described above, that is, a condition in which PUCCH resources to be transmitted must not overlap in symbol units, one of the overlapped PUCCH resources may be selected or a new PUCCH resource may be selected. In addition, UCI payloads transmitted on the overlapped PUCCH resources may all be multiplexed and transmitted, or some may be dropped. First, a case where multi-slot repetition is not configured to the PUCCH resource (case 1) and a case where multi-slot repetition is configured (case 2) are discussed.

In Case 1, a case where PUCCH resources overlap is divided into Case 1-1) a case where two or more PUCCH resources for HARQ-ACK transmission overlap, and Case 1-2) the remaining case.

Figure 9:
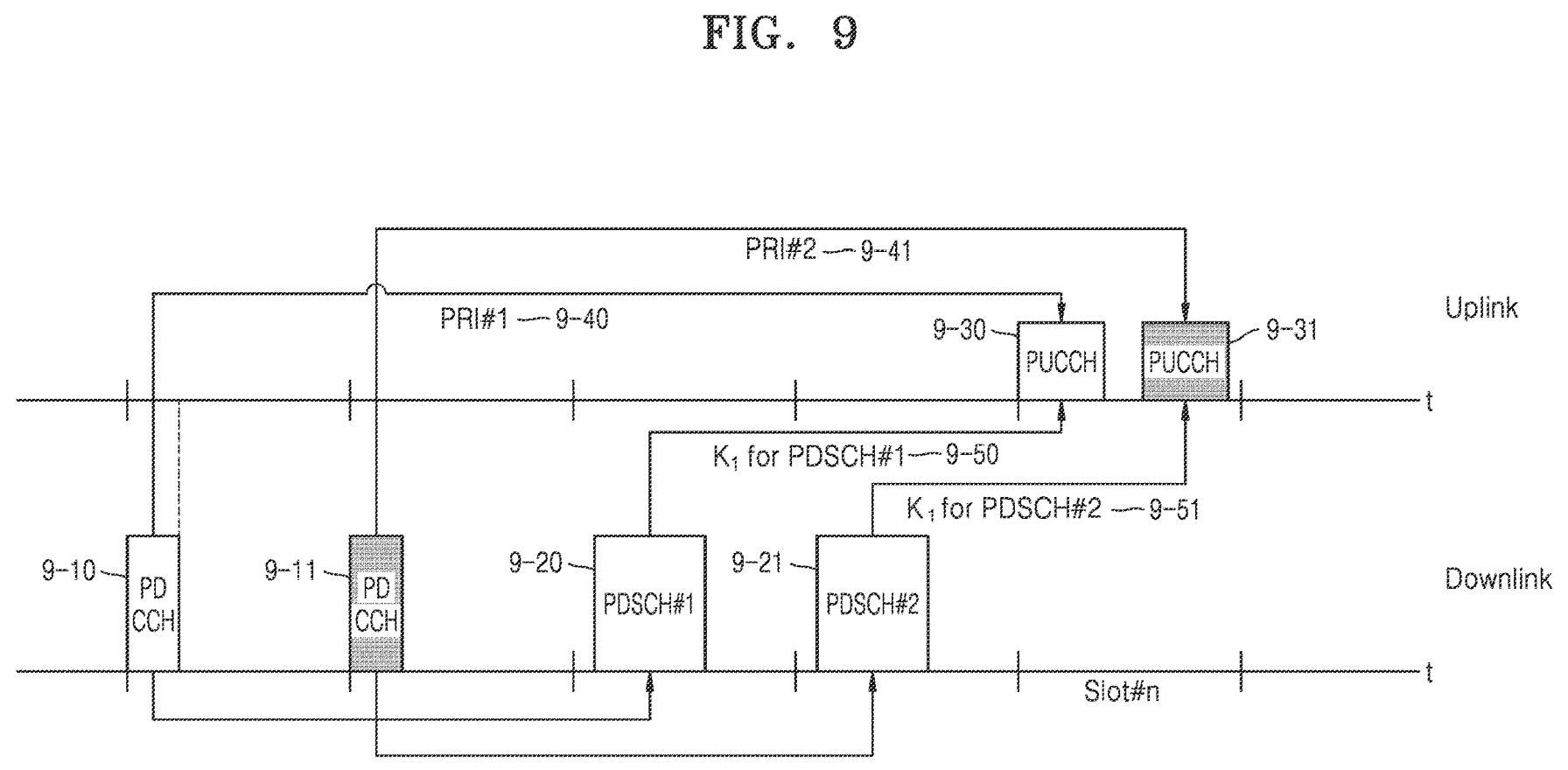

A case corresponding to Case1-1 is shown in FIG. 9.

FIG. 9 is a diagram illustrating a case where a plurality of PUCCH resources for HARQ-ACK transmission to a PDSCH overlap, when multi-slot repetition is not configured. Referring to FIG. 9, for two or more different PDCCHs 9-10 and 9-11 for scheduling a PDSCH, when transmission slots of PUCCH resources respectively corresponding to the PDCCHs are the same, it may be considered that the corresponding PUCCH resources overlap each other. In other words, when UL slots corresponding to $K_1$ values 9-50 and 9-51 indicated by a plurality of PDCCHs are the same, it may be considered that PUCCH resources corresponding to the corresponding PDCCHs overlap each other.

At this time, from among PUCCH resources indicated by PRIs 9-40 and 9-41 in the PDCCH, only a PUCCH resource 9-31 selected based on a PRI 9-41 corresponding to a PDCCH 9-11 transmitted at the latest time point is selected so as to transmit HARQ-ACK information on the PUCCH resource. Accordingly, both HARQ-ACK information of a PDSCH 9-21 and HARQ-ACK information of another PUCCH 9-30 overlapping the PUCCH resource 9-31 may be encoded by a predefined HARQ-ACK codebook and then transmitted on the selected PUCCH resource 9-31.

Next, a case where a PUCCH resource for HARQ-ACK transmission and/or a PUCCH resource for SR and/or CSI transmission overlap or a case where a plurality of PUCCH resources for SR and/or CSI transmission overlap, which correspond to Case 1-2, is described. In the case above, when a plurality of PUCCH resources transmitted in the same slot overlap by one symbol or more on the time domain, it is defined that the corresponding PUCCH resources overlap, and whether pieces of UCI in those resources are multiplexed may be summarized as in Table 30 shown below.

TABLE 30

| PUCCH 2 | PUCCH 1 | | |
| | SR | HARQ-ACK | CSI |
| --- | --- | --- | --- |
| SR | — | Case 1-2-1 (Multiplex or not depending on PUCCH format) | Always multiplex |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to the table above, in a case where PUCCH resources on which HARQ-ACK is transmitted overlap or in a case where PUCCHs on which an SR and CSI are transmitted overlap, the pieces of UCI are always multiplexed.

Meanwhile, in a case where each of each of the PUCCH resources on which the SR and HARQ-ACK are transmitted overlaps, that is, in Case 1-2-1, whether UCI is multiplexed is divided as below, depending on the format of the PUCCH resource.

SR on PUCCH format 0+HARQ-ACK on PUCCH format 1: SR is dropped and only HARQ-ACK is transmitted.

Remaining case: Both SR and HARQ-ACK are multiplexed.

In addition, in the remaining case corresponding the Case 1-2-2, that is, in a case where PUCCH resources on which HARQ-ACK and CSI are transmitted overlap or in a case where a plurality of PUCCH resources on which CSI is transmitted overlap, determination of whether pieces of the UCI are multiplexed may follow a higher layer configuration. In addition, a configuration of whether HARQ-ACK and CSI are multiplexed and a configuration of whether a plurality of pieces of CSI are multiplexed may be performed independently.

For example, whether HARQ-ACK and the CSI are multiplexed may be configured through a simultaneous HARQ-ACK-CSI parameter for each of PUCCH formats 2, 3, and 4, and the corresponding parameter may all be configured to the same value for the PUCCH formats. When a configuration is performed such that multiplexing is not performed through the parameter, only HARQ-ACK is transmitted, and the overlapped CSI may be dropped. In addition, whether the plurality of pieces of CSI are multiplexed may be configured through a multi-CSI-PUCCH-ResourceList parameter within PUCCH-Config. In other words, when the multi-CSI-PUCCH-ResourceList parameter is configured, multiplexing between the pieces of CSI may be performed, and otherwise, according to a priority between the pieces of CSI, only PUCCHs corresponding to pieces of CSI having a high priority may be transmitted.

When the UCI multiplexing is performed as described above, a selection method and multiplexing method for a PUCCH resource to transmit the corresponding UCI resource may differ depending on the information on the overlapped UCI and the format of the PUCCH resource, which may be summarized as in Table 31 shown below.

TABLE 31

| PUCCH 2 | PUCCH 1 | | | |
| | SR | HARQ-ACK | | |
| | (format 0/1) | Format 1 | Format 0/2/3/4 | CSI (format 2/3/4) |
| --- | --- | --- | --- | --- |
| SR (format 0/1) | — | Option 1 | Option 2 | Option 3 |
| HARQ-ACK Format 1 | Option 1 | Option 4 | Option 4 | Option 5 (grant-based) Option 6 (SPS) |
| Format 0/2/3/4 | Option 2 | Option 4 | Option 4 | Option 5 (grant-based) Option 6 (SPS) |
| CSI (format 2/3/4) | Option 3 | Option 5 (grant-based) Option 6 (SPS) | Option 5 (grant-based) Option 6 (SPS) | Option 7 |

Each option of the table above is as follows.

Option 1: The UE varies PUCCH resource selection, depending on the SR value of the SR PUCCH resource overlapping the HARQ-ACK PUCCH resource. In other words, when the SR value is positive, a PUCCH resource for SR is selected, and when the SR value is negative, a PUCCH resource for HARQ-ACK is selected. HARQ-ACK information is transmitted on the selected PUCCH resource.

Option 2: The UE performs transmission by multiplexing HARQ-ACK information and SR information on a PUCCH resource for HARQ-ACK transmission.

Option 3: The UE performs transmission by multiplexing SR information and CSI on a PUCCH resource for CSI transmission.

Option 4: A PUCCH resource for overlapping between HARQ-ACK is transmitted, and a detailed description thereof is as described in the case 1-1) above.

Option 5: When a PUCCH resource for HARQ-ACK corresponding to a PDSCH scheduled by a PDCCH and a PUCCH resource for CSI transmission overlap and multiplexing between the HARQ-ACK and the CSI is configured through a higher layer, the UE performs transmission by multiplexing HARQ-ACK information and CSI information on the PUCCH resource for HARQ-ACK.

Option 6: When a PUCCH resource for HARQ-ACK corresponding to a semi-persistent scheduling (SPS) PDSCH and a PUCCH resource for CSI transmission overlap and multiplexing between the HARQ-ACK and the CSI is configured through a higher layer, the UE performs transmission by multiplexing HARQ-ACK information and CSI information on the PUCCH resource for CSI transmission.

When a PUCCH resource list for multiplexing through a higher layer, that is, multi-CSI-PUCCH-ResourceList, is configured, the UE may transmit all multiplexed UCI payloads from among resources in the list, and one resource having the lowest index is selected and the UCI payloads are selected. When there is no resource capable of transmitting all of the multiplexed UCI payloads in the list, the UE may select a resource having the largest index in the list and then transmit HARQ-ACK and CSI reports as many as the transmittable number to the corresponding resource.

Option 7: When a plurality of PUCCH resources for CSI transmission overlap and multiplexing between the plurality of pieces of CSI is configured through a higher layer, the UE may transmit all of the multiplexed UCI payloads in the PUCCH resource list for CSI multiplexing configured through a higher layer, that is, in multi-CSI-PUCCH-ResourceList, and select one resource having the lowest index and then transmit the UCI payloads. When there is no resource capable of transmitting all of the multiplexed UCI payloads in the list, the UE may select a resource having the largest index in the list and then transmit CSI reports as many as the transmittable number to the corresponding resource.

For convenience of explanation, a case where two PUCCH resources overlap is mainly described above. However, this method may be similarly applied even in a case where three or more PUCCH resources overlap. For example, when a PUCCH resources, in which SR+HARQ-ACK are multiplexed, and a CSI PUCCH resource overlap, a method of multiplexing between HARQ-ACK and CSI may be followed.

In a case where it is configured not to perform multiplexing between specific pieces of UCI, UCI having a high priority is transmitted according to a priority in the order of HARQ-ACK>SR>CSI, and UCI having a low priority may be dropped. When it is configured not to perform multiplexing when a plurality of CSI PUCCH resources overlap, a PUCCH corresponding to CSI having a high priority is transmitted, and PUCCHs corresponding to the other pieces of CSI may be dropped.

Next, Case 2, that is, a case where multi-slot repetition is configured, may be divided into Case 2-1) a case where two or more PUCCH resources for HARQ-ACK transmission are located in the same starting slot and Case 2-2) the remaining case. Each of the cases is shown in FIG. 10.

Figure 10:
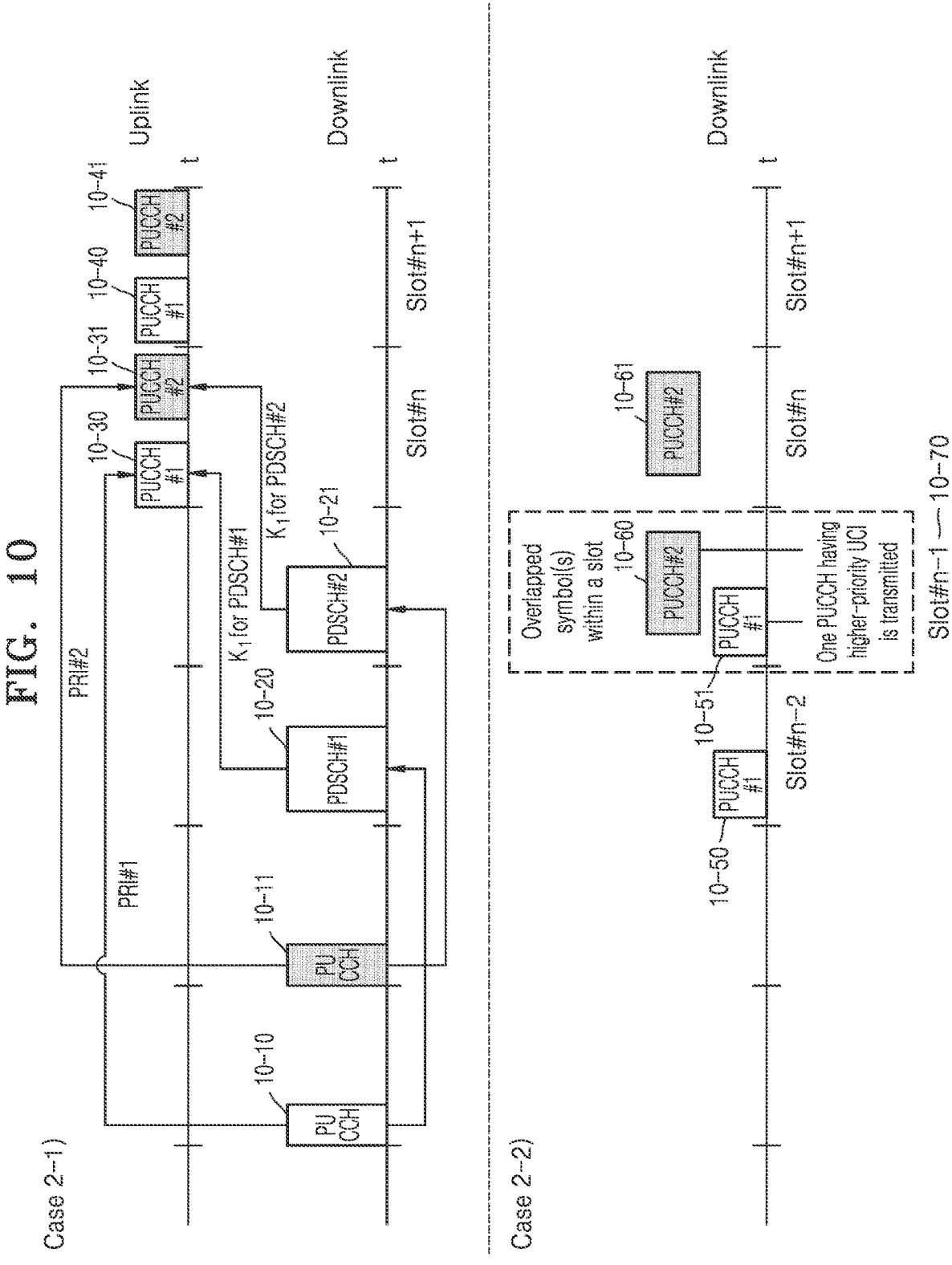
FIG. 10 is a diagram illustrating a case in which, when a multi-slot repetition is configured, PUCCH resources overlap, according to an embodiment of the disclosure.

FIG. 10 is a diagram illustrating a case in which PUCCH resources overlap when multi-slot repetition is configured, according to an embodiment of the disclosure.

Referring to Case 2-1), in a case where multi-slot repetition is configured to the PUCCH resource for HARQ-ACK, that is, in a case where PUCCH #1 is repeatedly transmitted across a plurality of slots 10-30 and 10-40 and PUCCH #2 is also repeatedly transmitted across a plurality of slots 10-31 and 10-41, when starting slots of the two PUCCHs indicated by K1 are the same, similar to Case 1-1), a single PUCCH resource (a PUCCH that is transmitted at the latest time point in one slot), that is, PUCCH #2; may be selected. Accordingly, on the corresponding PUCCH, HARQ-ACK information corresponding to PDSCH #1 and PDSCH #2 may all be multiplexed through a HARQ-ACK codebook and transmitted.

For convenience of technology, a case where a plurality of PUCCHs with multi-slot repetition overlap is described as an example. However, the same method may also be applied in a case where a PUCCH with multi-slot repetition and a PUCCH transmitted in a single slot overlap.

Case 2-2) corresponds to a case where a PUCCH for HARQ-ACK transmission and a PUCCH for SR or CSI transmission overlap or a case where a plurality of PUCCHs for SR or CSI transmission overlap in symbol units. In other words, when PUCCH #1 is repeatedly transmitted 10-50 and 10-51 across a plurality of slots and PUCCH #2 is also repeatedly transmitted 10-60 and 10-61 across a plurality of slots, it corresponds to a case where PUCCH #1 and PUCCH #2 overlap one symbol or more in one slot 10-70.

Between PUCCHs in which overlapping of one symbol or more in the corresponding slot 10-70 occurs, priorities of the pieces of UCI in the PUCCH may be compared so as to transmit UCI having a higher priority and drop the other pieces of UCIs in the corresponding slot. In this case, the priority between the pieces of UCI follows HARQ-ACK>SR>CSI in the order from a highest priority.

In addition, when a plurality of CSI PUCCH resources overlap, a PUCCH corresponding to pieces of CSI having a higher priority is transmitted, and PUCCHs corresponding to the other pieces of CSI may be dropped in the corresponding slot. The above-described PUCCH transmission and drop according to the priority is performed only in a slot in which a symbol unit overlapping occurs, and is not performed in the other slots. In other words, a PUCCH in which multi-slot repetition is configured may be dropped in a slot in which a symbol unit overlapping occurs, but may be transmitted as configured in the remaining slots.

In the above case, for convenience of technology, a case where a plurality of PUCCHs with multi-slot repetition overlap is described as an example. However, the same method may also be applied in a case where a PUCCH with multi-slot repetition and a PUCCH transmitted in a single slot overlap.

In addition, overlapping between PUCCH and PUSCH transmissions is described. During a repeated transmission of $$N_{PUCCH}^{repeat} > 1,$$

when the UE performs PUCCH transmission in a first slot and performs PUSCH transmission in a second slot, the PUCCH transmission overlaps the PUSCH transmission in one or more slots, and pieces of UCI in the PUSCH are multiplexed in the overlapped slots, the UE may transmit the PUCCH and may not PUSCH in slots in which the PUCCH and the PUSCH overlap.

In a single slot transmission and multi-slot repetition of the PUCCH, the slot described above may be replaced with a mini-slot for low-latency services, such as URLLC. The mini-slot has a shorter duration on the time domain than the slot, and one mini-slot may be composed of fewer than 14 symbols. For example, two or seven symbols may configure one mini-slot. When the mini-slot is configured through a higher layer, etc., units, such as a HARQ-ACK feedback timing K1 value and the number of repeated transmissions, may be replaced with mini-slot units from the existing slot. Mini-slot configuration may be applied to all PUCCH transmissions or may be limited to PUCCH transmissions for specific services. For example, transmission in units of slots may be applied to a PUCCH for an eMBB service, whereas denotes the number of slots per subframe in a given numerology. A higher layer configuration of pucch-spatialRelationInfo is as in Table 32 shown below. The pucch-spatialRelationInfo may be interchangeably used with PUCCH beam information.

TABLE 32

| PUCCH-SpatialRelationInfo ::= | SEQUENCE { |
| --- | --- |
| pucch-SpatialRelationInfoId | PUCCH-SpatialRelationInfoId, |
| servingCellId | ServCellIndex |
| OPTIONAL, --Need S | |
| referenceSignal | CHOICE { |
| ssb-Index | SSB-Index, |
| csi-RS-Index | NZP-CSI-RS-ResourceId, |
| srs | SEQUENCE { |
| | resource |
| SRS-ResourceId, | |
| | uplinkBWP |
| BWP-Id | |
| | } |
| }, | |
| pucch-PathlossReferenceRS-Id | PUCCH-PathlossReferenceRS-Id, |
| p0-PUCCH-Id | P0-PUCCH-Id, |
| closedLoopIndex | ENUMERATED { i0, i1 } |
| } | |
| PUCCH-SpatialRelationInfoId ::= | INTEGER (1..maxNrofSpatialRelationInfos) | transmission in units of mini-slots may be applied to a PUCCH for a URLLC service.

Next, a beam configuration to be applied to PUCCH transmission is described. When the UE does not have a dedicated PUCCH resource configuration, a PUCCH resource set is provided through pucch-ResourceCommon that is a higher signaling, and in this case, a beam configuration for PUCCH transmission follows a beam configuration used in PUSCH transmission that is scheduled through a Random Access Response (RAR) UL grant. When the UE has the dedicated PUCCH resource configuration, a beam configuration for PUCCH transmission is provided through pucch-spatialRelationInfoID that is a higher signaling shown in Table 32 below. When the UE is configured with one pucch-spatialRelationInfoID, a beam configuration for PUCCH transmission by the UE is provided through the one pucch-spatialRelationInfold. When the UE is configured with a plurality of pucch-spatialRelationInfoIDs, the UE is indicated to activate one pucch-spatialRelationInfoID from among the plurality of pucch-spatialRelationInfoIDs through a MAC CE. The UE may be configured with up to eight pucch-spatialRelationInfoIDs through a higher signaling, and may be indicated to activate only one pucch-spatialRelationInfoID from among them.

When the UE is indicated to activate an arbitrary pucch-spatialRelationInfoID through a MAC CE, the UE applies pucch-spatialRelationInfoID activation through the MAC CE from a slot first appearing after $$3N_{slot}^{subframe,\mu}$$

slots from a slot that performs HARQ-ACK transmission to a PDSCH, on which the MAC CE including activation information of pucch-spatialRelationInfoID is transmitted. The μ is a numerology applied in PUCCH transmission, and $$N_{slot}^{subframe,\mu}$$

Referring to Table 32 above, one referenceSignal configuration may be present in a specific pucch-spatialRelationInfo configuration, and the corresponding referenceSignal may be an ssb-Index representing a specific SS/PBCH, a csi-RS-Index representing a specific CSI-RS, or an srs representing a specific SRS. When the referenceSignal is configured as an ssb-Index, the UE may configure a beam used when receiving an SS/PBCH corresponding to the ssb-Index from among SS/PBCHs in the same serving cell, as a beam for PUCCH transmission, or when a servingCellId is provided, may configure a beam used when receiving an SS/PBCH corresponding to an ssb-Index from among SS/PBCHs in a cell indicated by the servingCellId, as a beam for pucch transmission. When a referenceSignal is configured as a csi-RS-Index, the UE may configure a beam used when receiving a CSI-RS corresponding to the csi-RS-Index FROM among CSI-RSs in the same serving cell, as a beam for PUCCH transmission, or when a servingCellId is provided, may configure a beam used when receiving a CSI-RS corresponding to a csi-RS-index from among CSI-RSs in a cell indicated by the servingCellId, as a beam for pucch transmission. When a referenceSignal is configured as an srs, the UE may configure, as a beam for PUCCH transmission, a transmission beam used when transmitting an SRS corresponding to a resource index provided to a higher signaling resource within the same serving cell and/or within an activated UL BWP, or when servingCellID and/or uplinkBWP are/is provided, may configure, as a beam for PUCCH transmission, a transmission beam used when transmitting an SRS corresponding to a resource index provided through a higher signaling resource within a cell indicated by servingCellID and/or uplinkBWP.

One pucch-PathlossReferenceRS-Id configuration may be present in a specific pucch-spatialRelationInfo configuration. PUCCH-PathlossReferenceRS of Table 33 may be mapped to pucch-PathlossReferenceRS-Id of Table 32, and up to four PUCCH-PathlossReferenceRSs may be configured through pathlossReferenceRSs within a higher signaling PUCCH-PowerControl of Table 33. When PUCCH-PathlossReferenceRS is connected to an SS/PBCH through the referenceSignal of Table 33, PUCCH-PathlossReferenceRS may be configured with ssb-Index, and when connected to the CSI-RS, may be configured with csi-RS-Index.

TABLE 33

```
PUCCH-PowerControl ::=          SEQUENCE {
   deltaF-PUCCH-f0              INTEGER (–16..15)
OPTIONAL,  -- Need R
   deltaF-PUCCH-f1              INTEGER (–16..15)
OPTIONAL,  -- Need R
   deltaF-PUCCH-f2              INTEGER (–16..15)
OPTIONAL,  -- Need R
   deltaF-PUCCH-f3              INTEGER (–16..15)
OPTIONAL,  -- Need R
   deltaF-PUCCH-f4              INTEGER (–16..15)
OPTIONAL,  -- Need R
   p0-Set                      SEQUENCE (SIZE (1..maxNrofPUCCH-P0-PerSet))
                               OF
P0-PUCCH  OPTIONAL,   -- Need M
   pathlossReferenceRSs        SEQUENCE (SIZE
(1..maxNrofPUCCH-PathlossReferenceRSs)) OF PUCCH-PathlossReferenceRS
OPTIONAL,  --Need M
   twoPUCCH-PC-AdjustmentStates  ENUMERATED {twoStates}
OPTIONAL,  -- NeedS
   ...
}
P0-PUCCH ::=                    SEQUENCE {
   p0-PUCCH-Id                     P0-PUCCH-Id,
   p0-PUCCH-Value                  INTEGER (–16..15)
}
P0-PUCCH-Id ::=                 INTEGER (1..8)
PUCCH-PathlossReferenceRS ::=      SEQUENCE {
   pucch-PathlossReferenceRS-Id      PUCCH-PathlossReferenceRS-Id,
   referenceSignal                   CHOICE {
      ssb-Index                         SSB-Index,
      csi-RS-Index                      NZP-CSI-RS-ResourceId
   }
}
```

The BS and/or UE may transmit and receive a DL and/or UL signal on a plurality of carriers by using carrier aggregation.

A carrier, which is a term used in the description above and embodiments to be described, may be replaced with another term. For example, it may be replaced with a term, such as a cell, a serving cell, or a component carrier (CC), and those terms may indicate the same meaning.

In LTE and NR, when the UE is connected to a serving BS, the UE has a procedure of reporting capability supported by the UE to the corresponding BS. In the description below, this is referred to as UE capability (reporting). The BS may transfer, to the UE in a connected state, a UE capability enquiry message requesting capability reporting. This message may include a UE capability request for each radio access technology (RAT) type from the BS. This request for each RAT type may include frequency band information that is requested. In addition, the UE capability enquiry message may request a plurality of RAT types in one RRC message container, or may include a UE capability enquiry message including a request for each RAT type a plurality of times and transfer it to the UE. In other words, the UE capability enquiry may be repeated a plurality of times, and the UE may configure a UE capability information message corresponding thereto and report the message a plurality of times. In the next-generation mobile communication system, a UE capability request for multi-radio dual connectivity (MR-DC) as well as NR, LTE, and EN-DC may be performed. For reference, although it is general to initially transmit the UE capability enquiry message after the UE performs connection, the UE capability enquiry message may be performed under any condition when the BS needs.

In this stage, the UE receiving a UE capability reporting request from the BS configures UE capability according to a RAT type and band information requested from the BS. A method, performed by the UE, of configuring UE capability in the NR system is summarized below.

1. When the UE receives, from the BS, a list for an LTE and/or NR band in response to a UE capability request, the UE configures a band combination (BC) for EN-DC and NR stand-alone (SA). In other words, a list of candidates for BC for EN-DC and NR-SA is configured based on bands requested through FreqBandList to the BS. In addition, a priority of bands has a priority in an order shown in FrequBandList.

2. When the BS sets a "eutra-nr-only" flag or a "eutra" flag and requests UE capability reporting, the UE completely removes BC candidates for NR, SA, and BC among the configured list of candidates for BC. This operation may only occur when an LTE BS (eNB) requests "eutra" capability.

3. Thereafter, the UE removes fallback BCs among the BC candidate list configured in the stage described above. Here, the fallback BC corresponds to a case where a band corresponding to at least one SCell is removed from a certain super set BC, and may be omitted because the super set BC may already cover the fall BC. This stage may be applied to MR-DC, that is, LTE bands. BCs remaining after this stage is a final "BC candidate list".

4. The UE selects BCs suitable for a RAT type requested from the final "BC candidate list" described above, and selects BCs to be reported. In the present stage, the UE configures supportedBandCombinationList in a predetermined order. In other words, the UE configures BC and UE capability to be reported, according to a preconfigured order of rat-Type. (nr→eutra-nr→eutra). In addition, featureSetCombination for the configured supportedBandCombinationList is configured, and a list of "feature set combination candidates" is configured among a BC candidate list obtained by removing a list for fall BC (including capability of the same or lower stage). The "feature set combination candidates" include a feature set combinations for both NR and EUTRA-NR BC, and may be obtained from a feature set combination of UE-NR-Capabilities and UE-MRDC-Capabilities containers.

5. In addition, when the requested rat Type is eutra-nr and performs impact, featureSetCombinations is included in both the two containers of UE-MRDC-Capabilities and UE-NR-Capabilities. However, a feature set of NR is only included in the UE-NR-Capabilities.

After the UE capability is configured, the UE transfers, to the BS, a UE capability information message including UE capability. Based on the UE capability received from the UE, the BS performs scheduling and transmission and reception management on the corresponding UE later.

Figure 11:
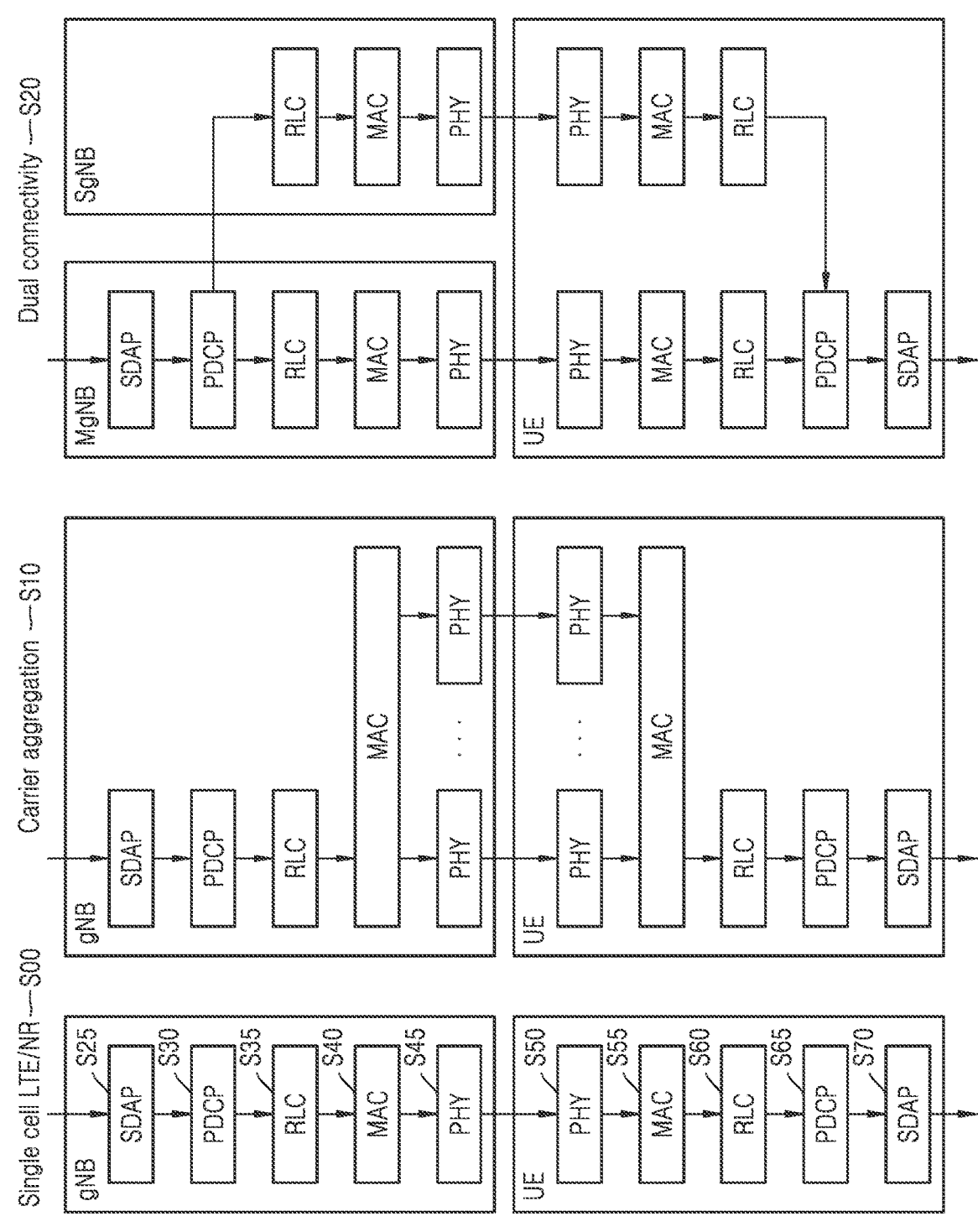
FIG. 11 is a diagram illustrating a radio protocol architecture of a base station and a user equipment in single cell, carrier aggregation, and dual connectivity situations according to an embodiment of the disclosure.

FIG. 11 is a diagram illustrating a radio protocol architecture of a BS and a UE in a single cell, carrier aggregation, and dual connectivity situation according to an embodiment of the disclosure.

Referring to FIG. 11, a radio protocol of a next-generation mobile communication system is composed of service data adaptation protocol S25 and S70 (NR SDAP), packet data convergence protocols S30 and S65 (NR PDCP), radio link control S35 and S60 (NR RLC), NR MAC S40 and S55, in each of the UE and the NR BS.

Main functions of the NR SDAP S25 and S70 may include some of the functions shown below.

Transfer of user plane data
Mapping between a QoS flow and a DRB for both DL and UL
Marking QoS flow ID in both DL and UL packets
Reflective QoS flow to DRB mapping for the UL SDAP PDUs The SDAP layer entity may configure through an RRC message with whether the UE is to use a header of the SDAP layer entity or a function of the SDAP layer entity, for each DCP layer entity or bearer or logical channel, and when the SDAP header is configured, may indicate an NAS reflective QoS and AS reflective QoS of the SDAP header so that the UE may update or reconfigure mapping information between a QoS flow and a data bearer for UL and DL. The SDAP header may include QoS flow ID information indicating QoS. The QoS information may be used as data processing priority information or scheduling information for appropriately supporting a service.

Main functions of the NR PDCP layer 10-30 or 10-65 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above, reordering of the NR PDCP device refers to a function of reordering PDCP PDUs received on a lower layer based on a PDCP sequence number (SN), and may include a function of transferring data to a higher layer in the reordered order. Alternatively, the reordering of the NR PDCP device may include a function of immediately transferring without considering an order, a function of recording lost PDCP PDUs by reordering, a function of reporting states of the lost PDCP PDUs to the transmission end, and a function of requesting retransmission for the lost PDCP PDUs.

Main functions of the NR RLC S35 or S60 may include some of the functions shown below.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, an in-sequence delivery of an NR RLC device indicates a function of in-sequence delivering RLC SDUs received from a lower layer to a higher layer. The in-sequence delivery function of the NR RLC device may include, when one original RLC SDU received as being divided into a plurality of RLC SDUs, reassembling and transferring the RLC SDUs, realigning the received RLC PDUs based on an RLC sequence number (SN) or a PDCP SN, performing reordering and recording the lost RLC PDUs, a function of reporting states of the missing RLC PDUs to the transmission end, and a function of requesting retransmission of the lost RLC PDUs.

The in-sequence delivery function of the NR RLC device may include a function of, when a lost RLC SDU is present, sequentially transferring only RLC SDUs up to before the lost RLC SDUs to a higher layer, or a function of, when a certain timer has expired even when a missing RLC SDU is present, sequentially transferring, to a higher layer, all RLC SDUs received before the timer started. Alternatively, the in-sequence delivery of the NR RLC layer 1*d*-10 or 1*d*-35 may include a function of delivering all RLC SDUs currently received to the upper layer in order, when a certain timer expired despite of a missing RLS SDU.

Furthermore, the out-of-sequence delivery function of the NR RLC layer may process the RLC PDUs in order of reception and deliver the RLC PDUs to the NR PDCP layer regardless of SNs (out-of-sequence delivery), and when a received RLC PDU is a segment, the NR RLC layer may reassemble the segment with other segments stored in a buffer or subsequently received, into a whole RLC PDU and may transmit the RLC PDU to the NR PDCP layer. The NR RLC layer may not have a concatenation function, and the function may be performed by the NR MAC layer or be replaced with a multiplexing function of the NR MAC layer.

In the above descriptions, the out-of-sequence delivery function of the NR RLC layer may include a function of directly delivering RLC SDUs received from a lower layer to a higher layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer S40 or S55 may be connected to several NR RLC layer entities configured in a UE, and the major functions of the NR MAC may include some of functions below.

Mapping between logical channels and transport channels
Multiplexing/demultiplexing of MAC SDUs
Scheduling information reporting Error correction through HARQ Priority handling between logical channels of one UE Priority handling between UEs by means of dynamic scheduling MBMS service identification Transport format selection Padding The NR PHY layer S45 or S50 may perform channel coding or modulation on upper layer data and convert the same into an OFDM symbol and transmit the OFDM symbol on a radio channel, or demodulate an OFDM symbol received via a radio channel and perform channel decoding on the demodulated OFDM symbol and transfer the channel-decoded OFDM symbol to a higher layer.

A detailed structure of the radio protocol architecture may be variously modified depending on an operating method of a carrier (or cell). For example, when the BS transmits data to the UE based on a single carrier (or cell), the BS and UE use a protocol structure having a single structure for each layer, as in S00. On the other hand, when the BS transmits data to the UE based on carrier aggregation (CA) using a multi-carrier in a single TRP, the BS and UE have a single structure up to RLC, as in S10, but use a protocol structure that multiplexes a PHY layer through a MAC layer. In another example, when the BS transmits data to the UE based on dual connectivity (DC) using a multi-carrier in a multi-TRP, the BS and UE have a single structure up to RLC, as in S20, but use a protocol structure that multiplexes a PHY layer through a MAC layer.

Substitute Specification-Clean Version Referring to descriptions related to the PDCCH and beam configuration above, in current Rel-15 and Rel-16 NR, repeated PDCCH transmission is not supported, and thus, it is difficult to achieve required reliability in a scenario that requires high reliability, such as URLLC. In the disclosure, a method of repeated PDCCH transmission through a plurality of TRPs is provided so as to improve PDCCH reception reliability of the UE. Details of the method is described in greater detail in the embodiments below.

Embodiments of the disclosure will now be described in conjunction with the accompanying drawings. The content of the disclosure may be applied to frequency division duplex (FDD) or time division duplex (TDD) systems. Hereinafter, in the disclosure, higher signaling (or higher layer signaling) is a method of transferring a signal that is transferred from the BS to the UE by using a DL data channel of a physical layer or transferred from the UE to the BS by using a UL data channel of a physical layer, and may be referred to as RRC signaling or PDCP signaling, or a MAC CE.

Hereinafter, in the disclosure, when determining whether cooperative communication is applied, the UE may use various methods, such as a case in which one or more PDCCHs assigning a PDSCH to which cooperative communication is applied have a specific format, a case in which one or more PDCCHs assigning a PDSCH to which cooperative communication is applied include a specific indicator informing whether cooperative communication is applied, a case in which one or more PDCCH(s) assigning a PDSCH to which cooperative communication is applied is scrambled by a specific RNTI, or a case in which it is assumed that cooperative communication is applied in a specific period indicated through a higher layer. Hereinafter, for convenience of explanation, a case in which the UE receives a PDSCH to which cooperative communication is applied on the basis of similar conditions to the above is referred to as an NC-JT case.

Hereinafter, in the disclosure, determination of a priority between a and B may be variously referred to as selecting one that has a higher priority according to a predetermined priority rule and performing an operation corresponding thereto, or omitting or dropping an operation for one having a lower priority.

Hereinafter, the above examples will be described in the present disclosure through a plurality of embodiments, but the embodiments are not independent and one or more embodiments may be applied simultaneously or in combination.

According to an embodiment of the disclosure, the NC-JT may be used for the UE to receive a PDSCH from a plurality of TRPs.

Unlike the existing communication system, the 5G wireless communication system may support not only a service requiring a high transmission rate, but also both a service having a very short transmission latency and a service requiring high connection density. In a wireless communication network including a plurality of cells, TRPs, or beams, coordinated transmission between each cell, TRP, or/and beam may satisfy various service requirements by increasing a strength of a signal received by the UE or by efficiently performing control on an interference between each cell, TRP, or/and beam.

Joint transmission (JT) is a representative transmission technique for the coordinated communication described above, and is a technique of transmitting a signal to one UE through a plurality of different cells, TRPs, or/and beams so as to increase a strength of a signal received by the UE or a processing rate. In this case, the characteristics of channels between each cell, TRP, or/and beam and the UE may significantly different, and in particular, in a case of NC-JT that supports non-coherent precoding between each cell, TRP, or/and beam, individual precoding, MCS, resource assignment, TCI indication, or the like may be necessary depending on the channel characteristics for each link between each cell, TRP, or/and beam and the UE.

The NC-JT transmission described above may be applied to at least one channel from among a PDSCH, a PDCCH, a PUSCH, or a PUCCH. During PDSCH transmission, transmission information, such as precoding, an MCS, resource assignment, or a TCI, is indicated through DL DCI, and for NC-JT transmission, the transmission information has to be independently indicated for each cell, TRP, or/and beam. This is a main factor for increasing a payload necessary for DL DCI transmission and may adversely affect reception performance of PDCCH for transmitting DCI. Accordingly, for JT support of a PDSCH, it is necessary to carefully design a tradeoff between a DCI information amount and control information reception performance.

Figure 12:
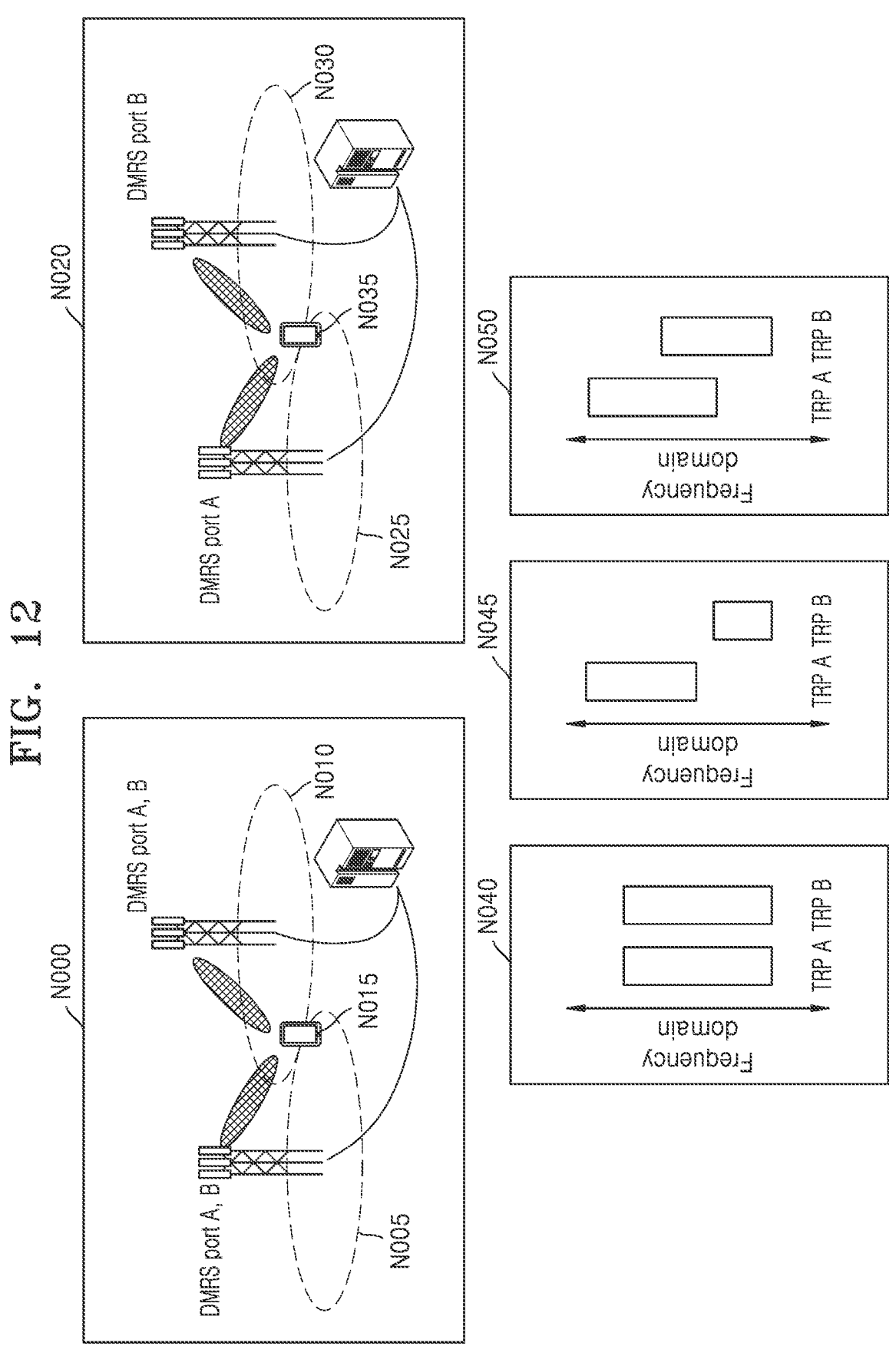
FIG. 12 is a diagram illustrating an example of antenna port configuration and resource assignment for cooperative communication in a wireless communication system according to an embodiment of the disclosure.

FIG. 12 is a diagram illustrating an example of an antenna port configuration and resource assignment for transmitting a PDSCH by using cooperative communication in a wireless communication system according to an embodiment of the disclosure.

Referring to FIG. 12, examples of PDCSH transmission are described for each scheme of joint transmission (JT), and examples for assigning radio resources for each TRP are shown.

Referring to FIG. 12, an example N000 of coherent joint transmission (C-JT) supporting coherent precoding between each cell, TRP, or/and beam is shown.

In a case of C-JT, TRP A N005 and TRP B N010 transmit single data (PDSCH) to the UE N015, and joint precoding may be performed in the plurality of TRPs. This may denote that a DMRS is transmitted through the same DMRS port so that TRP A N005 and TRP B N010 transmit the same PDSCH. For example, each of the TRP A N005 and TRP B N010 may transmit the DMRS to the UE through a DMRS port A and DMRS B. In this case, the UE may receive one piece of DCI information for receiving one PDSCH modulated based on the DMRS transmitted through the DMRS port A and the DMRS B.

FIG. 12 illustrates an example N020 of NC-JT that supports non-coherent precoding between each cell, TRP, or/and beam for PDSCH transmission.

In a case of NC-JT, a PDSCH is transmitted to the UE N035 for each cell, TRP, or/and beam, and individual precoding may be applied to each PDSCH. Each cell, TRP, or/and beam may transmit different PDSCHs or PDSCH layers to the UE so as to improve a processing rate compared to transmission via a single cell, TRP, or/and beam. In addition, each cell, TRP, or/and beam may repeatedly transmit the same PDSCH to the UE so as to improve reliability compared to transmission via a single cell, TRP, or/and beam. Hereinafter, for convenience of explanation, a cell, a TRP, or/and a beam are collectively referred to as a TRP.

In this case, for PDSCH transmission, various radio resource assignments may be considered, such as a case N40 where frequency and time resources used in a plurality of TRPs are all the same, a case N045 where frequency and time resources used in a plurality of TRPs do not overlap at all, or a case N050 where part of frequency and time resources used in a plurality of TRPs overlap.

For support of NC-JT, pieces of DCI of various forms, structures, and relationships may be considered to simultaneously assign a plurality of PDSCHs to one UE.

Figure 13:
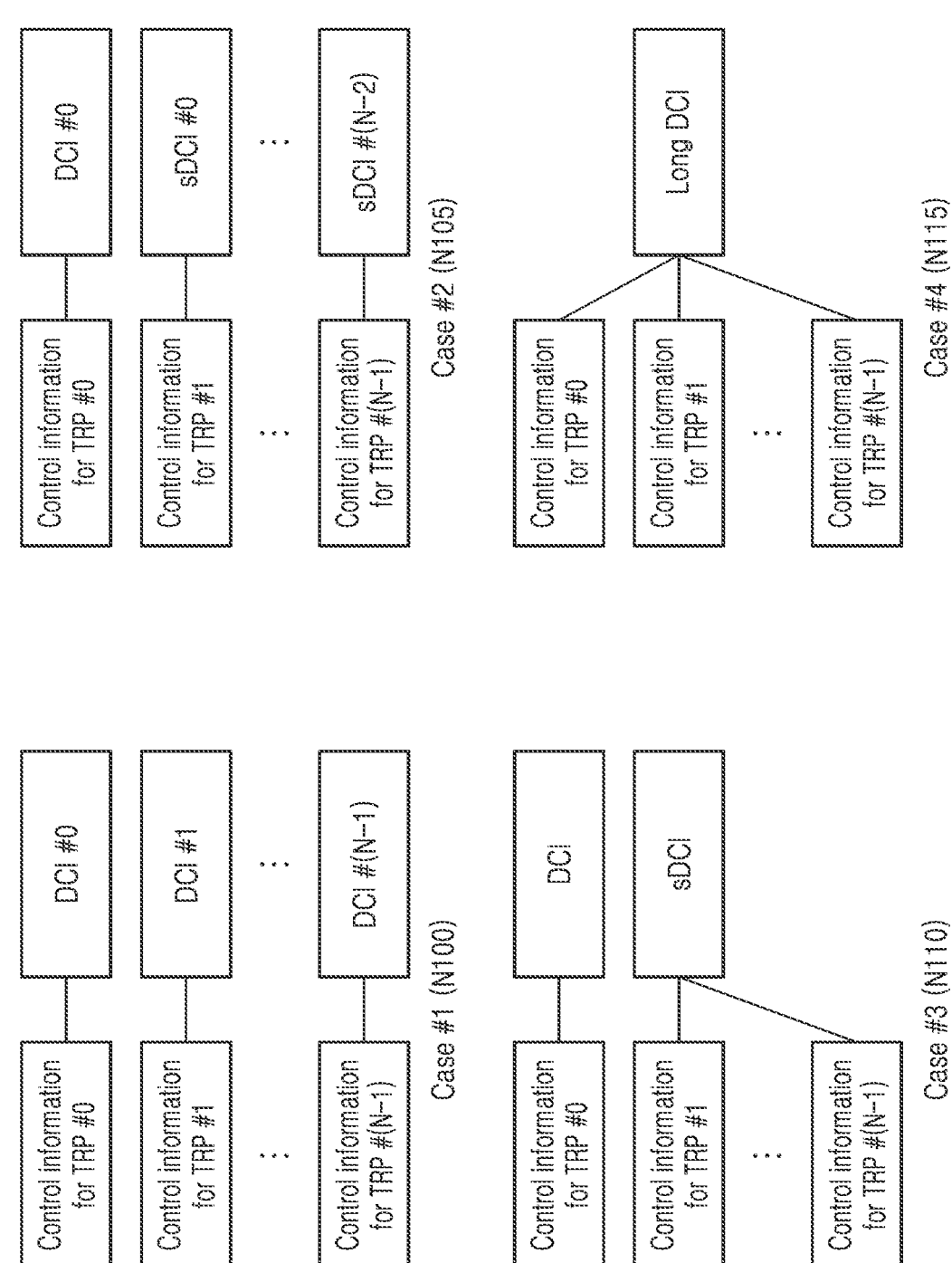
FIG. 13 is a diagram illustrating an example of a configuration of downlink control information (DCI) for cooperative communication in a wireless communication system according to an embodiment of the disclosure.

FIG. 13 is a diagram illustrating an example of a configuration of DCI for NC-JT in which each TRP transmits different PDSCHs or PDSCH layers to the UE in a wireless communication system, according to an embodiment of the disclosure.

Referring to FIG. 13, case #1 (N100) is an example in which, in a state in which different N−1 PDSCHs are transmitted from N−1 additional TRPs (TRP #1 to TRP #(N−1)) in addition to a serving TRP (TRP #0) used when transmitting a single PDSCH, control information for the PDSCHs transmitted from the N−1 additional TRPs is transmitted independently of control information for the PDSCH transmitted from the serving TRP. In other words, the UE may obtain control information for PDSCHs transmitted from the different TRPs (TRP #0 to TRP #(N−1)) through independent pieces of DCI (DCI #0 to DCI #(N−1)). Formats of the independent pieces of DCI may be the same as or different from each other, and payloads between the pieces of DCI may also be the same as or different from each other. In case #1 described above, control of each PDSCH and the freedom of assignment may be completely guaranteed. However, when each piece of DCI is transmitted in different TRPs, a coverage difference occurs for each DCI, and reception performance may be degraded.

Case #2 (N105) shows an example in which, in a state in which different N−1 PDSCHs are transmitted from N−1 additional TRPs (TRP #1 to TRP #(N−1)) in addition to a serving TRP (TRP #0) used when transmitting a single PDSCH, each of pieces of control information (DCI) for PDSCHs of the N−1 additional TRPs is transmitted, and each of those pieces of DCI is dependent on control information for a PDSCH transmitted from the serving TRP.

For example, in a case of DCI #0, which is control information for a PDSCH transmitted from the serving TRP (TRP #0), all information elements of DCI format 1_0, DCI format 1_1, and DCI format 1_2 are included, but in a case of pieces of shortened DCI (hereinafter, "sDCI") (sDCI #0 to sDCI #(N−2)), which is control Substitute Specification-Clean Version information for PDSCHs transmitted from cooperative TRPs (TRP #1 to TRP #(N−1)), only some of the information elements of DCI format 1_0, DCI format 1_1, and DCI format 1_2 may be included. Accordingly, in a case of sDCI transmitting control information for PDSCHs transmitted from the cooperative TRPs, a payload thereof is small compared to normal DCI (nDCI) transmitting control information related to a PDSCH transmitted from the serving TRP, and thus, reserved bits may be included, compared to nDCI.

In case #2 described above, control of each PDSCH and freedom of assignment may be limited depending on the content of an information element included in the sDCI. However, reception performance of the sDCI is excellent compared to nDCI, and thus, a probability that a coverage difference for each piece of DCI occurs may be reduced.

Case #3 (N110) shows an example in which, in a state in which different N−1 PDSCHs are transmitted from the N−1 additional TRPs (TRP #1 to TRP #(N−1)) in addition to the serving TRP (TRP #0) used when transmitting a single PDSCH, one piece of control information for the PDSCHs of the (N−1) additional TRPs is transmitted, and this DCI is dependent on control information for the PDSCH transmitted from the serving TRP.

For example, in a case of DCI #0, which is control information for a PDSCH transmitted from a serving TRP (TRP #0), all information elements of DCI format 1_0, DCI format 1_1, and DCI format 1_2 are included, and in a case of control information for PDSCHs transmitted from cooperative TRPs (TRP #1 to TRP #(N−1)), only part of the information elements of DCI format 1_0, DCI format 1_1, and DCI format 1_2 may be collected and transmitted in one "secondary" DCI (sDCI). For example, the sDCI described above may include at least one piece of information from among pieces of HARQ-related information, such as frequency domain resource assignment, time domain resource assignment, or an MCS of the cooperative TRPs. In addition, in a case of information not included in the sDCI, such as a BWP indicator or a carrier indicator, DCI (DCI #0, normal DCI, nDCI) of the serving TRP may be followed.

In case #3 (N110), control of each PDSCH and freedom of assignment may be limited depending on the content of the information element included in the sDCI. However, it is possible to adjust reception performance of the sDCI, and complexity of DCI blind decoding of the UE may be reduced compared to case #1 (N100) or case #2 (N105).

Case #4 (N115) is an example in which, different N−1 different PDSCHs are transmitted from N−1 additional TRPs (TRP #1 to TRP #(N−1) in addition to a serving TRP (TRP #0) used when transmitting a single PDSCH, pieces of control information for the PDSCHs transmitted from the N−1 additional TRPs are transmitted in the same DCI (Long DCI) as control information for the PDSCH transmitted from the serving TRP. In other words, the UE may obtain, through a single piece of DCI, the control information for the PDSCHs transmitted from the different TRPs (TRP #0 to TRP #(N−1). In case #4 (N115), the complexity of DCI blind decoding of the UE may not be increased, but control of a PDSCH and freedom of assignment may be low, such as the number of cooperative TRPs being limited depending on the limitation of long DCI payloads.

In the following description and embodiments, sDCI may refer to various pieces of auxiliary DCI, such as shortened DCI, secondary DCI, or normal DCI (DCI format 1_0 or 1_1 described above) including PDSCH control information transmitted in a cooperative TRP, and unless a specific limitation is specified, the corresponding description may be similarly applied to the various auxiliary pieces of DCI described above.

In the following description and embodiments, cases of case #1 (N100), case #2 (N1-5), and case #3 (N110), in which one or more pieces of DCIs (PDCCHs) are used for support of NC-JT may be identified as multiple PDCCH-based NC-JT, and a case of case #4 (N115) described above, in which a single piece of DCI (PDCCH) is used for support of NC-JT may be identified as single PDCCH-based NC-JT. In the multiple PDCCH-based PDSCH transmission, a CORESET in which DCI of a serving TRP (TRP #0) is scheduled and a CORESET in which pieces of N−1 DCI of cooperative TRPs (TRP #1 to TRP #(N−1)) are scheduled may be identified. A method for distinguishing between CORESETs may include an identification method through a higher layer indicator for each CORESET, an identification method through beam configuration for each CORESET, or the like. In addition, in the single PDCCH-based NC-JT, a single piece of DCI schedules a single PDSCH having a plurality of layers instead of scheduling a plurality of PDSCHs, and the plurality of layers described above may be transmitted from a plurality of TRPs. In this case, a connection relationship between a layer and a TRP transmitting the layer may be indicated through indication of a transmission configuration indicator (TCI) for the layer.

In embodiments of the disclosure, a "cooperative TRP" may be replaced with various terms, such as a "cooperative panel" or a "cooperative beam", in actual applications.

In embodiments of the disclosure, "a case where NC-JT is applied" may be variously understood depending on the situation, such as "a case where the UE simultaneously receives one or more PDSCHs in one BWP", "a case where the UE simultaneously receives a PDSCH based on two or more TCI indications in one BWP", or "a case where a PDSCH received by the UE is associated with one or more DMRS port groups".

In the disclosure, a radio protocol architecture for NC-JT may be variously used depending on a TRP deployment scenario. For example, when there is no or small backhaul delay between cooperative TRPs, a method (CA-like method) of using a structure based on MAC layer multiplexing is possible, similar to S10 in FIG. 11. On the other hand, when a backhaul delay between cooperative TRPs is too large to be ignored (for example, when at least 2 ms of time is necessary for exchanging information, such as CSI, scheduling, or HARQ-ACK, between the cooperative TRPs), similar to S20 in FIG. 11, a method (DC-like method) of using an independent structure for each TRP from an RLC layer so as to ensure robust characteristics against delay is possible.

A UE supporting C-JT/NC-JT may receive parameters or setting values related to C-JT/NC-JT from a higher layer configuration, and set RRC parameters of the UE based on the above. For the upper layer configuration, the UE may utilize UE capability parameters, for example tci-StatePDSCH. Here, the UE capability parameters, for example, the tci-StatePDSCH, may define TCI states for the purpose of PDSCH transmission, and the number of TCI states may be configured to 4, 8, 16, 32, 64, and 128 in FR1 and 64 and 128 in FR2, and from among the configured number, up to 8 states that may be indicated to 3 bits of TCI field of DCI through a MAC CE message may be configured. The maximum value of 128 denotes a value indicated by maxNumberConfiguredTCIstatesPerCC within the tci-StatePDSCH parameters included in a capability signaling of the UE. As described above, a series of configuration processes from the upper layer configuration to the MAC CE configuration may be applied to a beamforming indication or beamforming change command for at least one PDSCH in one TRP.

Various embodiments of the disclosure describe how the BS activates/deactivates a TCI state through a MAC CE signaling. In particular, when assigning a PDSCH for a specific UE, as in DCI format 1_1 or 1_2, a direction indication of beamforming or a direction change command of beamforming may be dynamically supported by using a TCI field.

The beamforming direction indication or beamforming direction change command denotes an operation applied when the UE identifying TCI states field information in DCI format 1_1 or 1_2 receives a PDSCH via DL after a predetermined time, and the direction denotes a beamforming configuration direction corresponding to a DL RS of a BS/TRP that is QCLed.

First, the BS or UE may determine to use a Rel-15 MAC CE for a Rel-15 DCI format or a Rel-16 MAC CE for a Rel-16 DCI format. As described above, different solutions are proposed depending on the methods of identifying a MAC CE structure of rel-15 and a MAC CE of rel-16.

Figure 14:
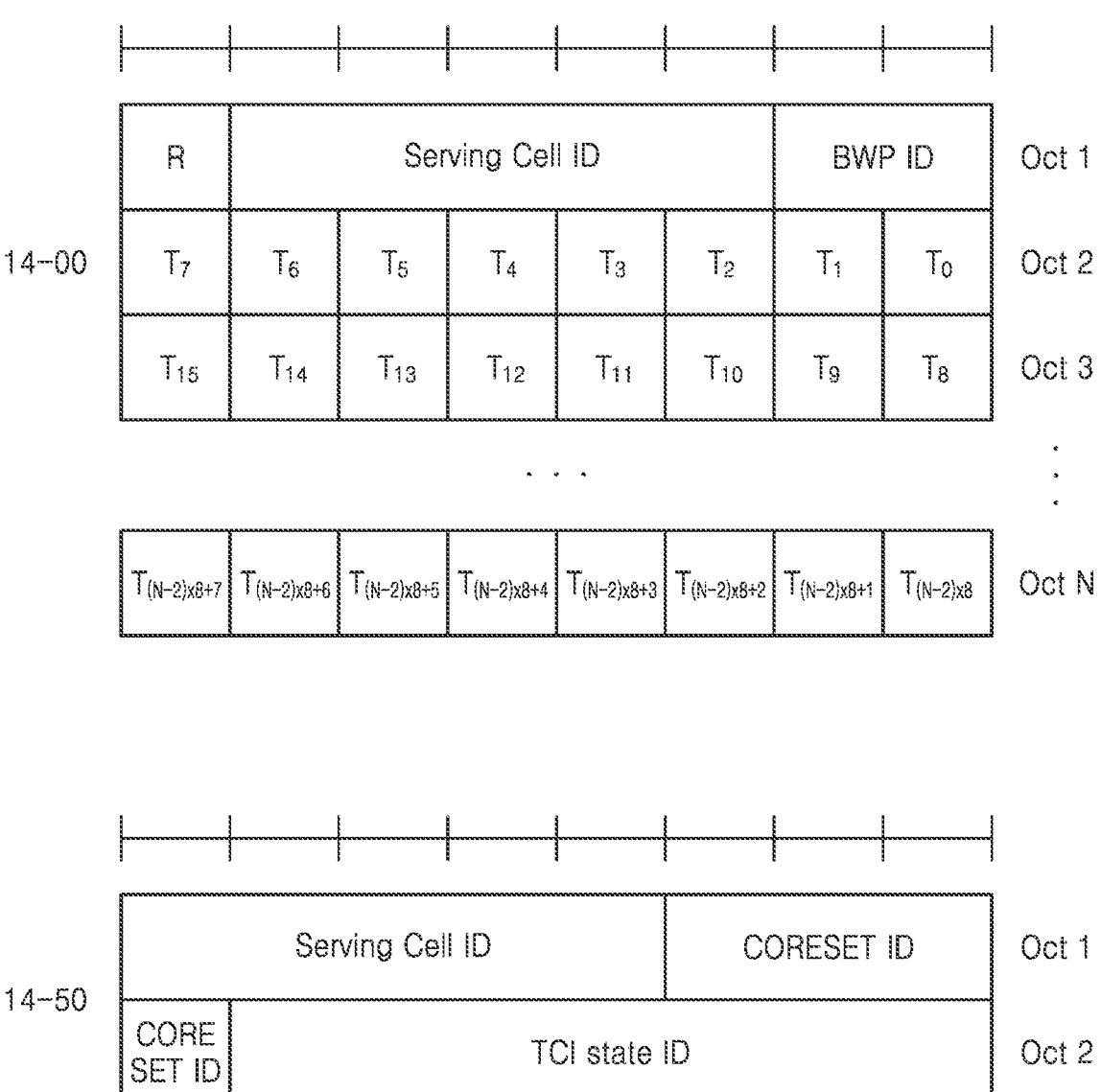
FIG. 14 is a diagram illustrating a medium access control (MAC) control element (CE) for transmission configuration indicator (TCI) state activation of a user equipment (UE)-specific PDCCH according to an embodiment of the disclosure.

FIG. 14 is a diagram illustrating a MAC CE structure for TCI state activation of a UE-specific PDCCH according to an embodiment of the disclosure.

FIG. 14 illustrates a MAC CE structure 14-00 for TCI state activation of a Rel-15-based UE-specific PDCCH.

The meaning of each field within the MAC CE and a value configurable to each field are as in Table 34 shown below.

TABLE 34

Serving Cell ID(identity of serving cell)This field indicates the identity of the Serving Cell for which the MAC CE applies. The length of the field is 5 bits;
CORESET ID (identity of CORESET): This field indicates a Control Resource Set indentified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
TCI State ID (Identity for transmission configuration indication): This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

In addition, FIG. 14 illustrates a MAC-CE structure 14-50 for TCI state activation/deactivation of a Rel-15-based UB-specific PDSCH.

The meaning of each field within the MAC CE and a value configurable to each field are as in Table 35 shown below.

operating by C-JT/NC-JT in rel-16, and is operated with two TRPs, up to 256 TCI states may be configured. Here, the rel-16 MAC CE may include part of all of TCI states supported by the MAC CE of rel-15 in RRC configured TCI states for rel-16. Specifically, when the rel-16 MAC CE includes all of the TCI states supported by the MAC CE of

TABLE 35

Serving Cell ID (Identity of serving cell): This field indicates the identity of the Serving Cell for which the MAC
CE applies. The length of the field is 5 bits;
BWP ID (identity of bandwidth part): This field indicates a DL BWP for which the MAC CE applies as the codepoint of the DCI bandwidth part indicator field as specified in TS 38.212 [9]. The length of the BWP ID field is 2 bits;
$T_i$ (Identity of TCI state): If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field.
The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;
R(Reserved bit): Reserved bit, set to 0.

A MAC CE of Rel-16 may be configured in a form in which a MAC CE message of rel-15 is partially extended. The present embodiment may be proposed such that all TCI states activated by the rel-15 MAC CE are included in TCI states activated by the rel-16 MAC CE.

Figure 15:
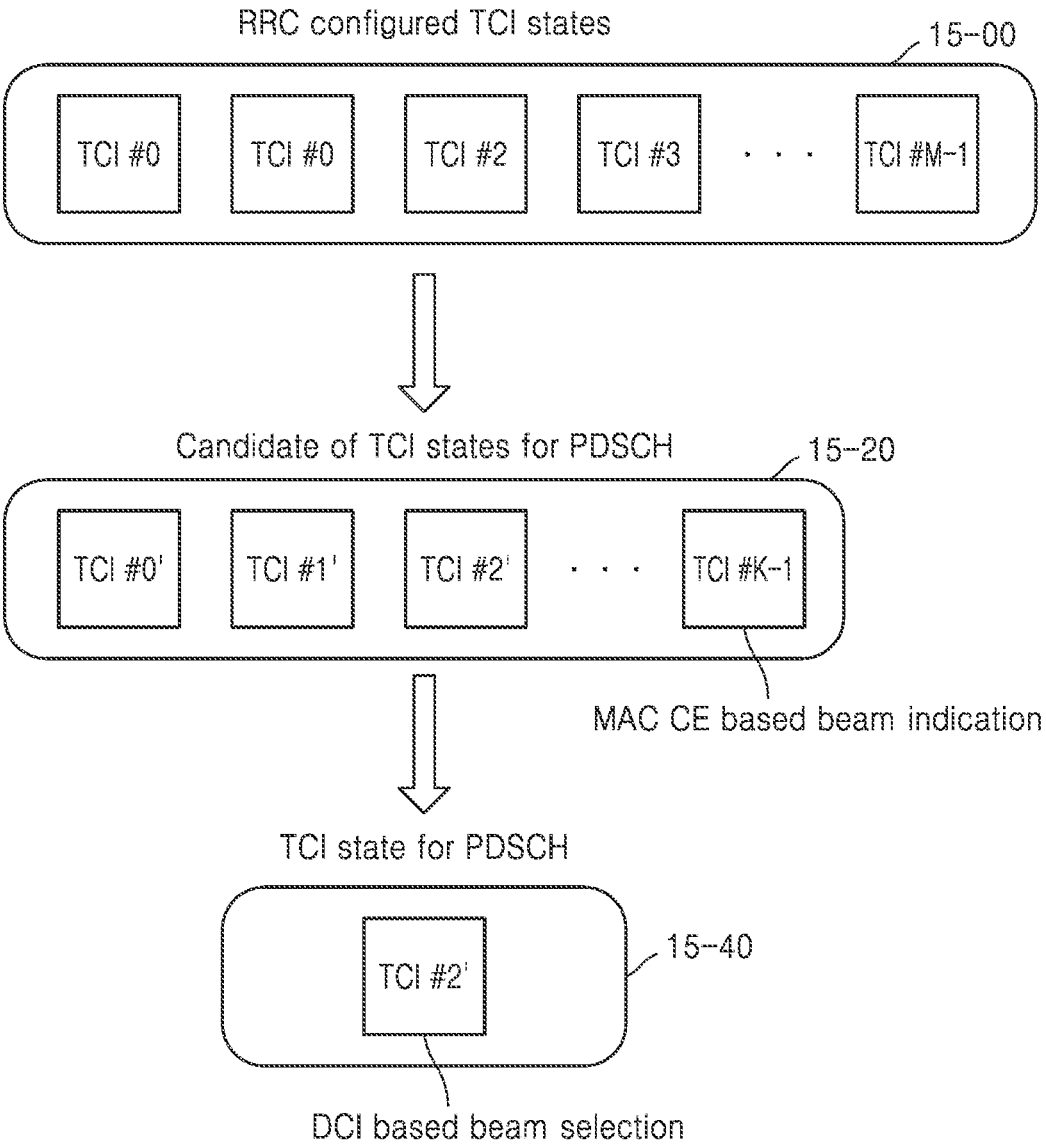
FIG. 15 is a diagram illustrating an example of a configuration of a TCI state according to an embodiment of the disclosure.

FIG. 15 is a diagram illustrating an example of a configuration of a TCI state according to an embodiment of the disclosure. For example, as shown in FIG. 15, the BS may determine the entire TCI states of RRC configured TCI rel-15, extends in proportion to the number of BSs/TRPs operating by C-JT/NC-JT, and is operated with two TRPs, up to 2K TCI states may be configured.

Table 36 shows details of the tci-StatePDSCH parameters described in the embodiment above. Specifically, a FR2 mandatory value of a parameter maxNumberConfiguredT-CIstatesPerCC may be modified from 64 to 128 or 256, or may be additionally added to 64, 128, or 256, for C-JT/NC-JT purposes.

TABLE 36

| Definitions for parameters | Per | M | FDD-TDD DIFF | FR1-FR2 DIFF |
|---|---|---|---|---|
| tci-StatePDSCH | Band | Yes | N/A | N/A |
| Defines support of TCI-States for PDSCH. The capability signalling comprises the following parameters:<br>    maxNumberConfiguredTCIstatesPerCC indicates the maximum number of configured TCI-states per CC for PDSCH. For FR2, the UE is mandated to set the value to 64. For FR1, the UE is mandated to set these values to the maximum number of allowed SSBs in the supported band;<br>    maxNumberActiveTCI-PerBWP indicates the maximum number of activated TCI-states per BWP per CC, including control and data. If a UE reports X active TCI state(s), it is not expected that more than X active QCL type D assumption(s) for any PDSCH and any CORESETs for a given BWP of a serving cell become active for the UE.<br>Note the UE is required to track only the active TCI states. | | | | | states 15-00 of rel-15 as M TCI states (TCI #0, TCI #1, TCI #2, . . . , TCI #M−1), and from among them, select K TCI states (TCI #0', TCI #1', TCI #2', . . . , TCI #K−1) as a subset 15-20 of TCI states selected by the MAC CE of rel-15. On the other hand, the BS or UE supporting rel-16 may additionally configure RRC configured TCI states supporting rel-16 or may use the RRC configured TCI states configured in rel-15 as it is. In this case, the RRC configured TCI states supporting rel-16 may include part or all of the RRC configured TCI states configured in rel-15. When M=128, the TCI states of rel-16 may be greater than or equal to 128. When the BS or UE extends the number of TCI states supported in rel-15 in proportion to the number of BSs/TRPs For example, the BS or UE supporting Rel-15 and rel-16 may configure a maximum value for each of rel-15 and rel-16 for TCI states configuration through a MAC CE, and configure the number of TCI states to a value equal to or less than the configured maximum value. As a way of configuring the number of TCI states to a value equal to or less than the maximum value, various embodiments below may be proposed.

The number of TCI states activated by the MAC CE messages of Rel-15 and rel-16 may be configured by a UE capability value reported by the UE. According to another embodiment, the number of TCI states activated by the MAC CE messages of rel-15 and rel-16 may be determined as a value previously configured by the BS. According to another embodiment, the number of TCI states activated by the MAC CE messages of rel-15 and rel-16 may be determined as a value previously appointed by the BS and UE.

For example, as shown in FIG. 15, the BS and UE may determine the entire TCI states 15-00 of the RRC configured TCI states of rel-15 as M TCI states (TCI #0, TCI #1, TCI #2, . . . , TCI #M−1), and from among them, select a subset 15-20 of TCI states selected by the MAC CE of rel-15 and arrange K TCI states (TCI #0', TCI #1', TCI #2', . . . , TCI #K−1). When TCI #0 is selected from among the M TCI states, this may be arranged in TCI #0'. Here, for example, a maximum value of K for the BS or UE supporting rel-15 may be configured or determined as 8, and a maximum value of K for the BS and UE supporting rel-16 may also be configured as 8. When the maximum value is configured as 8, the BS may indicate the UE to select a beam for a PDSCH through a DCI based beam selection operation within one CORESET. The beam selection may be determined by identifying TCI field information 15-40 in DCI among up to 8 beams.

TCI field #I indicated in FIG. 15 may be selected as any of values of 0 to 7. For example, when a TCI field in the DCI is indicated as 000, TCI #0' (TCI #I=TCI #0') from among TCI #0', TCI #1', TCI #2', TCI #3', TCI #4', TCI #5', TCI #6', and TCI #7'. TCI field #I described above may be referred to as a TCI codepoint. In the embodiment described above, each maximum value is configured to 8 (K=8), but may be configured to a value less than 8. In the embodiment described above, a maximum value K of the MAC CE for Rel-15 and a maximum value K of the MAC CE for rel-16 are equal, but may be configured to another value.

In another example, when it is extended in proportion to the number of BSs/TRPs operating through C-JT/NC-JT and operates with two TRPs, a maximum value of K for the BS and UE supporting rel-16 may be configured to 16. When the maximum value is configured to 16, the BS may indicate the UE to select one or more beams for a PDSCH through a DCI based beam selection operation in one CORESET. When K is 16, any of values from 0 to 15 may be selected for #I selected and indicated by the BS. In the embodiment described above, each maximum value is configured to 16 (K=16), but may be configured to a value less than 16.

According to an embodiment of the disclosure, a DL control channel for NC-JT may be configured based on a multi-PDCCH.

During DCI transmission for PDSCH scheduling for each TRP, NC-JT which is based on multiple PDCCHs may have a CORESET or search space identified for each TRP. The CORESET or search space for each TRP may be configured as in at least one of the cases below.

Upper layer index configuration for each CORESET: an index value may be included in CORESET configuration information configured as a higher layer, and a TRP transmitting a PDCCH in the corresponding CORESET may be identified as an index value for each configured CORESET. In other words, in a set of CORESETs having the same upper layer index value, it may be considered that the same TRP transmits a PDCCH or a PDCCH scheduling a PDSCH of the same TRP is transmitted. The index for each CORESET may be referred to as CORESETPoolIndex, and for CORE-SETS configured with the same CORESETPoolIndex value, it may be considered that a PDCCH is transmitted from the same TRP. In a case of a CORESET in which a CORESETPoolIndex value is not configured, it may be considered that a default value of CORE-SETPoolIndex is configured, and the default value described above may be 0.

Configuration of multiple PDCCH-Config: Multiple PDCCH-Config are configured in one BWP, and each PDCCH-Config may include PDCCH configuration for each TRP. In other words, a list of CORESETs for each TRP and/or a list of search spaces for each TRP may be configured in a single PDCCH-config, and one or more CORESETs and one or more search spaces included in the single PDCCH-Config may be considered to correspond to a specific TRP.

Beam/beam group configuration for CORESET: Through a beam or beam group configured for each CORESET, a TRP corresponding to the corresponding CORESET may be identified. For example, when the same TCI state is configured to multiple CORESETs, it may be considered that the corresponding CORESETs are transmitted through the same TRP or a PDCCH scheduling a PDSCH of the same TRP is transmitted in the corresponding CORESET.

Beam/beam group configuration for search space: A beam or beam group is configured for each search space, and through this, a TRP for each search space may be identified. For example, when the same beam/beam group or TCI state is configured in multiple search spaces, it may be considered that the same TRP transmits a PDCCH in the corresponding search spaces, or that a PDCCH scheduling a PDSCH of the same TRP is transmitted in the corresponding search spaces.

By identifying a CORESET or search space for each TRP, as described above, PDSCH and HARQ-ACK information classification for each TRP is possible, and through this, it is possible to independently generate a HARQ-ACK codebook and independently use a PUCCH resource for each TRP.

The configuration described above may be independent for each cell or BWP. For example, two different CORE-SETPoolIndex values are configured in a PCell, whereas a CORESETPoolIndex value may not be configured in a specific Scell. In this case, NC-JT transmission is configured in the PCell, whereas it may be considered that NC-JT transmission is not configured in the Scell in which no CORESETPoolIndex value is configured.

According to another embodiment of the disclosure, a DL beam for NC-JT transmission may be configured based on a single-PDCCH.

In single PDCCH-based NC-JT, a PDSCH transmitted by multiple TRPs may be scheduled with a single piece of DCI. In this case, as a way to indicate the number of TRPs transmitting the corresponding PDSCH, the number of TCI states may be used. In other words, when the number of TCI states indicated to the DCI scheduling the PDSCH is 2, single-PDCCH-based NC-JT may be considered, and when the number of TCI states is 1, single-TRP transmission may be considered. TCI states indicated to the DCI described above may correspond to one or two TCI states from among TCI states activated by a MAC-CE. When the TCI state of the DCI correspond to the two TCI states activated by the MAC-CE, a correspondence relationship is established between a TCI codepoint indicated in the DCI and the TCI states activated by the MAC-CE, and this may be when the number of TCI states activated by the MAC-CE that correspond to the TCI codepoint is 2.

The configuration described above may be independent for each cell or BWP. For example, in the PCell, a maximum number of activated TCI states corresponding to a single TCI codepoint is 2, whereas, in the SCell, a maximum number of activated TCI states corresponding to a single TCI codepoint may be 1. In this case, it may be considered that NC-JT transmission is configured in the PCell, but that NC-JT transmission is not configured in the SCell described above.

According to an embodiment of the disclosure, a method of repeatedly transmitting an NC-JT PDSCH is described below.

In the present embodiment, a detailed configuration and indication method for repeatedly transmitting, by two or more TRPs, the same PDSCH on the same transmission band, for example, a transmission band, a component carrier, or a BWP, is provided.

Figure 16:
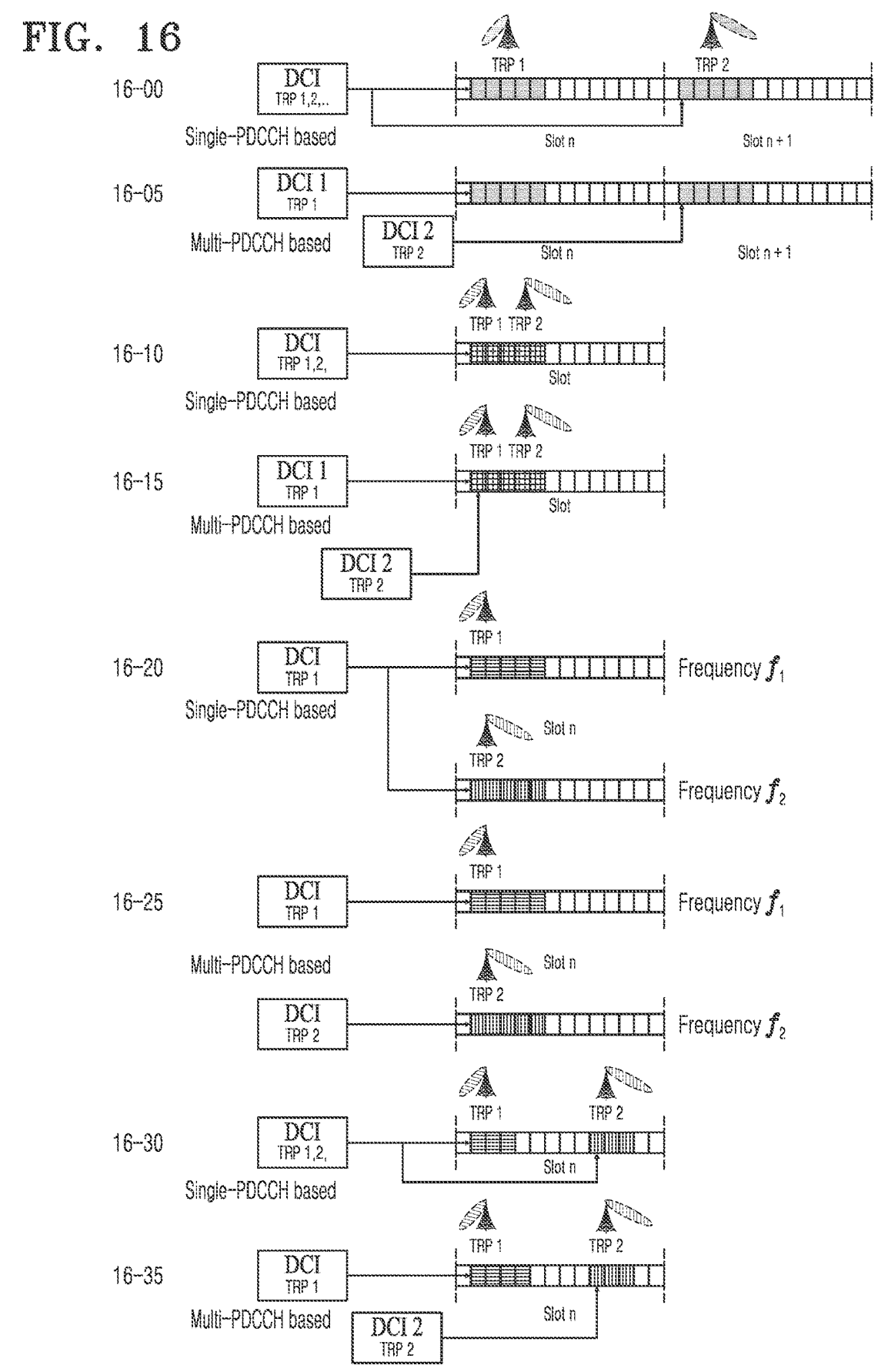
FIG. 16 is a diagram for describing a case in which two or more transmission and reception points (TRPs) repeatedly transmit the same PDSCH, according to an embodiment of the disclosure.

FIG. 16 is a diagram illustrating an example of repeated transmission of multiple TRPs, to which various resource assignment methods are applied, in a wireless communication system according to an embodiment of the disclosure.

FIG. 16 is a diagram for describing a case in which two or TRPs repeatedly transmit the same PDSCH, according to an embodiment of the disclosure.

Referring to FIG. 16, in a current NR system, the number of slots as many as the number of repeated transmissions is needed to repeatedly transmit the same PDSCH as described above, and during each repeated transmission, the same cell, TRP and/or beam is used. On the other hand, through an embodiment of the disclosure, higher reliability can be achieved by using different TRPs for repeated transmissions in each slot (16-00, 16-05). Meanwhile, depending on the capability and delay time requirements of the UE and an available resource state between TRPs, different repeated transmission schemes may be used. For example, when the UE has a capability of NC-JT reception, each TRP may use a method of transmitting (SDM) the same PDSCH on the same time and frequency resources, so that a use rate of frequency resources may be increased and latency required for PDSCH decoding may be reduced (16-10, 16-15). The corresponding method is efficient when beams between TRPs to be simultaneously transmitted are close to orthogonal to each other and inter-beam interference is small.

In another embodiment, each TRP may use a method of transmitting (FDM) the same PDSCH on the same time and non-overlaying frequency resources (16-20, 16-25). The corresponding method is efficient when inter-beam interference of TRPs to be transmitted is large and the number of available frequency resources of each TRP is large. In another embodiment, each TRP may use a method of transmitting (TDM) the same PDSCH on different OFDM symbols within the same slot (16-30, 16-35). The corresponding method is efficient when the number of available frequency resources of each TRP is not large and a data size to be transmitted is small. In addition to the methods described above, modification based on the above-described methods may be possible. Which of the repeated transmission methods to use may be explicitly indicated by the BS to the UE. Depending on the repeated transmission method, an explicit indication method may vary. For example, it may be indicated whether the PDSCH is to be repeatedly transmitted by using a TDM scheme or an FDM scheme through upper layer configuration. Meanwhile, whether the repeated transmission uses an SDM scheme or whether the PDSCH is transmitted repeatedly or once may be indicated through a L1 signaling.

The repeated PDSCH transmission described above may be scheduled according to single-PDCCH-based NC-JT. In other words, one piece of DCI may be used (16-00, 16-10, 16-20, 16-30) may be used to schedule repeated PDSCH transmission, and the corresponding DCI may indicate a list of all TRPs to participate in the repeated transmission. The list of TRPs to perform repeated transmission may be indicated in the form of a TCI state list, and a duration of the TCI state list may be dynamically changed. The corresponding DCI may be repeatedly transmitted for reliability improvement, and during repeated transmission, different beams may be applied for each piece of DCI. In addition, the repeated PDSCH transmission described above may be scheduled according to multi-PDCCH-based NC-JT. In other words, a plurality of pieces of control information (DCI) may be used (16-05, 16-15, 16-25, 16-35) to schedule repeated PDSCH transmission, and each piece of DCI may correspond PDSCHs of different TRPs to participate in the repeated transmission. Alternatively, shortened DCI may be used to schedule repeated transmission, and normal DCI and secondary DCI may respectively correspond to PDSCHs of different TRPs to participate in the repeated transmission. The indication method described may commonly be applied to both repeated transmission through a plurality of TRPs and transmission of different data through a plurality of TRPs.

During single-PDCCH or multi-PDCCH-based NC-JT transmission, when the UE is not aware of whether a PDSCH transmitted from each TRP is a repeated transmission or transmission of different data, each PDSCH may be independently decoded, and even when a repeated transmission PDSCH is transmitted, combining cannot be performed between the PDSCHs, and thus, there is a problem in that performance gain cannot be obtained. As a way to determine whether repeated transmission is performed, the following example may be considered.

A. Method 1: When a specific MCS table is configured in a higher layer, for example, when it is configured to qam64LowSE having low spectral efficiency, the UE assumes that each PDSCH transmitted through NC-JT contains the same data, and otherwise assumes that each PDSCH transmitted through NC-JT contains different data.

B. Method 2: When one or all DCIs for NC-JT transmission are scrambled by a specific RNTI, for example, when they are scrambled by an MCS-C-RNTI, the UE assumes that each PDSCH transmitted through NC-JT contains the same data, and otherwise assumes that each PDSCH transmitted through NC-JT contains different data.

C. Method 3: When an MCS level indicated to one or all DCIS for NC-JT transmission is less than a specific threshold, the UE assumes that each PDSCH transmitted through NC-JT contains the same data, and otherwise assumes that each PDSCH transmitted through NC-JT contains different data.

D. Method 4: When the number of DMRS ports, CDM groups, or layers indicated to a single DCI for NC-JT transmission is 1, the UE assumes that each PDSCH transmitted through NC-JT contains the same data, and otherwise assumes that each PDSCH transmitted through NC-JT contains different data.

E. Method 5: When HARQ process number and NDI values indicated in all pieces of DCI for NC-JT transmission are the same, the UE assumes that each PDSCH transmitted through NC-JT contains the same data, and otherwise assumes that each PDSCH transmitted through NC-JT contains different data. In the current NR, except for retransmission, there is a limitation that the UE does not expect to receive a PDSCH designated with the same HARQ process ID until an ACK for a PDSCH designated with a specific HARQ process ID is transmitted. In addition to the specific HARQ process ID, the limitation may be changed to a limitation that reception of a PDSCH designated with the same HARQ process ID and TCI state is not expected before an ACK for the PDSCH designated in a specific TCI state is transmitted. Accordingly, repeated data transmission between different TRPs may be allowed, while the same limitations as before may be maintained within a single TRP.

The example described above may be operated in combination of two or more as necessary, and in addition to the example described above, a similar method for determining whether to repeatedly transmit a PDSCH transmitted through NC-JT may be used.

Meanwhile, in a current NR, the number of repeated transmissions are semi-statically configured through RRC. However, depending on a change in the channel state or the like, there may be a case where required reliability is satisfied without repeated transmission or even with repeated transmission less than the configured number of times. Accordingly, the number of repeated transmissions may be dynamically configured to increase transmission efficiency. For example, when repeated transmission is scheduled with a single piece of DCI, the number of repeated transmissions may be equal to the number of TCI states indicated in the DCI or may be an arbitrary number x proportional thereto. The x value may be configured dynamically or semi-statically, and when configured semi-statically, may be equal to a value designated as the number of repeated transmissions in NR.

When the number of repeated transmissions is greater than the number of TCI states, a specific pattern may be followed when the TCI state is applied to each repeated slot.

Figure 17:
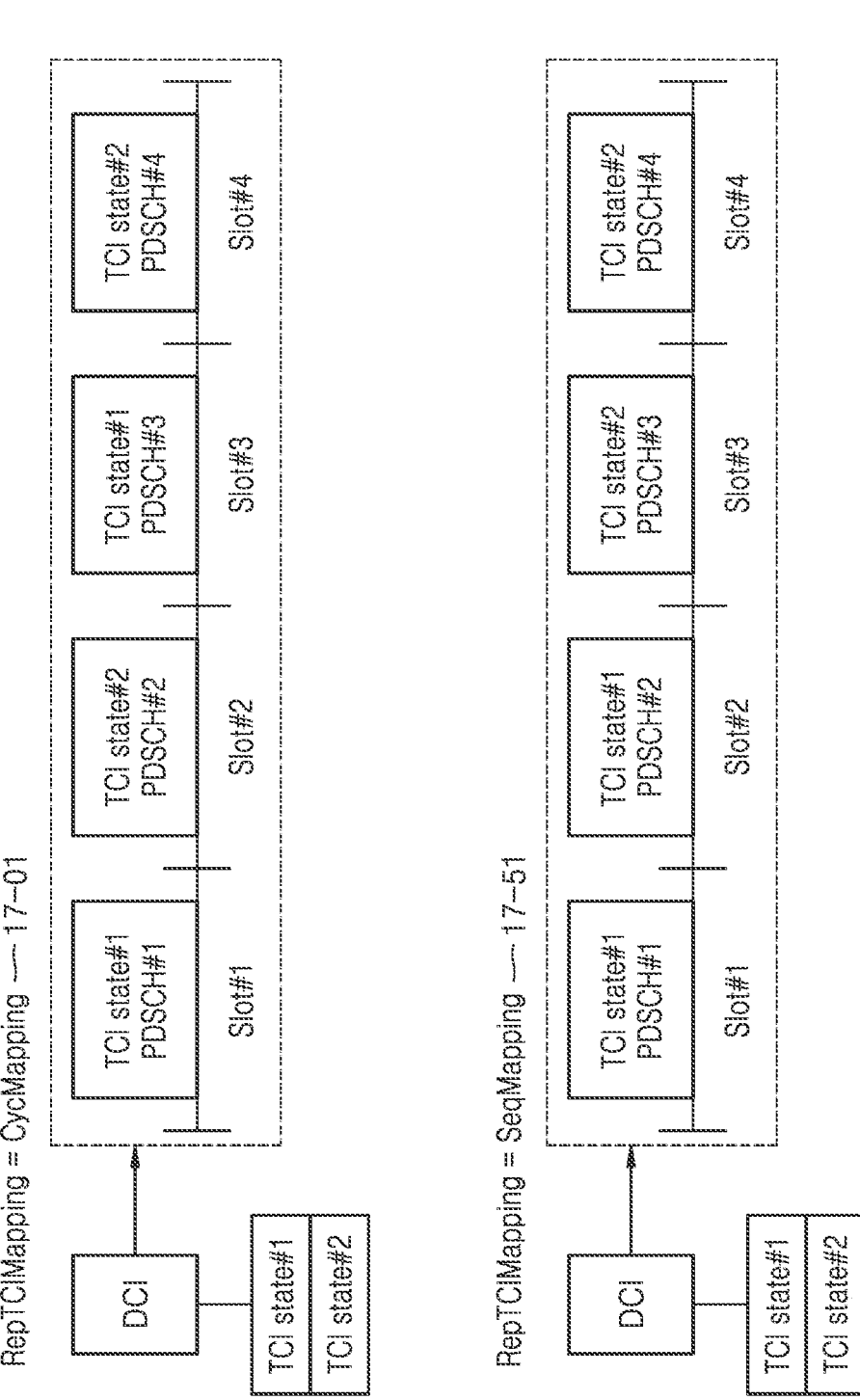
FIG. 17 illustrates two methods for a TCI state pattern in which a TCI state is applied to repeated PDSCH transmission.

FIG. 17 illustrates two methods for TCI state patterns in which TCI states are applied to repeated PDSCH transmissions.

As a first method, referring to FIG. 17, a TCI state may be changed (17-01) for every slot in which a PDSCH is repeatedly transmitted. In other words, when N TCI states (TCI state #1, TCI state #2, . . . , TCI state #N) is indicated for repeated PDSCH transmission in M slots and M>N, TCI state #1 to TCI state #N is applied to repeated transmission slots #1 to #N, respectively, so that the TCI state may be applied for each repeated transmission slot.

As a second method, the TCI state may be changed (17-51) for each L slot in which the PDSCH is repeatedly transmitted. In other words, when N TCI states (TCI state #1, TCI state #2, . . . , TCI state #N) is indicated for repeated PDSCH transmission in M slots and M>N, TCI state #1 may be applied to repeated transmission slots #1 to #L, and TCI state #2 may be applied to repeated transmission slots #L+4 to #2L. In this case, the above-described value L=2.

For the methods described above, when the number of repeated transmissions is 4 and TCI state indices 1 and 2 are indicated, according to the first method, the TCI state is applied sequentially in the repeated transmission slot according to a pattern of 1, 2, 1, 2, and according to the second method, the TCI state may be sequentially applied to the repeated transmission slot according to a pattern of 1, 1, 2, 2. The BS may indicate to the UE which of the first or second methods is followed to repeatedly transmit a PDSCH, and that indication method may be higher layer configuration or an L1 signaling. For example, the BS may indicate may indicate one of the two methods described above, through ReqTCIMapping higher layer parameters. When the parameter value is "CycMapping", the first method is indicated, and when the parameter value is "SeqMapping", the second method may be indicated.

Alternatively, the number of repeated transmissions semi-statically configured may be a maximum number of repeated transmissions, and an actual number of repeated transmissions may be dynamically indicated through DCI/MAC-CE. When the number of repeated transmissions is indicated through DCI, the corresponding number may be indicated through a new field or may be indicated by redefining a previous field. For example, when a single transmission layer is used during repeated transmission, a codepoint indicating a plurality of DMRS ports in an antenna port field of DCI is not used, and thus, the codepoint may be redefined to indicate the actual number of repeated transmissions. Alternatively, the number of repeated transmissions may be configured to be the same as the number of TCI states indicated through DCI/MAC-CE or may be configured as a value proportional thereto. Alternatively, the number of repeated transmissions may be indicated through a time domain resource allocation field indicated through DCI. For example, in addition to a value indicated in the NR system through the time domain resource allocation field of DCI, for example, in addition to values of $K_0$, S, L, or the like described above with reference to FIG. 8, the number of repeated transmissions may be indicated together. Meanwhile, when repeated transmission is scheduled through multiple pieces of DCI, the number of repeated transmissions may be equal to the number of pieces of DCI or may be x, which is an arbitrary number proportional thereto, and the x may be a value mentioned as described above. When the number of repeated transmissions is indicated both semi-statically and dynamically, a priority may be present between them. For example, the number of repeated transmissions dynamically transmitted may be applied in preference to the number of repeated transmissions semi-statically indicated. According to an embodiment of the disclosure, a method of repeated transmitting NC-JT control information is described below.

When the BS repeatedly transmits a PDSCH through a plurality of TRPs according to the embodiment described above, unless control information (DCI) for scheduling the PDSCH is repeatedly transmitted, a situation where reliability requirement of a system may not be satisfied may occur due to low reliability of the DCI. Accordingly, according to an embodiment of the disclosure, a method of repeatedly transmitting control information and a PDSCH by using a plurality of TRPs is provided.

Figure 18:
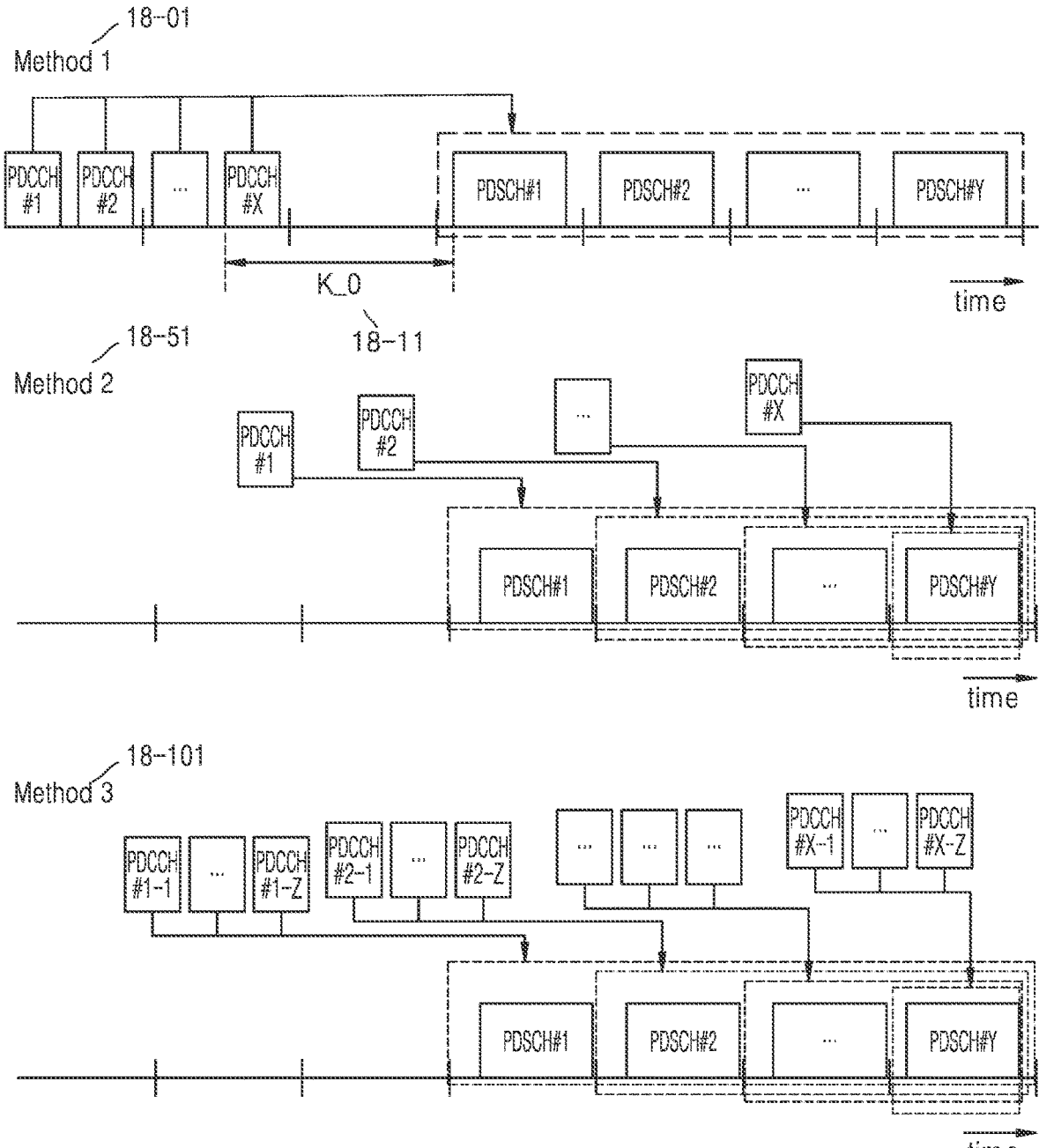
FIG. 18 illustrates an example of a method of repeatedly transmitting control information and a PDSCH through a plurality of TRPs, according to an embodiment of the disclosure.

FIG. 18 illustrates an example of a method of repeatedly transmitting control information and PDSCH through a plurality of TRPs, according to an embodiment of the disclosure.

As a first method, a method (18-01) of repeatedly transmitting a plurality of pieces of control information with the same DCI format and payload may be present. To each of the pieces of control information described above, information for scheduling repeatedly-transmitted PDSCHs, for example, {PDSCH #1, PDSCH #2, . . . , PDSCH #Y} to be repeatedly transmitted across a plurality of slots, may be indicated. When the payloads of all repeatedly-transmitted control information are the same, it may be expressed that PDSCH scheduling information of each piece of control information, for example, the number of repeated PDSCH transmissions, time-domain PDSCH resource allocation information, that is, a slot offset (K_0, 18-11) between the control information and PDSCH #1 and the number of PDSCH symbols, frequency domain PDSCH resource allocation information, DMRS port allocation information, PDSCH-to-HARQ-ACK timing, a PUCCH resource indicator, or the like are all the same. The UE may soft combine pieces of repeated transmission control information having the same payload so that reception reliability of the control information may be improved.

For the soft combining described above, the UE needs to be aware in advance of a resource location and the number of repeated transmissions of control information to be repeatedly transmitted. To this end, the BS may pre-indicate resource configurations of the time domain, frequency domain, and spatial domain of the repeated transmission control information described above. When the control information is repeatedly transmitted in the time domain, the control information may be repeatedly transmitted across different CORESETs, repeatedly transmitted across different search space sets within a single CORESET, or may be repeatedly transmitted across different PDCCH monitoring occasions within a single CORESET and a single search space set. A unit of resources repeatedly transmitted in a time domain (CORESET unit, search space set unit, and PDCCH monitoring occasion unit) and a location of repeated transmitted resources (PDCCH candidate index or the like) may be indicated through higher layer configuration of the BS. In this case, the number of repeated transmissions of a PDCCH and/or a list and transmission pattern of TRPs participating in the repeated transmission may be explicitly indicated, and a higher layer indication or a MAC-CE/L1 signaling or the like may be used as an explicit indication method. In this case, the list of TRPs may be indicated in the form of a TCI state or QCL assumption.

When control information is repeatedly transmitted to the frequency domain, the control information may be repeatedly transmitted across different CORESETs, repeatedly transmitted across different PDCCH candidates within a single CORESET, or repeatedly transmitted for each CCE. A unit of resources repeatedly transmitted on the frequency domain and a location of repeated transmission resources may be indicated through upper layer configuration or the like of the BS. In addition, the number of repeated transmissions and/or a list and transmission pattern of TRPs participating in the repeated transmission may be explicitly indicated, and a higher layer indication or a MAC-CE/L1 signaling or the like may be used as an explicit indication method. In this case, the list of TRPs may be indicated in the form of a TCI state or QCL assumption.

When the control information is repeatedly transmitted to the space domain, the control information may be repeatedly transmitted across different CORESETs, or may be repeatedly transmitted by configuring two or more TCI states in a single CORESET. As a second method, a method (18-51) of repeatedly transmitting a plurality of pieces of control information which may differ in DCI format and/or payload may be present. These pieces of control information schedule a repeated transmission PDSCH, and the number of repeated PDSCH transmissions indicated by each piece of control information may be different from each other. For example, PDCCH #1 indicates information for scheduling {PDSCH #1, PDSCH #2, . . . , PDSCH #Y}, whereas PDCCH #2 indicates information for scheduling {PDSCH #2, . . . , PDSCH #Y}, . . . , PDCCH #X may indicate information for scheduling {PDSCH Y}. The method of repeatedly transmitting control information, as described above has an advantage in that a total delay time necessary for repeated transmissions of control information and a PDSCH may be reduced compared to the first method. On the other hand, in this method, a payload of each piece of control information repeatedly transmitted may differ from each other, and thus, soft combining of the control information repeatedly transmitted is not possible, and thus has a drawback of low reliability compared to the first method.

In the second method, the UE may not need to be aware in advance of a location of resource of control information to be repeatedly transmitted the number of repeated transmissions, or the like, and the UE may decode and process each of the pieces of repeatedly transmitted control information independently of each other. When the UE decodes a plurality of pieces of repeated transmission control information for scheduling the same PDSCH, only a first piece of repeated transmission control information may be processed, and repeated transmission control information from a second one may be ignored. Alternatively, the location of resource of control information to be repeatedly transmitted, the number of repeated transmissions, or the like may be indicated in advance, and a method of the indication may be the same as a method described in the first method.

As a third method, a method (18-101) of repeatedly transmitting a plurality of pieces of control information that may differ in DCI format and/or payload may be present. In this case, each of the pieces of control information repeatedly transmitted may be same in DCI format and payload. In the second method (18-51), a plurality of pieces of control information cannot be soft combined, and thus, there is a drawback of low reliability compared to the first method (18-01), and the first method (18-01) has a drawback in that a total latency necessary for repeated transmissions of control information and a PDSCH is long. The third method (18-101), which is a method using advantages of the first method (18-01) and the second method (18-51), may transmit control information with high reliability compared to the second method 18-51, while reducing a total latency necessary for repeated transmissions of control information and a PDSCH, compared to the first method (18-01).

In the third method (18-101), soft combining of the first method (18-01) and decoding of the second method (18-51) may be used to decode and soft combine control information repeatedly transmitted. For example, during repeated transmissions of a plurality of pieces of control information that may differ in DCI format and/or payload, control information first transmitted may be decoded as in the second method (18-51), and repeated transmission of the decoded control information may be soft combined as in the first method (18-01).

Meanwhile, the BS may select and configure one of the first method (18-01), the second method (18-51), or the third method (18-101) for repeated control information transmission. A method of repeated control information transmission may be explicitly indicated from the BS to the UE through higher layer configuration or the like. Alternatively, the indication may be performed in combination with another configuration. For example, higher layer configuration for indicating a method of repeated PDSCH transmission may be combined with an indication to repeatedly transmit control information. When it is indicated that a PDSCH is repeatedly transmitted by using an FDM scheme, the control information may be interpreted to be repeatedly transmitted by using only the first method (18-01), and the reason for this is that a latency reduction effect by the second method (18-51) is not present in the repeated PDSCH transmission using the FDM scheme. For a similar reason, when the PDSCH is indicated to be repeatedly transmitted through an intra-slot TDM scheme, the control information may be interpreted to be repeatedly transmitted by using the first method (18-01). On the other hand, when the PDSCH is indicated to be repeatedly transmitted by using the inter-slot TDM scheme, the first method (18-01), the two second method (18-51), or the third method (18-101) for repeated control information transmission may be selected through a higher layer signaling or the like.

Meanwhile, through configuration of higher layer or the like, the BS may explicitly indicate a unit of repeated control information transmission. Alternatively, the indication may be performed in combination with another configuration. For example, higher layer configuration for indicating a method of repeated PDSCH transmission may be combined with a unit of repeated control information transmission. When the PDSCH is indicated to be repeatedly transmitted by using the FDM method, the control information may be interpreted to be repeatedly transmitted through FDM or SDM, and the reason for this is that when the control information is repeatedly transmitted as in the inter-slot TDM scheme or the like, a latency reduction effect due to repeated PDSCH transmission of the FDM scheme is not present. For a similar reason, when the PDSCH is indicated to be repeatedly transmitted through an intra-slot TDM scheme, the control information may be interpreted to be repeatedly transmitted by using the inter-slot TDM, FDM, or SDM. On the other hand, when the PDSCH is indicated to be repeatedly transmitted between a plurality of slots by using the TDM scheme, a higher layer signaling or the like may be selected so that the control information may be repeatedly transmitted through TDM between the plurality of slots, inter-slot TDM, FDM, or SDM.

According to an embodiment of the disclosure, a method of interpreting a DCI field of repeated transmission control information is described below.

When the BS repeatedly transmits control information as in the second method (18-51) or the third method (18-101) described with reference to a method of repeatedly transmitting NC-JT control information, according to an embodiment described above, a DCI format and/or payload of the repeatedly transmitted control information received by the UE may be different from each other. In this case, a field that has to be configured in the same manner during repeated transmission and a field that may be configured otherwise may be identified from among fields included in the control information. The field that has to be configured in the same manner for the repeatedly transmitted control information means that a PDSCH scheduled by control information has to be repeatedly transmitted with the same configuration. For example, from among fields of a control signal for scheduling a PDSCH repeatedly transmitted by using a TDM scheme between a plurality of slots, an identifier for DCI formats, a bandwidth part indicator, frequency domain resource assignment, a rate matching indicator, antenna ports, a HARQ process number, a modulation and coding scheme, a new data indicator, a downlink assignment index, or the like may be configured the same for the control information repeatedly transmitted. On the other hand, the field that may be configured otherwise from among the fields included in the repeatedly transmitted control information may indicate configuration information that may be changed while a PDSCH scheduled by the control information is repeatedly transmitted. For example, from among the fields of a control signal for scheduling a PDSCH repeatedly transmitted by using the TDM scheme between the plurality of slots, time domain resource assignment, a redundancy version, an SRS request, a transmission configuration indication, a PUCCH resource indicator, a PDSCH-to-HARQ feedback timing indicator, a TPC command for scheduled PUCCH, or the like may be differently configured for the control information repeatedly transmitted.

When DCI formats and/or payloads of the repeatedly transmitted control information are different from each other, the UE may identify whether the control information is repeatedly transmitted, as described below.

As a first method for identifying whether the control information is repeatedly transmitted, the UE may identify whether the control information is repeated by comparing fields that have to be configured the same as above, for the received repeatedly transmitted control information. In this case, in order to determine that the control information is repeated, it has to be compared whether at least a HARQ process number of pieces of control information and a new data indicator are the same. When the UE receives pieces of control information having the same field value that has to be configured the same and includes a HARQ process number and a new data indicator, the UE may determine that the received control information is repeatedly transmitted.

Figure 19:
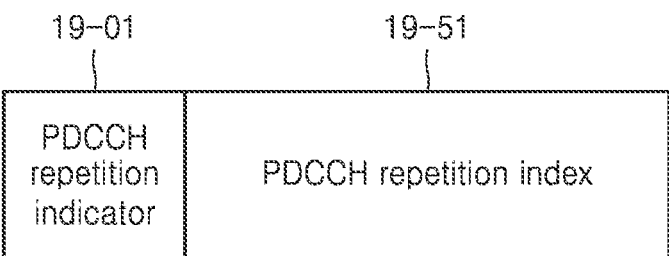
FIG. 19 is a diagram for describing a method for identifying whether control information is repeatedly transmitted, according to an embodiment of the disclosure.

FIG. 19 is a diagram for describing a method for identifying whether control information is repeatedly transmitted, according to an embodiment of the disclosure.

As a second method for identifying whether control information is repeatedly transmitted, the BS may configure an indicator for indicating whether to repeatedly transmit control information and/or a field for indicating the number of times the control information is repeated, as shown in FIG. 19. The UE may identify an indicator (19-01) of whether to repeatedly transmit the received control information and/or a field (19-51) of the number of times the control information is repeated, and determine that a plurality of pieces of received control information are repeatedly transmitted.

Figure 20:
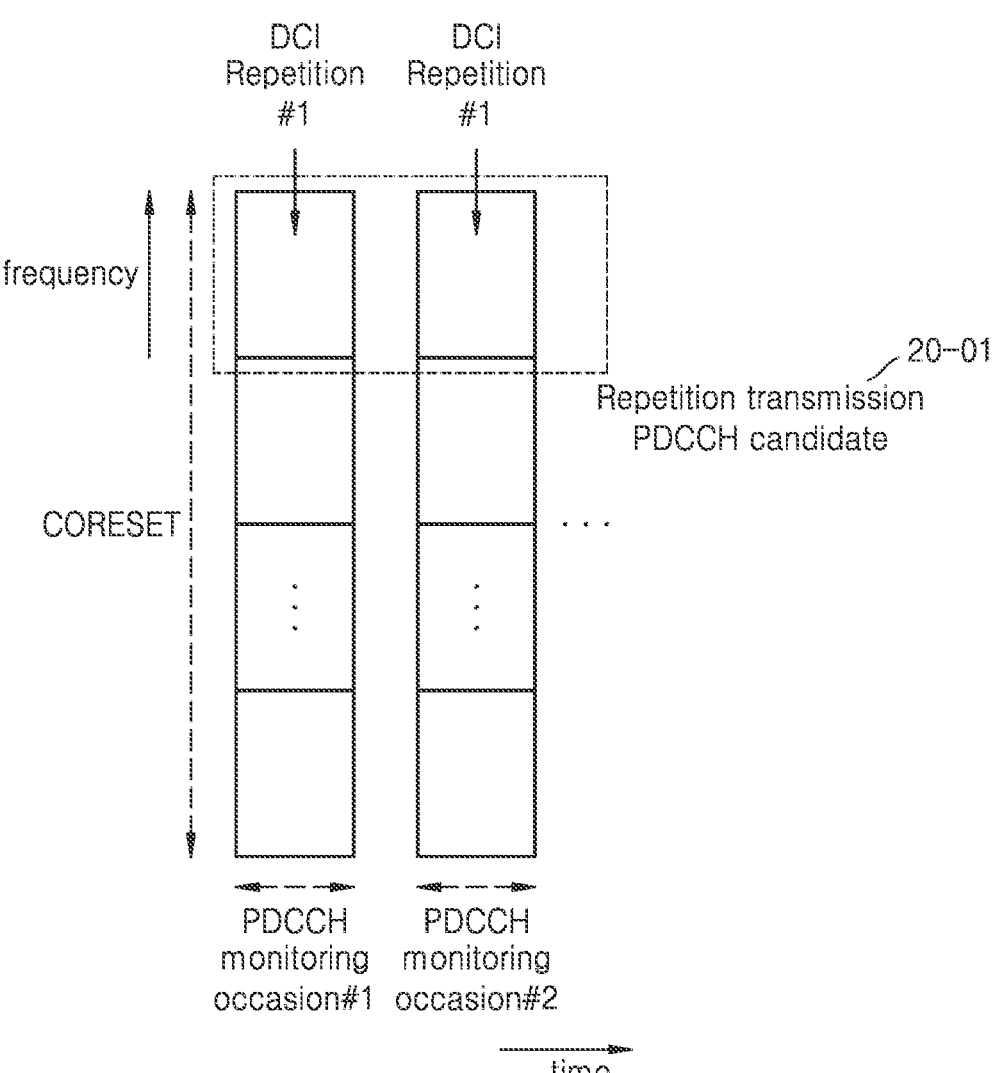
FIG. 20 is a diagram for describing a method for identifying whether control information is repeatedly transmitted, according to another embodiment of the disclosure.

FIG. 20 is a diagram for describing a method for identifying whether control information is repeatedly transmitted, according to an embodiment of the disclosure.

As a third method for identifying whether control information is repeatedly transmitted, the BS and UE may configure, in advance, a repeated transmission PDCCH candidate for repeated transmission within a CORESET, as shown in FIG. 20. When the UE receives control information on a repeated transmission PDCCH candidate (20-01) pre-configured within the CORESET during different monitoring occasions, the UE may determine that the control information is repeatedly transmitted.

When the UE receives control information repeatedly transmitted as described above and determines that the control information is repeatedly transmitted, the UE may differently perform processing on the control information depending on a field of the repeatedly transmitted control information. Because fields configured the same from among the repeatedly transmitted pieces of control information include the same scheduling information, the UE may schedule a PDSCH according to control information indicated in the corresponding field. When the UE processes fields differently configured from among the pieces of repeatedly transmitted control information, the UE may perform processing by using all pieces of repeatedly transmitted control information or by using only a single piece of control information.

When the fields differently configured are processed by using all of the received pieces of repeatedly transmitted control information, depending on a use of a field included in the control information, the identification may be performed into a field that may be processed with control information received first, a field that may be processed with control information received last, and a field that may be processed with each of the received pieces of control information. For example, when a PDSCH repeatedly transmitted by using the TDM scheme between a plurality of slots is scheduled by repeated transmission control information including fields differently configured, the UE may process a control information field, such as time domain resource assignment, a redundancy version, or a transmission configuration indication, according to control information first received. For example, the UE receives all repeated transmission control information and processes a time domain resource assignment field, first control information may schedule all PDSCHs repeatedly transmitted by using the TDM scheme between a plurality of slots, and second control information may schedule PDSCHs except for a PDSCH transmitted to a first slot. Accordingly, all repeatedly transmitted PDSCHs may be scheduled only when the time domain resource assignment field is processed as first control information. For example, a PDSCH repeatedly transmitted by using the TDM scheme between a plurality of slots is scheduled with repeated transmission control information including a field differently configured, the UE may process a control information field, such as a PUCCH resource indicator, or a PDSCH-to-HARQ feedback timing indicator, according to control information received last rather than control information previously received. For example, when the UE receives all repeated transmission control information and determines a PDSCH-to-HARQ feedback timing, the BS may update PDSCH-to-HARQ feedback timing information and repeatedly transmit control information. When the UE succeeds to receive all repeated transmission control information, HARQ feedback may be performed according to a PDSCH-to-HARQ feedback timing indicated to control information received last. For example, a control information field, such as a transmission power control command for a scheduled PUCCH, may be processed by all of the received repeated transmission control information. For example, the transmission power control command for the scheduled PUCCH may be indicated to the UE through control information so as to adjust a transmission power for PUCCH transmission. Accordingly, the UE may process all transmission power control commands for a scheduled PUCCH included in the received repeated transmission control information, and determine a PUCCH transmission power. The UE may select one of a method of processing SRS request information for triggering an aperiodic SRS with control information first received according to a method predetermined between the BS and UE, a method of processing it with control information last received, or a method of triggering an aperiodic SRS for all values configured to an SRS request field of a received repetition transmission control information.

When a field differently configured is processed as all received repeated transmission control information, the UE may process only transmission control information received first among the received repeated transmission control information, and ignore the remaining control information.

Figure 21:
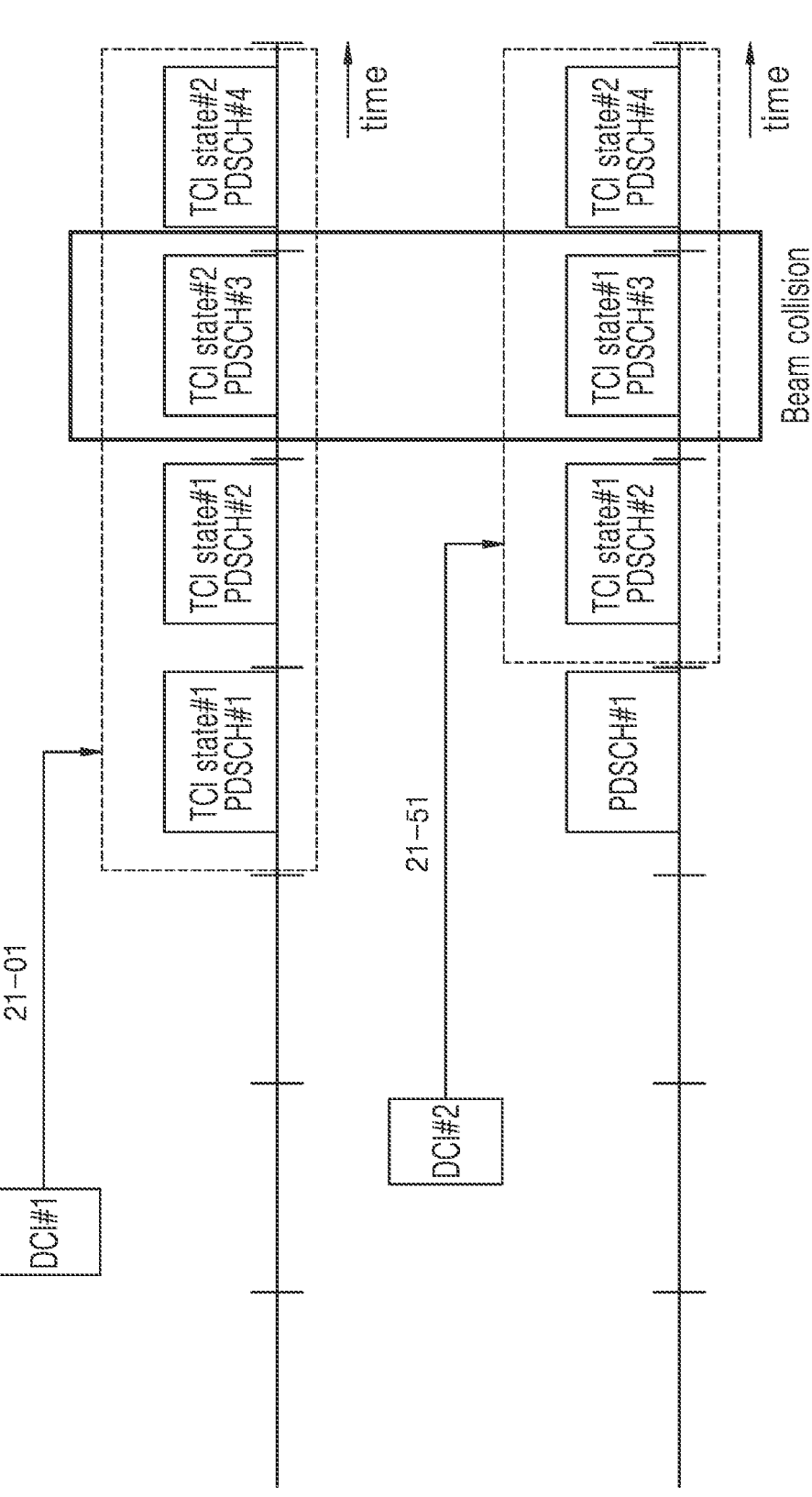
FIG. 21 is a diagram for describing a method of applying a TCI state for repeated non-coherent joint transmission (NC-JT) PDSCH transmission in response to repeated transmission of control information.

FIG. 21 is a diagram for describing a method of applying a TCI state for repeated NC-JT of PDSCH according to repeated transmission of control information.

In the Rel-16 NR, the BS may indicate, to the UE, a TCI state mapping scheme for a PDSCH repeatedly transmitted by using a TDM scheme between a plurality of slots through higher layer parameter RepTCIMapping. A parameter representing TCI mapping (for example, higher layer parameter RepTCIMapping) may be configured by selecting one of parameters representing cyclic mapping (for example, CycMapping) and parameters representing continuous mapping (for example, SeqMapping). Referring to FIG. 21, when higher layer parameter RepTCIMapping is configured as CycMapping and the UE receives a PDSCH repeatedly transmitted by using a TDM scheme between 4 slots in which two TCI states are indicated as control information (21-01), the first TCI state may be applied to first and third PDSCHs from among the repeatedly transmitted PDSCHs, and the second TCI state may be applied to second and fourth PDSCHs. When higher layer parameter RepTCIMapping is configured as SeqMapping and the UE receives a PDSCH repeatedly transmitted by using a TDM scheme between 4 slots in which two TCI states are indicated as control information (21-51), the first TCI state may be applied to the first and second PDSCHs from among the repeatedly transmitted PDSCHs, and the second TCI state may be applied to the third and fourth PDSCHs. According to an embodiment of the disclosure described above, when the BS using a method of repeatedly transmitting NC-JT control information repeatedly transmits a plurality of pieces of control information that may vary in DCI format and/or payload, as a second method, the number of times of repeated PDSCH transmissions indicated by each of the pieces of control information may be different from each other. For example, when a PDSCH repeatedly transmitted by using the TDM scheme between 4 slots is scheduled as a plurality of pieces of repeated transmission control information that may differ in DCI format and/or payload, first control information may be scheduled such that the number of repeated PDSCH transmissions is 4, and second control information may be scheduled such that the number of repeated PDSCH transmissions is 3. When parameters (for example, a higher layer parameter RepTCIMapping of Rel-16 NR) representing TCI mapping are configured to represent continuous mapping (for example, SeqMapping) and a TCI state is applied to a scheduled PDSCH according to the upper layer parameter RepTCIMapping, {TCI state #1, TCI state #1, TCI state #2, TCI state #2} are respectively applied to {PDSCH #1, PDSCH #2, PDSCH #3, PDSCH #4}, which are repeatedly transmitted and scheduled as first control information. When the first control information is not received by the UE and second control information is received by the UE, the UE may receive {PDSCH #2, PDSDCH #3, PDSCH #4} scheduled by the second control information. In this case, when the TCI state is applied to a scheduled PDSCH according to the upper layer parameter RepTCMapping and the second control information, {TCI state #1, TCI state #1, TCI state #2} are respectively applied to {PDSCH #2, PDSCH #3, PDSCH #4}. {PDSCH #1, PDSCH #2, PDSCH #3, PDSCH #4} transmitted by the BS are transmitted to beams respectively indicated by {TCI state #1, TCI state #1, TCI state #2, TCI state #2}. However, the UE does not receive the first control information and receives {PDSCH #2, PDSCH #3, PDSCH #4} according to the second control information, the UE may apply TCI state #1 rather than TCI state #2 to PDSCH #3. Accordingly, a problem in which a beam to which the BS transmits PDSCH #3 and a TCI state applied to PDSCH #3 by the UE do not correspond to each other occurs.

To resolve this problem, in the present embodiment, a method of indicating a TCI state of a PDSCH that is scheduled by a plurality of pieces of repeated transmission control information which may differ in DCI format and/or payload is provided.

As a first method, similar to the second method for identifying whether control information is repeatedly transmitted, described with reference to a method of interpreting a DCI field of repeated transmission control information according to an embodiment of the disclosure above, the BS may add, to each piece of repeatedly transmitted control information, an indicator indicating whether the control information is repeatedly transmitted and a field that may indicate the number of times the control information is repeated, to notify the repeated transmission information of control information to the UE. When the UE receives the information about whether the control information is repeatedly transmitted and the number of repeated transmissions, repeated transmission of the received control information may be identified. In addition, the UE may apply a TCI state to a PDSCH according to the number of repeated transmissions of the control information. For example, when the UE does not receive the first control information and receives the second control information for scheduling {PDSCH #2, PDSCH #3, PDSCH #4}, an indicator indicating that the control information is repeatedly transmitted and information that the control information is repeatedly transmitted a second time are received. The UE may identify that the received control information is the control information repeatedly transmitted the second time. Thereafter, the UE may apply {TCI state #1, TCI state #2, TCI state #2} to {PDSCH #2, PDSCH #3, PDSCH #4}, instead of applying {TCI state #1, TCI state #1, TCI state #2} to {PDSCH #2, PDSCH #3, PDSCH #4}, according to a higher layer parameter RepTCIMapping configured as SeqMapping, so as to receive a PDSCH repeatedly transmitted.

As a second method, a method of applying a TCI state to a PDSCH scheduled by control information may be indicated for each piece of repeated transmission control information. The method of applying the TCI state indicated by the control information may be associated with or independent of the information configured to the upper layer parameter RepTCIMapping. For example, when the upper layer parameter RepTCIMapping is configured as SeqMapping and control information for scheduling a PDSCH repeatedly transmitted by using a TDM scheme between 4 slots is repeatedly transmitted, a TCI state application method for control information first transmitted may be indicated to {TCI state #1, TCI state #1, TCI state #2, TCI state #2}, and a TCI state application method for control information repeatedly transmitted the second time may be indicated to {TCI state #1, TCI state #2, TCI state #2}, according to the mapping method configured to the upper layer parameter RepTCIMapping. Alternatively, by indicating the TCI state application method by control information independently of the configuration information of the upper layer parameter RepTCIMapping, the TCI state application method for control information first transmitted may be indicated to {TCI state #1, TCI state #2, TCI state #1, TCI state #2}, and the TCI state application method for the control information repeatedly transmitted the second time may be indicated to {TCI state #2, TCI state #1, TCI state #2}. In this case, the UE may apply the TCI state to the repeatedly transmitted PDSCH according to the TCI state application method indicated by the control information.

Figure 22:
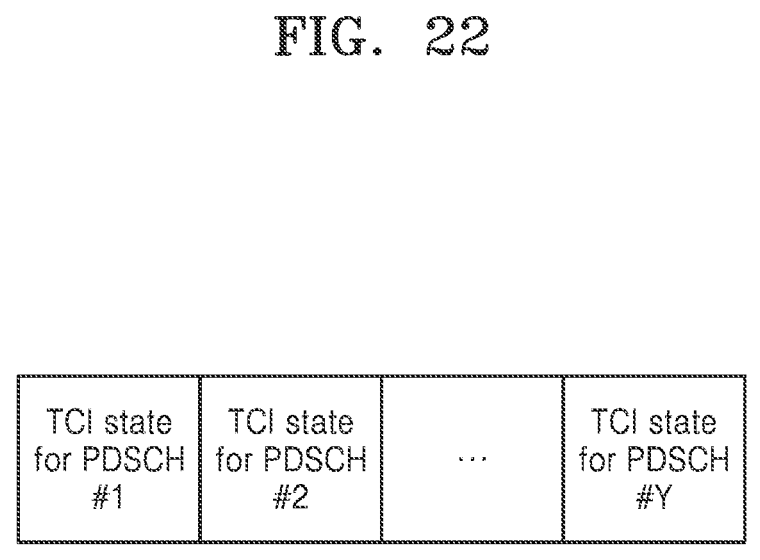

FIG. 22 shows an example of a field indicating a TCI state application method to be added to control information.

As a third method, similar to the third method for identifying whether control information is repeatedly transmitted, described above with reference to the method of interpreting the DCI field of repeatedly transmission control information according to an embodiment of the disclosure, a repeated transmission PDCCH candidate for repeated transmission within a CORESET may be preconfigured so that the UE may determine the TCI state application method. When the UE receives control information as a repeated transmission PDCCH candidate within the preconfigured CORESET, the UE may identify that the control information is repeatedly transmitted. In addition, when a PDCCH monitoring occasion or the like is indicated through a higher layer configuration of the BS or the like, the UE may identify the number of repetitions of the received control information according to the PDCCH monitoring occasion receiving the control information. The TCI state application method may be determined according to the repeated transmission PDCCH candidate, the number of repetitions of the control information identified as a PDCCH monitoring occasion, and the configuration information of the upper layer parameter RepTCIMapping. When control information is received during a first PDCCH monitoring occasion in the repeated transmission PDCCH candidate, the UE may identify that the control information that is first repeatedly transmitted. When the control information first repeatedly transmitted schedules {PDSCH #1, PDSCH #2, PDSCH #3, PDSCH #4} repeatedly transmitted between 4 slots and the upper layer parameter RepTCIMapping is configured as SeqMapping, the UE applies {TCI state #1, TCI state #1, TCI state #2, TCI state #2} to {PDSCH #1, PDSCH #2, PDSCH #3, PDSCH #4}, respectively. When control information is received during a second PDCCH monitoring occasion in the repeated transmission PDCCH candidate, the UE may identify that the control information is control information that is repeatedly transmitted the second time. When the control information repeatedly transmitted the second time schedules {PDSCH #2, PDSCH #3, PDSCH #4} repeatedly transmitted between 3 slots and the upper layer parameter is configured as SeqMapping, the UE applies {TCI state #1, TCI state #2, TCI state #2} to {PDSCH #2, PDSCH #3, PDSCH #4}, respectively.

Figure 23:
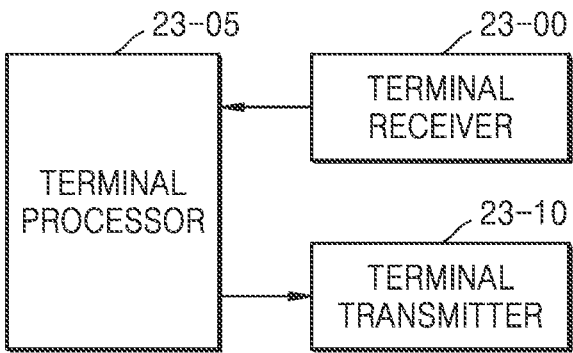
FIG. 23 is a diagram illustrating a structure of a user equipment (UE) in a wireless communication system according to an embodiment of the disclosure.

FIG. 23 is a diagram illustrating a structure of a UE in a wireless communication system according to an embodiment of the disclosure.

Referring to FIG. 23, the UE may include a transceiver referring to a terminal receiver 23-00 and a terminal transmitter 23-10, a memory (not shown), and a terminal processor 23-05 (a terminal controller or a processor). According to a communication scheme of the UE described above, the transceiver 23-00 and 23-10, the memory, and the terminal processor 23-05 of the UE may operate. However, elements of the UE are not limited to the above example. For example, the UE may include more elements than the afore-described elements or may include fewer elements than the afore-described elements. In addition, the transceiver, the memory, and the processor may be implemented as a single chip.

The transceiver may transmit or receive a signal to or from the BS. Here, the signal may include control information and data. To this end, the transceiver may include a radio frequency (RF) transmitter configured to up-convert and amplify a frequency of a signal to be transmitted, and a RF receiver configured to low-noise amplify a received signal and down-convert a frequency thereof. However, this is only an example of the transceiver, and the elements of the transceiver are not limited to the RF transmitter and RF receiver.

In addition, the transceiver may receive a signal on a wireless channel and output the signal to the processor, or transmit a signal output from the processor on a wireless channel.

The memory may store programs and data required for the UE to operate. Also, the memory may store control information or data included in a signal transmitted or received by the UE. The memory may include a storage medium such as ROM, RAM, hard disk, CD-ROM, and DVD, or any combination thereof. Also, the memory may refer to a plurality of memories.

In addition, the processor may control a series of processes to allow the UE to operate according to the aforementioned embodiment. For example, the processor may control the elements of the terminal to receive a plurality of PDSCHs simultaneously by receiving DCI including two layers. The processor may include a plurality of processors and may execute a program stored in the memory to perform an operation of controlling the elements of the UE.

For example, the processor may repeatedly receive, from the BS through the transceiver, control information having the same DCI format and payload through a plurality of TRPs, and repeatedly receive, from the BS through the transceiver, DL data corresponding to control information through the plurality of TRPs.

The processor may perform soft combining on the repeatedly received control information, and perform decoding on the control information based on a result of the soft combining.

Figure 24:
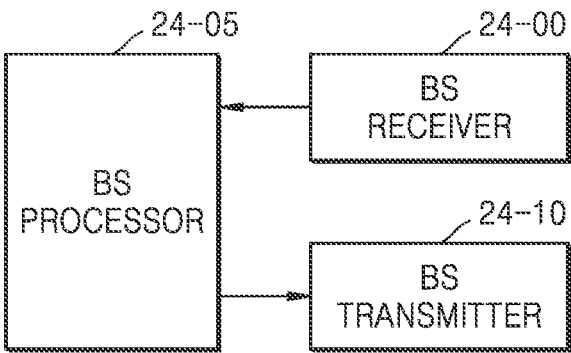
FIG. 24 is a diagram illustrating a structure of a base station in a wireless communication system according to an embodiment of the disclosure.

FIG. 24 is a diagram illustrating a structure of a BS in a wireless communication system according to an embodiment of the disclosure.

Referring to FIG. 24, the BS may include a transceiver referring to a BS receiver 24-00 and a BS transmitter 24-10, a memory (not shown), and a BS processor 24-05 (or a BS controller or a processor). According to a communication scheme of the BS described above, the transceiver 24-00 and 24-01, the memory, and the BS processor 24-05 of the BS may operate. However, elements of the BS are not limited to the above example. For example, the BS may include more or fewer elements than those described above. In addition, the transceiver, the memory, and the processor may be implemented as a single chip.

The transceiver may transmit or receive a signal to or from the UE. Here, the signal may include control information and data. To this end, the transceiver may include an RF transmitter configured to up-convert and amplify a frequency of a signal to be transmitted, and a RF receiver configured to low-noise amplify a received signal and down-convert a frequency thereof. However, this is only an example of the transceiver, and the elements of the transceiver are not limited to the RF transmitter and RF receiver.

In addition, the transceiver may receive a signal on a wireless channel and output the signal to the processor, or transmit a signal output from the processor on a wireless channel.

The memory may store programs and data required for the BS to operate. Also, the memory may store control information or data included in a signal transmitted or received by the BS. The memory may include a storage medium such as ROM, RAM, hard disk, CD-ROM, and DVD, or any combination thereof. Also, the memory may refer to a plurality of memories.

The processor may control a series of procedures to operate the base station according to the afore-described embodiments of the disclosure. For example, the processor may control each element of the BS to configure and transmit two layers of DCI including assignment information for a plurality of PDSCHs. The processor may include a plurality of processors and may execute a program stored in the memory to perform an operation of controlling the elements of the BS.

FIG. 25 is a flowchart of a method performed by a UE, according to an embodiment of the disclosure.

In operation 2501, the UE may repeatedly receive, from the BS through a plurality of TRPs, control information having the same DCI format and payload. For example, the control information may refer to a PDCCH.

Before the control information is received, the UE may receive, from the BS, information about a resource location of the control information and information about the number of times the control information is repeatedly transmitted. For example, the information about the resource location of the control information and the information about the number of times the control information is repeatedly transmitted may be transmitted through a higher layer.

According to an embodiment, a payload may include scheduling information for DL data. The scheduling information may include at least one of the number of times the DL data is repeatedly transmitted, the resource assignment information for the DL data, DMRS port assignment information, and timing information of HARQ-ACK for the DL data.

For example, scheduling information indicated by each of a plurality of pieces of control information repeatedly transmitted may all be the same. The control information may be repeatedly transmitted on a time domain, a frequency domain, or a space domain. For example, when a first PDCCH and a second PDCCH are repeatedly transmitted and a first PDSCH, a second PDSCH, and a third PDSCH are repeatedly transmitted, each of the first PDCCH and the second PDCCH may all include scheduling information for the first PDSCH, the second PDSCH, and the third PDSCH.

In operation 2503, the UE may repeatedly receive, from the BS through the plurality of TRPs, DL data corresponding to the control information. For example, the DL data may refer to a PDSCH.

In operation 2505, the UE may perform soft combining on the control information repeatedly received. For example, the UE may perform soft combining on the control information based on the information about the resource location of the control information and the information about the number of times the control information is repeatedly transmitted.

In operation 2507, the UE may perform decoding on the control information based on a result of the soft combining.

Figure 26:
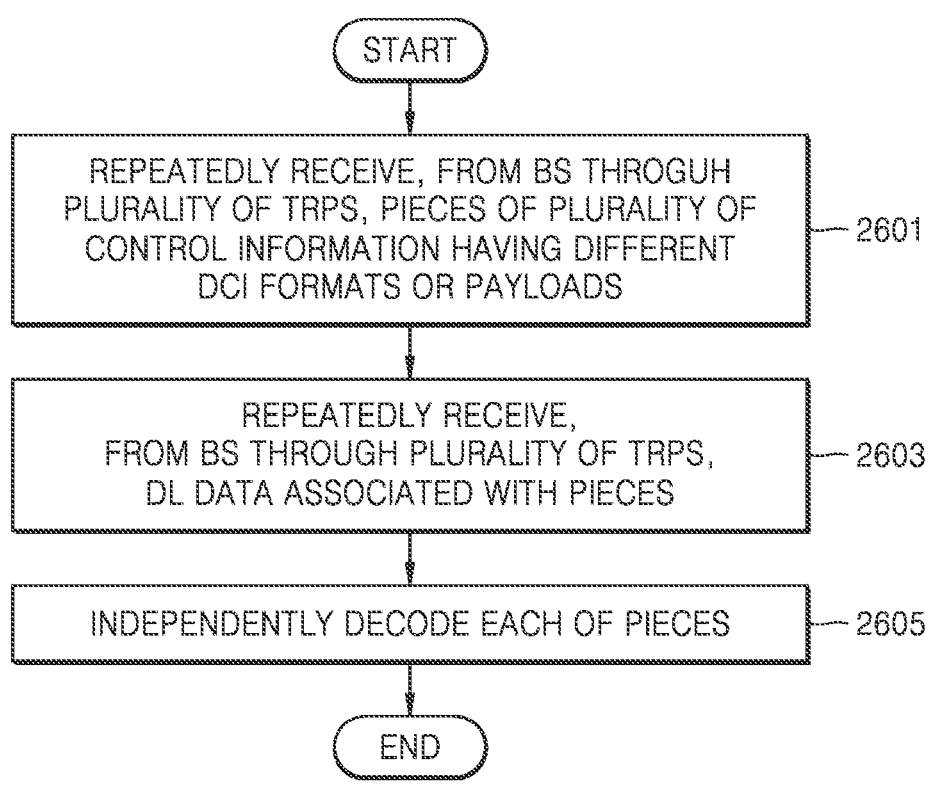
FIG. 26 is a flowchart of a method performed by a terminal, according to another embodiment of the disclosure.

FIG. 26 is a flowchart of a method performed by a terminal, according to another embodiment of the disclosure.

In operation 2601, the UE may repeatedly receive, from the BS through a plurality of TRPs, a plurality of pieces of control information that vary in DCI format or payload. For example, the plurality of pieces may refer to PDCCHs, and the number of repetitions for the DL data indicated by each of the pieces may be different from each other.

According to an embodiment, the UE may identify that the pieces are repeatedly transmitted. For example, when a field associated with the number of HARQ processes included in each of the pieces are the same as each other, the UE may identify that the pieces are repeatedly transmitted.

In another example, each of the pieces may include information associated with a repeated transmission of the pieces. The information associated with the repeated transmission of the pieces may include an indicator indicating whether the pieces are repeatedly transmitted and a field indicating the number of times the pieces are repeated. The UE may identify that the pieces are repeatedly transmitted based on the information associated with the repeated transmission.

In operation 2603, the UE may repeatedly receive, from the BS through the plurality of TRPs, DL data associated with the pieces. For example, the UE may receive a plurality of PDSCHs, and because a payload of each of the pieces is different from each other, a set of PDSCHs respectively corresponding to the pieces may be different from each other. For example, when a first PDCCH and a second PDCCH are repeatedly transmitted and a first PDSCH, a second PDSCH, and a third PDSCH are repeatedly transmitted, the first PDCCH may include scheduling information for a first set including the first PDSCH and the second PDSCH, and the second PDCCH may include scheduling information for a second set including the first PDSCH, the second PDSCH, and the third PDSCH.

In operation 2605, the UE may decode each of the pieces independently of each other. Because the payload of each of the pieces is different from each other, the UE may individually perform decoding on each of the pieces.

The methods according to embodiments as described in the specification or in the following claims of the disclosure may be implemented as hardware, software, or a combination of hardware and software.

When the electrical structures and methods are implemented in software, a computer-readable recording medium having one or more programs (software modules) recorded thereon may be provided. One or more programs stored in the computer-readable storage medium are configured to be executable by one or more processors in an electronic device. The one or more programs include instructions for causing the electronic device to execute the methods according to the embodiments of the disclosure described in the claims or the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory including a combination of some or all of the above-mentioned memory devices. Also, a plurality of such memories may be included.

Also, the programs may be stored in an attachable storage device which is accessible via a communication network such as the Internet, an intranet, a local area network (LAN), a wireless LAN (WLAN), or a storage area network (SAN), or a combination thereof. Such a storage device may access, via an external port, a device performing the embodiments of the disclosure. Furthermore, a separate storage device on the communication network may access the electronic device performing the embodiments of the disclosure.

According to an embodiment of the disclosure, a BS controlling wireless cooperative communication is provided. The BS may include a transceiver, and at least one processor that repeatedly transmits, to the UE through the transceiver, control information for scheduling DL data, and transmits, to the UE through the transceiver, reference information for interpretation of the control information.

According to an embodiment of the disclosure, in a wireless cooperative communication system, the BS may repeatedly transmit the same control information to the UE through a plurality of transmission points/panels/beams so that reception reliability of the control channel may be improved.

In the specific embodiments of the disclosure described above, elements included in the disclosure are expressed in a singular or plural form according to the specific embodiments. However, the singular or plural form is appropriately selected for convenience of descriptions and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. That is, it will be obvious to one of ordinary skill in the art that various modifications may be made based on the technical spirit of the present disclosure. Also, the embodiments may be combined to be implemented, when required. For example, a BS and a UE may be operated in a manner that portions of an embodiment of the disclosure are combined with portions of another embodiment of the disclosure. For example, a BS and a UE may be operated in a manner that portions of a first embodiment of the disclosure are combined with portions of a second embodiment of the disclosure. Also, although the embodiments are described based on an FDD LTE system, modifications based on the technical scope of the embodiments may be applied to other communication systems such as a TDD LTE system, a 5G or NR system, or the like.

Meanwhile, the order of explanation in the drawings for explaining the method of the disclosure does not necessarily correspond to the order of execution, and the order of precedence may be changed or executed in parallel.

Alternatively, drawings describing the method of the disclosure may omit some of the elements and include only some of the elements within the scope of not impairing the essence of the disclosure.

In addition, the method of the disclosure may be executed by combining some or all of the contents included in each embodiment within a range that does not impair the essence of the disclosure.

Various embodiments of the disclosure have been described. The embodiments of the disclosure described above are merely examples, and the disclosure is not limited thereto. It will be understood by one of ordinary skill in the art that the embodiments of the disclosure may be easily modified in other specific forms all without changing the technical spirit or the essential features of the disclosure. The scope of the disclosure is defined by the appended claims rather than the detailed description, and all changes or modifications within the scope of the appended claims and their equivalents will be construed as being included in the scope of the disclosure.

The invention claimed is:

1. A method performed by a user equipment (UE) in a wireless communication system, the method comprising:
receiving, from a base station, a radio resource control (RRC) message including information associated with a first search space set corresponding to a first physical downlink control channel (PDCCH) repetition and a second search space set corresponding to a second PDCCH repetition, wherein the first search space set and the second search space set have same downlink control information (DCI) formats to monitor;
monitoring, in first monitoring occasions corresponding to the first search space set and second monitoring occasions corresponding to the second search space set, PDCCH candidates for detection of DCI with a same DCI format and same payload information, wherein the first monitoring occasions start earlier than the second monitoring occasions; and
detecting the DCI with the same DCI format and the same payload information from the first PDCCH repetition and the second PDCCH repetition.

2. The method of claim 1, further comprising:
identifying a PDCCH reception where the UE detects the DCI to be the second PDCCH repetition that ends later than the first PDCCH repetition.

3. The method of claim 1, further comprising:

performing soft combining on control information associated with the first PDCCH repetition and the second PDCCH repetition, based on the information associated with the first search space and the second search space.

4. The method of claim 3, wherein the control information includes scheduling information for downlink data.

5. The method of claim 4, wherein the scheduling information includes at least one of a number of repeated transmissions of the downlink data, resource assignment information for the downlink data, demodulation reference signal (DMRS) port assignment information, and timing information of hybrid automatic repeat request-acknowledgement (HARQ-ACK) for the downlink data.

6. A user equipment (UE) in a wireless communication system, the UE comprising:

a transceiver; and at least one processor coupled to the transceiver and configured to:

receive, from a base station, a radio resource control (RRC) message including information associated with a first search space set corresponding to a first physical downlink control channel (PDCCH) repetition and a second search space set corresponding to a second PDCCH repetition, wherein the first search space set and the second search space set have same downlink control information (DCI) formats to monitor, monitor, in first monitoring occasions corresponding to the first search space set and second monitoring occasions corresponding to the second search space set, PDCCH candidates for detection of DCI with a same DCI format and same payload information, wherein the first monitoring occasions start earlier than the second monitoring occasions, and detect the DCI with the same DCI format and the same payload information from the first PDCCH repetition and the second PDCCH repetition.

7. One or more non-transitory computer-readable storage media storing computer-executable instructions, when executed by at least one processor of a user equipment (UE), cause the UE to perform operations, the operations comprising:

receiving, from a base station, a radio resource control (RRC) message including information associated with a first search space set corresponding to a first physical downlink control channel (PDCCH) repetition and a second search space set corresponding to a second PDCCH repetition, wherein the first search space set and the second search space set have same downlink control information (DCI) formats to monitor;

monitoring, in first monitoring occasions corresponding to the first search space set and second monitoring occasions corresponding to the second search space set, PDCCH candidates for detection of DCI with a same DCI format and same payload information, wherein the first monitoring occasions start earlier than the second monitoring occasions; and detecting the DCI with the same DCI format and the same payload information from the first PDCCH repetition and the second PDCCH repetition.

* * * * *